US006993137B2

(12) United States Patent
Fransdonk

(10) Patent No.: US 6,993,137 B2
(45) Date of Patent: Jan. 31, 2006

(54) METHOD AND SYSTEM TO SECURELY DISTRIBUTE CONTENT VIA A NETWORK

(75) Inventor: Robert W. Fransdonk, Vista, CA (US)

(73) Assignee: Entriq, Inc., Carlsbad, CA (US)

( * ) Notice: Subject to any disclaimer, the term of this patent is extended or adjusted under 35 U.S.C. 154(b) by 229 days.

(21) Appl. No.: 10/320,916

(22) Filed: Dec. 16, 2002

(65) Prior Publication Data
US 2003/0161473 A1 Aug. 28, 2003

Related U.S. Application Data

(63) Continuation of application No. PCT/US01/19271, filed on Jun. 15, 2001.

(60) Provisional application No. 60/212,125, filed on Jun. 16, 2000.

(51) Int. Cl.
H04L 9/00 (2006.01)
G06F 16/70 (2006.01)

(52) U.S. Cl. .................... 380/279; 380/259; 713/175; 713/176; 705/51

(58) Field of Classification Search ................ 380/277, 380/280–282; 713/193, 194, 175, 176, 200–202; 705/50–59
See application file for complete search history.

(56) References Cited

U.S. PATENT DOCUMENTS

| 5,754,772 | A | 5/1998 | Leaf |
| 5,757,908 | A | 5/1998 | Cooper et al. |
| 5,812,668 | A | 9/1998 | Weber |
| 5,850,446 | A | 12/1998 | Berger et al. |
| 5,889,863 | A | 3/1999 | Weber et al. |
| 5,905,800 | A | 5/1999 | Moskowitz et al. |
| 5,931,917 | A | 8/1999 | Nguyen et al. |
| 5,943,424 | A | 8/1999 | Berger et al. |
| 5,978,840 | A | 11/1999 | Nguyen et al. |
| 5,982,891 | A | 11/1999 | Ginter et al. ................. 705/54 |
| 5,983,208 | A | 11/1999 | Haller et al. |
| 5,987,132 | A | 11/1999 | Rowney et al. |
| 5,996,076 | A | 11/1999 | Rowney et al. |
| 5,999,629 | A | 12/1999 | Heer et al. |
| 6,002,767 | A | 12/1999 | Kramer |

(Continued)

FOREIGN PATENT DOCUMENTS

WO    WO 01/98903 A1    12/2001

OTHER PUBLICATIONS

Morin, et al, "Commercialization of Electronic Information" Jun. 1999, IEEE Multimedia Systems '99, p. 1-15.

(Continued)

Primary Examiner—Christopher Revak
(74) Attorney, Agent, or Firm—Schwegman, Lundberg, Woessner & Kluth, P.A.

(57) ABSTRACT

A method and system to distribute encrypted content via a network commences when a content provider generates a set of session keys and encrypts content with the set of session keys. The content provider communicates the set of session keys to a content distributor, which generates a set of encrypted session keys by encrypting the set of session keys with a user key. The content distributor transmits the encrypted content and the encrypted session keys to a content destination. The content distributor also transmits the user key to the content destination, allowing the content destination to decrypt the set of session keys with the user key, and thereby use the set of decrypted session keys to decrypt the content. In a further embodiment of the invention, the session keys are a time-varying sequence of session keys.

40 Claims, 28 Drawing Sheets

U.S. PATENT DOCUMENTS

| | | | |
|---|---|---|---|
| 6,002,772 A | 12/1999 | Saito | |
| 6,026,379 A | 2/2000 | Haller et al. | |
| 6,058,476 A * | 5/2000 | Matsuzaki et al. | 713/169 |
| 6,072,870 A | 6/2000 | Nguyen et al. | |
| 6,119,105 A | 9/2000 | Williams et al. | |
| 6,134,659 A | 10/2000 | Sprong et al. | 713/190 |
| 6,163,772 A | 12/2000 | Kramer et al. | |
| 6,178,409 B1 | 1/2001 | Weber et al. | |
| 6,226,618 B1 * | 5/2001 | Downs et al. | 705/1 |
| 6,256,393 B1 | 7/2001 | Safadi et al. | 380/232 |
| 6,324,525 B1 | 11/2001 | Kramer et al. | |
| 6,363,363 B1 | 3/2002 | Haller et al. | |
| 6,385,596 B1 | 5/2002 | Wiser et al. | 705/51 |
| 6,550,011 B1 | 4/2003 | Sims, III | |
| 6,571,337 B1 | 5/2003 | Xiao | |
| 6,728,379 B1 * | 4/2004 | Ishibashi et al. | 380/278 |
| 6,801,999 B1 | 10/2004 | Venkatesan et al. | |
| 2002/0099663 A1 | 7/2002 | Yoshino et al. | |
| 2003/0009681 A1 | 1/2003 | Harada et al. | |
| 2003/0161335 A1 | 8/2003 | Fransdonk | |
| 2003/0161473 A1 | 8/2003 | Fransdonk | |
| 2003/0163684 A1 | 8/2003 | Fransdonk | |
| 2003/0165241 A1 | 9/2003 | Fransdonk | |
| 2003/0167392 A1 | 9/2003 | Fransdonk | |

OTHER PUBLICATIONS

McKinsey, "Protection of Intellectual Property, Law or Technolgy?" 1997, pleasurepoint.com/ -jay/papers/tech_law.html, p. 1-7.

International Search Report-PCT/US01/19271-Nov. 16, 2001.

Fridrich, Jiri , "Applications of Data Hiding in Digital Images", *Tutorial for the ISOACS Conference in Melborne*, (Nov. 4-6, 1998).

Schneier, Bruce , "Applied Cryptography, Protocols, Algorithms, and Source Code in C", John Wiley & Sons, Inc., (1996),2nd Edition, p. 31-32.

Schneier, Bruce C., "Applied Cryptography; Protoccols, Algorithms, and Source Code in C", *Book 1996 Chapters 2 and 3, Second Edition, John Wiley and Sons, Inc. USA*, (1996),21 - 74.

* cited by examiner

METHOD AND SYSTEM TO SECURELY DISTRIBUTE CONTENT VIA A NETWORK

CROSS REFERENCE TO RELATED APPLICATIONS

This application is a continuation and claims benefit to international application No. PCT/US01/19271, which claims the benefit of Provisional Application No. 60/212,125, filed Jun. 16, 2000 filed on Jun. 15, 2001.

This application is related to the following applications:
1. METHOD AND SYSTEM TO SECURELY DISTRIBUTE CONTENT VIA A NETWORK, application Ser. No. 10/321,075, filed on Dec. 16, 2002.
2. METHOD AND SYSTEM TO SECURELY DISTRIBUTE CONTENT VIA A NETWORK, application Ser. No. 10/321,061, filed on Dec. 16, 2002.
3. METHOD AND SYSTEM TO SECURE CONTENT FOR DISTRIBUTION VIA A NETWORK, application Ser. No. 10/321,767, filed on Dec. 16, 2002.
4. METHOD AND SYSTEM TO DIGITALLY SIGN AND DISTRIBUTE CONTENT VIA A NETWORK, application Ser. No. 10/321,062, filed on Dec. 16, 2002.
5. METHOD AND SYSTEM TO DYNAMICALLY PRESENT A PAYMENT GATEWAY, application Ser. No. 10/321,105, filed on Dec. 16, 2002.

FIELD OF THE INVENTION

The present invention relates generally to the field of network communications and, more specifically, to a method and system for the secure distribution and delivery of content via a communications network.

BACKGROUND OF THE INVENTION

The proliferation of networks, and the widespread acceptance of the Internet as a communication and distribution channel in particular, have presented a number of opportunities for pay media content distribution. Specifically, broadband Internet Protocol (IP) networking and satellite technologies have provided a number of new opportunities for publishing and media content distribution worldwide. The ability of networks to support resource-intensive media, such as streaming media multicasting, is growing rapidly as satellite and broadband IP technologies allow content and service providers to distribute high-quality video to millions of subscribers simultaneously.

However, these opportunities have been accompanied by concerns regarding content piracy and digital rights management (DRM). A challenge facing traditional pay media distributors is to enable content providers to control their proprietary content, while maintaining the flexibility to distribute media content widely. The increased distribution potential heightens the need to protect and secure media content. For example, a content provider may have particular concerns regarding preventative measures to minimize the possibility of premium content falling into wrong hands, and the enforcement of copyrights.

Conditional Access (CA) technology for traditional broadcasting systems is based on implementing business rules in a secure device (e.g., a smart card) located at the subscriber receiving device. Access to content is controlled by encrypting the content with a key. The secure device will only release this key to the decrypting device if the subscriber fulfills the access conditions set by the operator. A problem with such security systems is that the secure devices in the field need to be replaced when new business rules are introduced or when the security system is 'hacked'. When a large number of secure devices in the field need to be updated, it will be appreciated that the cost implications are significant. In the case of large numbers this can be a very expensive exercise.

The Internet is becoming a platform for content delivery to millions of users worldwide. Using the Internet for secure content delivery introduces several problems. For example, standard Client/Server systems often cannot handle the load associated with large pay-per-view events, as a single central security server is typically not equipped to handle millions of events in a short time period. Further, standard Client/Server systems typically require that a single content encryption key be shared by all users, rendering such systems vulnerable to key hook piracy (extracting the key and distributing the key to unauthorized users). Distributed security systems to manage access to content (e.g., LDAP) partially address the first problem identified above, but do not protect the content encryption keys from unauthorized operators.

A rapidly growing broadband Internet audience is making the Internet an exciting place to stream audio and video directly to millions of users worldwide. To overcome Internet congestion, streaming media may be pushed to the edges of the Internet (e.g., to the ISP's), where it is cached and from where the media can be streamed at high quality to the end user. Content owners are increasingly using the Internet are a platform to deliver high quality programming to a large and rapidly growing audience. However, content providers are often reluctant to put premium content on the Internet, as digital content can easily be stored, forwarded and copied without any degradation by any user with a computer and a (broadband) Internet connection. Copy protection standards, such as those specified by 5C, at the end user device using a physical secure device for decryption are expensive and somewhat unsafe. An experienced hacker can typically break into the secure device and retrieve the decrypted content and redistribute the content anonymously or, in a worst-case scenario, retrieve a decryption key and redistribute the content anonymously.

Watermarking techniques at the end user device using a physical secure device may be expensive and unsafe, as any experienced hacker can break into the secure device and "catch" the content before it is watermarked.

When content is encrypted and distributed to a large group of subscribers via a communications network, there exists a danger that one of the subscribers may decrypt the content and, during the decryption process, extract a content (or product) encryption key that was used by a content provider to encrypt the content. Assuming the encrypted content is easily available for unauthorized users, this allows for so-called, "key hook piracy" whereby the fraudulent, authorized user distributes the product key to unauthorized users, possibly together with the encrypted content. Distributing a single content encryption key over a communications network, such as the Internet, can be done very efficiently.

When a content provider wants to secure and sell premium content for distribution over a large worldwide network, such as the Internet, there are a number of functions and systems that may need to be installed for a successful implementation. For example, secure storage and distribution of content encryption (or product) keys may be required to prevent exposure of the content (or product) encryption keys to a fraudulent operator or user. The exposure of such content encryption keys may result in a significant loss of revenue because of piracy. Further, a secure and scaleable key distribution system, which can manage a large number of subscribers simultaneously, may need to be in place. A scalable key distribution system may become critical to distribute content associated with large-scale live events. The implementation and operational costs associated with system software and hardware required to implement these functions may be high for a single content provider.

Current hardware-based content security solutions typically combine user authentication and content security in one module (e.g., a single smart card or other tamper proof environment is used to authenticate the user and store/process content keys). This arrangement does not allow for situations in which a user orders content, using a secure identification device (such as a PKI-enabled banking smart card or mobile device including a PKI-enabled SIM chip), and views the content using a copy-protected viewing device other than a viewing device that is integral with the secure identification device. For example, the user may wish to access the content utilizing a copy-protected device that is not linked with a specific user, and that can therefore not be used to identify the user.

Content licenses, such as those implemented by Microsoft Windows Media Digital Rights Management (DRM) technology and Intel ISIS, are signed by a private key of the license issuer as proof of the authenticity of the license to a content player (e.g., a set-top box). The signature of the content license with a private key prevents hackers from altering valid licenses and generating invalid licenses. However, assigning a license utilizing a private key operation is computationally expensive when a large number of simultaneous transactions are required. In addition, the implementation and operational costs of managing private keys and associated certificate authorities may be prohibitive.

Networks (e.g., the Internet) are becoming increasingly attractive to content providers as alternative distribution platforms for content, next to traditional TV broadcasting. It is desirable to provide a content distributor with a degree of geographic control over the distribution of content and to enable a content distributor to block users in certain countries or regions from accessing certain content. For example, a sports club may want to distribute a live game over the Internet worldwide, but may need to block users in certain countries from accessing the content due to exclusive broadcasting rights that have been sold to national broadcasters.

Traditional network-based pay media solutions require users to register payment information (e.g., credit card details) with a content distributor. This approach poses a number of burdens on users. Specifically, users may be required to provide financial information to companies (e.g., content distributors) that they do not trust. Further, users may be required to provide substantially identical financial information to a large number of content distributors if a user obtains content from a variety of sources. These burdens potentially create a barrier to entry for users.

SUMMARY OF THE INVENTION

In accordance with the invention described herein, there is provided a method and system to distribute content via a network. At a content provider, a set of session keys is generated and content is encrypted utilizing the set of session keys. The set of session keys is then communicated to a content distributor. At the content distributor, the set of session keys is encrypted utilizing a user key to generate a set of encrypted keys. The encrypted content is communicated to a content destination. The set of encrypted keys is communicated from the content distributor to the content destination. The user key is communicated from the content distributor to the content destination so as to enable the content destination to decrypt the set of encrypted keys to extract the set of session keys. At the content destination, the set of session keys is utilized to decrypt the encrypted content. In one exemplary embodiment, the set of session keys comprises a time-varying sequence of session keys.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to distribute content via a network are described. In the following description, for purposes of explanation, numerous specific details are set forth in order to provide a thorough understanding of the present invention. It will be evident, however, to one skilled in the art that the present invention may be practiced without these specific details and that these specific details are exemplary.

Overview—Content Distribution System

Figure 1:
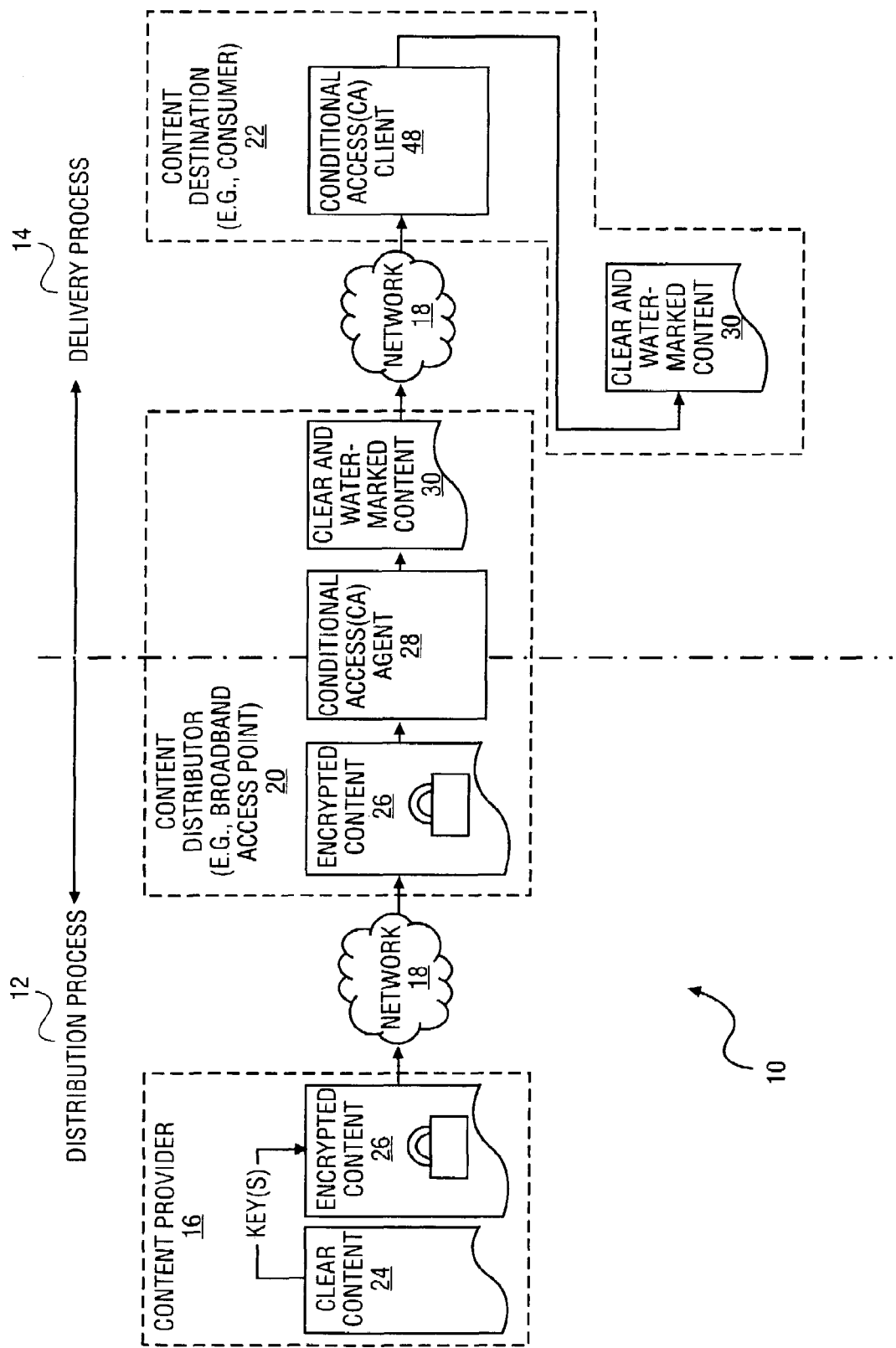
FIG. 1 is a block diagram illustrating processing of content as it is communicated from a content provider, via a content distributor, to a content destination, according to an exemplary embodiment of the present invention.

FIG. 1 is a diagrammatic representation of a content distribution system 10, according to an exemplary embodiment of the present invention. The system 10 may conceptually be viewed as comprising a distribution process 12 and a delivery process 14. Within the distribution process 12, multiple content providers 16 (e.g., a content producer or owner) distribute content via a network 18 (e.g., the Internet (wireless or wired)) to content distributors (or distribution points) 20. The distribution of content from a content provider 16 to a content distributor 20 may be as a multicast via satellite, as this provides an economic way to distribute content to a large number of content distributors 20.

Each of the content distributors 20 caches content received from multiple content providers 16, and thus assists with the temporary storage of content near the "edges" of a network so as to reduce network congestion that would otherwise occur were a content provider 16 to distribute content responsive to every content request received from a content consumer. Each content distributor 20 is equipped to respond to requests received via the network 18 from the multiple content destinations 22 (e.g., users) within a specified service area or conforming to specific criteria. Specifically, a content distributor 20, after performing the necessary authorization and verification procedures, may forward content that it has cached to a content destination 22 or, if such content has not been cached, may issue a request for the relevant content to a content provider 16. For example, if the content comprises a live "broadcast", the content may be directly forwarded via the content distributor 20 to the content destination 22.

Typically, a request for content from a content destination 22 is re-routed to content distributor 20 located nearby the requesting content destination 22. The requested content is then streamed (or otherwise transmitted) from the content distributor 20 to a media terminal (e.g., a personal computer (PC), set-top box (STB), a mobile telephone, a game console, etc.) at the content destination 22.

FIG. 1 illustrates, at a high-level, the processing of content as it is communicated from a content provider 16, via a content distributor 20, to a content destination 22. At the content provider 16, clear content 24 is encrypted utilizing, for example, a symmetric product key (or content key) to generate encrypted content 26. It will thus be appreciated that the content provider 16 will be particularly concerned about security pertaining to the product key as access to this key potentially allows for regeneration of the clear content 24. The encrypted content 26 (or cipher text) is then communicated from the content provider 16, via the network 18, to the content distributor 20. A conditional access agent 28, which represents the interests of the content provider 16 at the remote content distributor 20, may perform a number of operations in a secure environment with respect to the encrypted content 26. In one embodiment, the conditional access agent 28 decrypts the encrypted content 26 to regenerate the clear content 24 within a secure environment, and watermarks the clear content for distribution to a specific content destination 22. Watermarked content 30 may then be distributed from the content distributor 20 via the network 18, to a conditional access client 32 at the content destination 22. In an alternative embodiment, the conditional access agent 28 at the content distributor 20 may re-encrypted the content with a public key of a copy-protected device at the content destination 22. In any event, the clear and watermarked content 30 is then available for viewing and consumption at the content destination 22.

Figure 2:
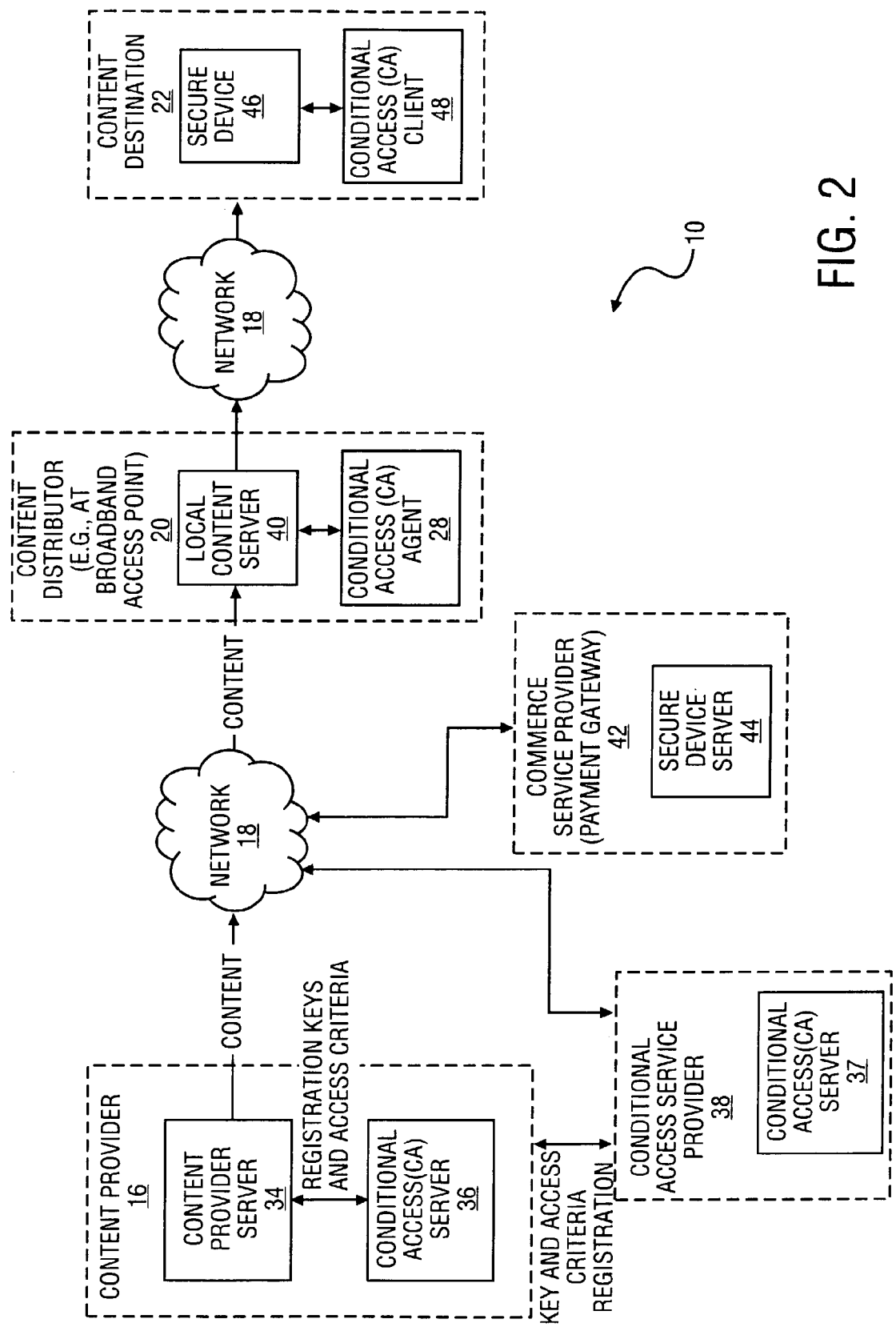
FIG. 2 is a block diagram illustrating further details regarding software components that may reside at various locations of the content distribution system to facilitate distribution and delivery processes, according to an exemplary embodiment of the present invention.

FIG. 2 is a block diagram showing further details regarding software components that may reside at the various locations of the system 10 to facilitate the distribution and delivery processes 12 and 14. The content provider 16 operates a content provider server 34 that is responsible for the actual distribution of content from the content provider 16. For example, the content provider server 34 may comprise a streaming media server (e.g., the Real Networks streaming media server developed by Real Networks of Seattle, Wash. State or a Microsoft media server developed by Microsoft of Redmond, Wash. State). A conditional access server 36 (e.g., the Sentriq Server developed and distributed by Mindport Sentriq from San Diego, Calif.) operates to define and store access rights to content of the content provider 16, to perform digital rights management, to encrypt content, and to manage and distributed product keys. To this end, the content provider server 34 and the conditional access server 36 are shown to communicate registration keys and access criteria.

While the conditional access server 36 is shown to reside with a content provider 16, in an alternative embodiment, a conditional access server 37 may reside at a conditional access service provider (ASP) 38. In this case, the conditional access server 37 may perform the above-described functions for multiple content providers 16.

The exemplary content distributor 20 is shown to host a local content server 40 and a conditional access agent 28. The local content server 40 may again be a streaming media server that streams cached (or freshly received) media. The conditional access agent 28 operates to provide intelligent content and revenue security to content providers 16 by processing access and revenue criteria, personalizing content for delivery to a content destination 22, and personalizing and managing key delivery to a content destination 22. Broadly, the conditional access agent 28 operates securely to authenticate a content destination 22 (e.g., utilizing secure tokens and X.509 certificates), securely to retrieve and cache product key information and access criteria, and to forward processed transactions to a commerce service provider 42 that provides billing and clearance services. For example, a conditional access agent 28 may evaluate a content request from a content destination 22 based on access criteria specified by a content provider 16, local date and time information, and user credentials and authentication. If a content destination 22 is authorized and/or payment is cleared, requested content may optionally be decrypted, personally watermarked, personally re-encrypted and delivered to the content destination 22

A content destination 22 is shown to include a secure device 46 (e.g., a copy-protected device such as a set-top box (STB)) and to host a conditional access client 48. The conditional access client 48 may reside on a personal computer or on the secure device 46. Where the conditional access client 48 resides on a personal computer it may, for example, launch responsive to the issuance of a request from a further client program (e.g., a browser) for access certain content. The conditional access client 48 operates to communicate a public key of the secure device 46 to a conditional access agent 28 and also performs user authentication to verify that a particular user is authorized to initiate a transaction. The conditional access agent 28 utilizes copy-protected device technology to stream content to a viewing device.

To review, the content distribution system 10 is implemented by a distributed collection of conditional access servers 36, conditional access agents 28, and conditional access clients 48 that operate in conjunction with media servers and viewing devices (e.g., players) to protected the rights of a content provider 16 in specific content, while facilitating the widespread distribution of content. A conditional access server 36 enables the content provider 16 to encrypt and associated access criteria (e.g., pay-per-view, pay-per-time, subscription) with content. The conditional access server 36 also manages subscriptions and provides monitoring and statistic tools to a content provider 16. A conditional access agent 28 is a cryptographic component that insures that access criteria, as defined by content providers 16, are enforced. Conditional access agents 28 are located within a distribution network (e.g., at an edge server) and validate subscriber content requests against, for example, content access criteria, local date and time, and subscriber credentials. A conditional access client 48 is located at a destination device (e.g., the PC, a STB, and mobile phone, game console or the like) and manages an interface between a secure device 46 and a subscriber.

Figure 3:
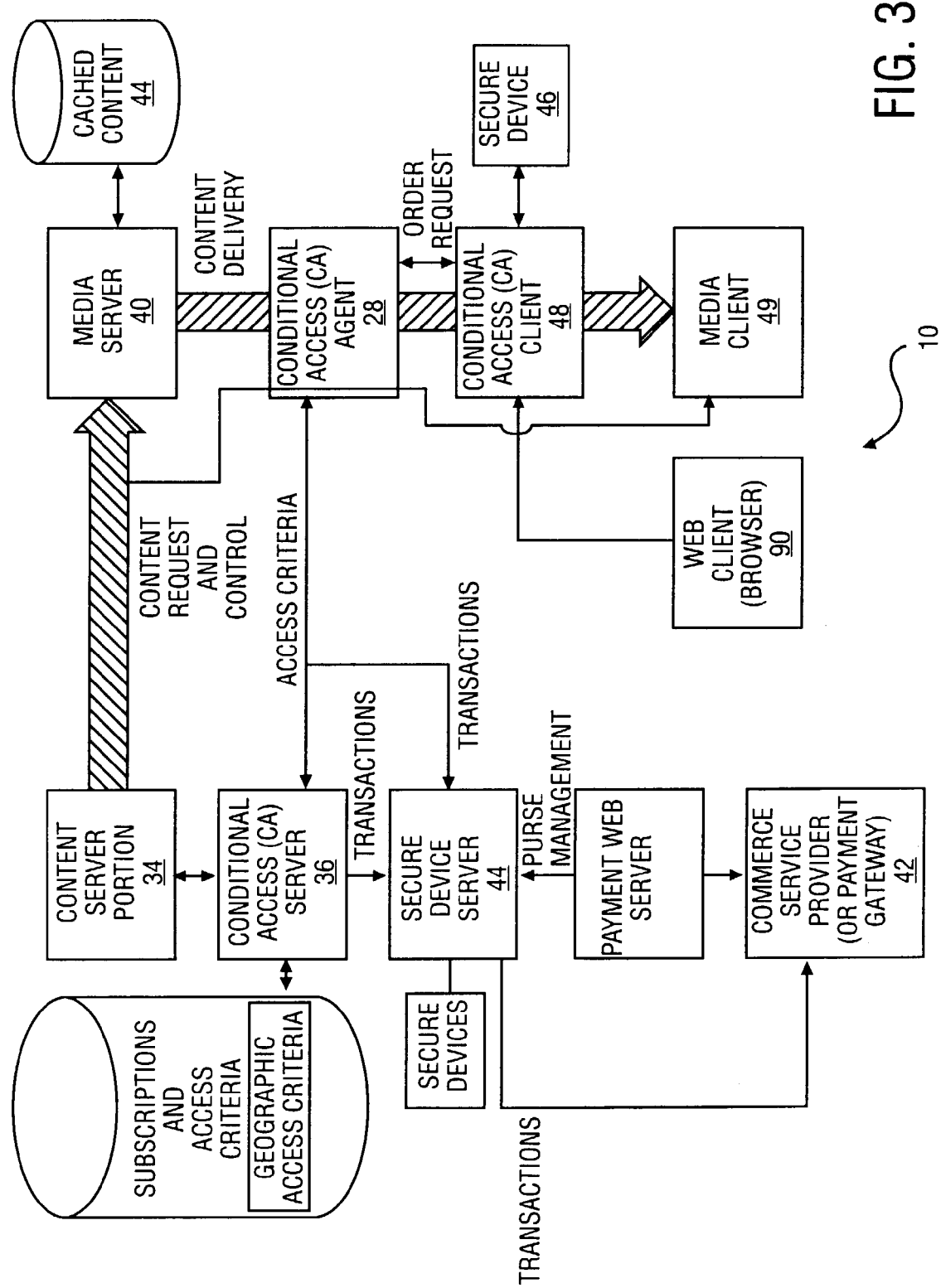
FIG. 3 is a block diagram illustrating further architectural details regarding an exemplary embodiment of a content distribution system.

FIG. 3 is a block diagram showing further architectural details regarding an exemplary embodiment of a content distribution system 10. The functioning of the various components of the content distribution system 10, as shown in FIG. 3, will now be the described in the context of registration, content ordering and transaction processing operations.

The content distribution system 10 consists of a number of sub-systems that together provide a required functionality. In one embodiment, these sub-systems seek to enable the Internet infrastructure to be utilized as a safe and secure medium for online selling and buying of content, data, programs, products and services context, including video and audio encoders, servers, players, clearing systems and existing Web sites.

The content distribution system 10, in one embodiment, seeks to provide at least the following functions:

(1) Conditional access to management through various access criteria schemes.
(2) End-to-end content security and copy protection, using encryption and watermarking technology.
(3) Transaction and purse management, using Public Key Infrastructure (PKI) and eXtensible Markup Language (XML) technology.
(4) Pay-per-view, pay-per-time and subscription based access.
(5) Access control on the basis of region and date/time.
(6) Varying prices on the basis of region and date/time.
(7) Management of a variety of (debit and credit) purses.
(8) Scaling to many (simultaneous) subscribers using a highly distributed architecture.
(9) Secure device portability, using the standard PKCS#11 interface.
(10) User platform portability by defining an interface based on HTTP and XML, allowing a range of subscriber platforms (PC/STB/GSM).

The above listed functions, in one embodiment, are enabled primarily by the following components:

(1) Conditional access clients 48 are located at content destinations 22 to sign content transactions and manage the content decryption process. The conditional access clients 48 each operate in conjunction with a secure device 46 (e.g., an e-Token or smart card).

(2) Conditional access servers 36 are located at content providers 16 or at conditional access service providers 38 as a content security ASP for merchants. In the conditional access service provider embodiment, a content provider 16 may access a website operated by the conditional access service provider 38 to secure content and to define access conditions (pay per view, subscription, etc) associated with the content.

(3) Conditional access agents 28 are located at various points within network to act as "brokers" enforcing the security settings that are associated with content by content providers 16. Conditional access agents 28 may optionally include additional encryption and watermarking technology to increase the level of security 'at the last mile'.

(4) Secure device servers 44 are located at commerce service providers 42 (e.g., pay-media operators) or payment gateways to manage the secure devices and associated purses in the field.

For the purpose of the immediately following description, assume that content has already been decrypted by a content provider 16. Live content requires a slightly different approach at the initial stage of content protection (real-time encryption is required).

A content registration and protection operation is initiated by a content provider 16 that has a content item that needs to be secured from unauthorized access. In one embodiment, the content provider 16 accesses a Web server operated by the conditional access service provider 38, from which the content provider 16 downloads a content security management application (not shown). The content security management application allows the content provider 16 to secure (encrypt) the content and associate the content with particular access criteria. The content is registered at the conditional access server 37, operated by the conditional access service provider 38, together with the access criteria and a product key that was used for encryption of the content. A unique Uniform Resource Locator (URL) linking to the access criteria is included in a content description file (ASX, SDP or SAP). The content is thus secured and may now be distributed using, for example, unicast or multicast.

A content ordering operation is commenced upon receipt of a request from a content destination 22 (e.g., a user) for specific content. The user may, for example, be running a browser on a personal computer and want to view a content item provided by of a particular content provider 16. When selecting the content item, the browser detects a tag containing a URL. The browser passes the URL to the conditional access client 48, also executing on the personal computer, to commence a transaction.

The conditional access client 48 initiates a secure session with a conditional access agent 28 to request an order for the relevant content item. If the content item is not cached at the content distributor 20 as cached content, the conditional access agent 28 retrieves access criteria for the requested content item from the conditional access server 36 and forwards a derived XML signing request to the conditional access client 48. The conditional access client 48 parses the XML signing request, displays order information (such as a price) to the user and prompts for a Personal Identification Number (PIN) code and confirmation by way of a user interface. The user confirms the order, and the conditional access client 48 digitally signs the order confirmation using the secure device 46. The signed order is sent to the conditional access agent 28 that verifies the signed confirmation order and the user credentials. The conditional access agent 28 manages the content security process (e.g., watermarking, re-encryption) until an access time has expired, after which the content destination 22 will no longer be able to access the content.

A transaction processing operation occurs concurrently with the content ordering operation. More specifically, the conditional access agent 28 will forward the signed confirmation order (i.e., transaction) to the secure device server 44 of the commerce service provider 42 to update a secure device purse and to prepare the transaction for clearing. The commerce service provider 42 processes the transaction and makes the appropriate money transfers.

The secure device server 44 interfaces with an external commerce service provider 42 to forward secured transactions. In one exemplary environment, a pay media operator or payment gateway is hosted by the service provider 42. The value of the transaction may be negotiated between the various parties (content owner/provider, network provider/ISP, payment gateway, etc).

The conditional access client 48 interfaces with the secure device 46 at the content destination 22. Example secure devices 46 are smart cards or e-Tokens. A secure device 46 may utilize the PKCS#11 interface to provided device independent.

The content destination 22 may also employ client devices utilizing non-PC client platforms, such as Set Top Boxes (STBs) and mobile telephones enabled with (smart card) PKI technology. A client device employed at a content destination 22 may run an interactive application (such as the OpenTV software suite) to order secure content items using a regular pay television smart card.

The conditional access client 48 and secure device 46 interface with the local content server 40 (e.g., a media server) and client applications to secure a control channel (such as RTSP or HTTP) and data channel (such as MPEG-4 over RTP).

The secure device server 44 provides an interface for external payment registration servers (such as used for regular web sites) to allow automated purse management.

Overview—Conditional Access Server 36

As stated above, a conditional access server 36 may reside at a content provider location, or may be deployed by a conditional access service provider 38. A conditional access server 36 provides at least the following functions:

(1) Allows content providers 16 to assign access criteria (or rule information) to content.
(2) Allows content providers 16 to create and manage content products (subscription types).
(3) Management of the content encryption keys and key distribution to the conditional access agents 28.
(4) Management of subscriptions (generation, storage and distribution) and forwarding of signed subscription transactions to a commerce service provider (e.g. a payment gateway).
(5) Processing of transactional information (monitoring).

Each of the above functions will now briefly be described. The content provider 16 defines the access criteria (AC) using an access criteria profile editor (or Digital Rights Manager) (not shown) that generates a unique URL that is distributed together with the content. The generated access criteria are stored in a database together with the appropriate product key (optionally encrypted under a storage key), a digital signature and a content tag (i.e., a short description). A conditional access agent 28 retrieves the appropriate access criteria when subscribers request access to the associated content. The access criteria are stored in such a way that retrieval can be performed efficiently (e.g., the criteria are organized by content provider and location for which the access criteria is appropriate).

Conditional access agents 28 are assigned a certain location identifier (ID), according to the physical region that they serve. Multiple conditional access agents 28 may be assigned to the same location ID. The conditional access server 36 will map the conditional access agent ID to the appropriate region ID's to lookup the access criteria that are suitable for that agent, if any.

As locations may be assigned to multiple regions, and access criteria may be defined for multiple regions, there may be a conflict (one location may map to multiple conflicting access criteria sets). To address this conflict, the operator can associate a region priority code to indicate which region should be given priority.

A content provider 16 may also define new content products and manage subscription requests utilizing the conditional access server 36. A content product may, for example, have an identifier, a name, duration (usually a month), a start date and end date. A subscription may be an "instance" of a content product associated with a certain secure device that ordered the product and a subscription start and end date.

A conditional access server 36 also processes incoming transactions and forwards them to the appropriate commerce service provider 42. The content provider 16 may be able to monitor the processed transactions.

Figure 4:
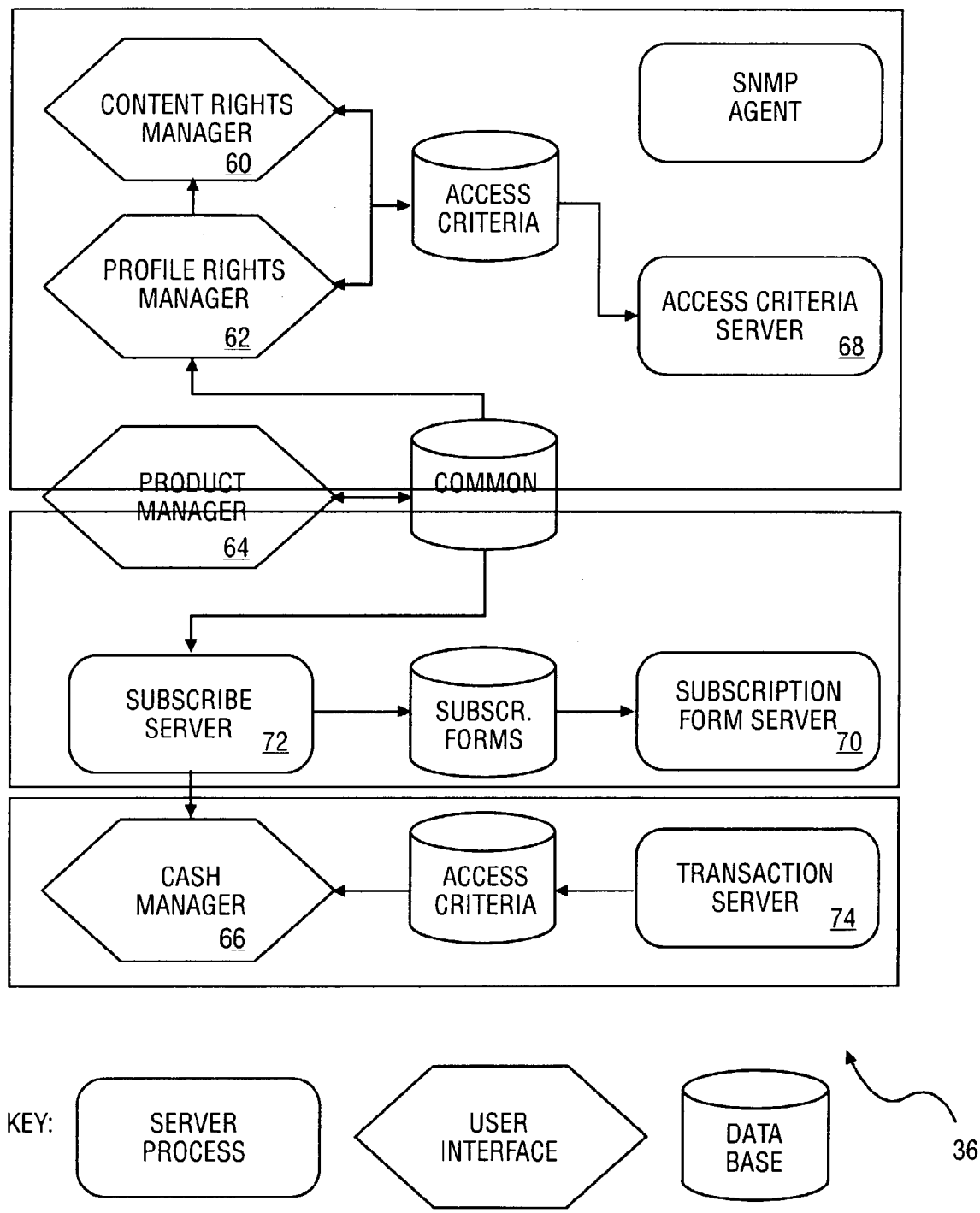
FIG. 4 is a diagrammatic representation of a number of real-time processes, databases and user interfaces that together provide the functionality of a conditional access server, according to an exemplary embodiment of the present invention.

FIG. 4 is a diagrammatic representation of a number of real-time processes, databases and user interfaces that together provided the functionality of a conditional access server 36, according to one embodiment of the present invention. The below described server processes of the conditional access server 36 communicate with external processes, such as a conditional access agent 28 and the secure device server 44, utilizing the described interfaces.

A content rights manager 60 allows a content provider 16 to associated access rights and criteria with content items. Access rights are organized utilizing profiles in order to reduce operational efforts. Profiles may be created utilizing a profile rights manager 62. The profile rights manager 62 allows a content provider 16 to create templates for access criteria, based on regional, time, payment and subscription parameters. A product manager 64 allows a content provider 16 to define content products that are available for subscription.

A cash monitor 66 is a user interface to monitor the value of transactions for a particular content provider 16, potentially in real-time. An access criteria server 68 is a HTTP server providing access criteria and keys to conditional access agents 28.

A subscription form server 70 is a HTTP server providing subscription forms (e.g., a signed list of subscriptions) for a specific secure device to conditional access agents 28. Specifically, a subscription form is a clear XML text of a current subscription associated with a secure token, signed by the conditional access server 36. A subscription form contains a signed list of time-constrained subscriptions bound to an issuer (e.g., a content provider 16) and a secure device serial number. A subscription form is signed by the conditional access server 36 to prove the authenticity thereof and maintain integrity.

A subscriber server 72 is a HTTP server that can securely process subscription requests. A transaction server is utilized to monitor transactions and update the real-time cash monitor 66.

Below are set out a number of tables and fields, according to an exemplary embodiment of the present invention, which may be utilized by the conditional access server 36.

A table Resource represents general resource values for the conditional access server 36. This table is used to store system variables such as the port number for accepting AC server connections or the debug level.

| Field | Description |
| --- | --- |
| ResourceId | |
| Name | |
| Value | |
| DefaultValue | |
| Description | |

ResourceId is the unique key.

The table Product represents product information.

| Field | Description |
| --- | --- |
| ProductIssuerId | Issuer of the product |
| ProductId | |
| Name | |
| Duration | Used in combination with field below . . . |
| DurationUnit | Subscription duration unit<br>1 = minutes, 2 = hours, 3 = days, 4 = weeks,<br>5 = months, 6 = years |
| Duration2 | Absolute value of the duration (future use only, when 'Duration' and 'DurationUnit' are not flexible enough) |
| ParentalCode | Minimum age for accessing content |
| AutoRenewal | Subscription is automatically renewed after expiration (future use) |
| StartDate | Product becomes available for sale |
| EndDate | Product no longer available |
| InfoURL | URL to subscription information |

ProductIssuerId and ProductId form the unique key.

The table ProductAC represents the access criteria (usually payment) for a subscription using a certain payment gateway or commerce service provider.

| Field | Description |
| --- | --- |
| ProductIssuerId | |
| ProductId | |
| PGWId | Payment gateway ID |
| ParentalCode | Minimum age (future use, if you want to have parental rating control per payment gateway. I.e. nationality related) |
| Price | Price in whole units<br>(25, 50 is represented as 2550) |

ProductIssuerId, ProductId and PGWId form the unique key.

The table Region represents regional information.

| Field | Description |
| --- | --- |
| CountryId | |
| RegionId | |
| Name | |

CountryId and RegionId form the unique key.

The table Country represents the geographical information.

| Field | Description |
| --- | --- |
| CountryId | |
| CountryCode | 3 character country code as defined by ISO |
| Name | Like 'Chello Amsterdam' or 'RoadRunner SD' |

CountryId is the unique key.

The table Merchant represents the content providers 16 that have access to the conditional access server 36.

| Field | Description |
| --- | --- |
| MerchantId | Merchant |
| Name | Name of the merchant |
| EMail | E-mail address of merchant |
| InfoURL | Link to information |

MerchantId and PGWId form the unique key.

The table MerchantUser represents the users (operators) of content providers 16. They possess a secure token to access the conditional access server 36. This table is used to verify the identity of the content providers 16 when he or she logs on to the system.

| Field | Description |
| --- | --- |
| Serial | Secure device serial number |
| MerchantId | Content provider ID linked with the secure device. |
| EMail | E-mail address of user |
| UserName | (Optional) name of the user |
| AccessRights | Integer representing user's access rights. This allows a way to distinguish the access rights of a certain user (for example: A user is allowed access to certain applications only). |
| SecretKey | |
| PublicKey | |

Serial is the unique key.

The table MerchantPGW represents the payment gateways (or commerce service providers) that have a clearing agreement with the content providers 16.

| Field | Description |
| --- | --- |
| MerchantId | Merchant |
| PGWId | Payment gateway |

MerchantId and PGWId form the unique key.

The table CAAgent represents information about the conditional access agents 28 in the field.

| Field | Description |
| --- | --- |
| NetworkId | |
| AgentId | Network in which it is located (e.g. RoadRunner) |
| CountryId | Integer representing the country location |

-continued

| Field | Description |
| --- | --- |
| RegionId | Integer representing the actual location (e.g. Amsterdam). |
| Type | Type of agent (token, PCMCIA, etc) |
| Version | Hardware/Software version |
| SerialNumber | Serial number of CA Agent secure device |
| Host | Host (address) of CA Agent |
| SecretKey | CA Agent Secret key (encrypted with storage key) |
| PublicKey | CA agent Public Key |

NetworkId and CAAgentId form the unique key.

The table Network represents information about the network of conditional access agents 28.

| Field | Description |
| --- | --- |
| NetworkId | |
| Name | Name of the network provider (e.g. @Home) |
| Notes | Contractual notes |
| EMail | E-mail address of network provider |
| InfoURL | URL to information about network provider |

The table PaymentGateway represents payment gateway information.

| Field | Description |
| --- | --- |
| PGWId | |
| Name | |
| SdsHostName | |
| Type | Type of payment gateway (1 is reserved for anonymous payment gateway) |
| Format | Currency format string for future use |
| ISOCurrency | ISO currency code |
| EMail | E-mail address of payment gateway |
| InfoURL | URL to payment gateway information |

PGWId is the unique key.

The table CountryPaymentGateway represents the payment gateways per country. This table is used to limit the number of selectable payment gateways depending on the selected country/region when assigning access criteria to an item.

| Field | Description |
| --- | --- |
| CountryId | |
| PGWId | |

CountryId and PGWId form the unique key.

Subscription Tables

The subscription tables are only accessed by the subscription form server 70 and subscriber server 72.

The table SubscriptionForm represents the subscriptions that have been issued to subscribers on behalf of a content provider 16.

| Field | Description |
| --- | --- |
| IssuerId | Either 0 (Entriq) or the merchant ID |
| DeviceSerial | Unique serial of secure device |
| SubscriptionForm | Digitally signed subscription form |

IssuerId and DeviceSerial form the unique key.

Access Criteria Tables

The table ItemAC links a particular item (content) with an access criteria profile and a key.

| Field | Description |
| --- | --- |
| MerchantId | Merchant ID |
| ItemId | Unique item (content) ID |
| Description | Short description of content, displayed to subscriber at confirm. |
| ProfileId | |
| Policy | Policy indicating security parameters such as encryption algorithm, key length, etc. |
| ProductKey | (Prime) Product key used for encryption of content |
| Format | Encoding format such as MPEG-2/MPEG-4, Real, Windows codec etc. |
| Bandwidth | Bandwidth in bits/second |

MerchantId and ItemId form the unique key.

There is an index on Description, to allow for quick searching on a description.

The table ACProfile represents a profile for access criteria and links to actual access criteria sets.

| Field | Description |
| --- | --- |
| MerchantId | |
| ProfileId | |
| Name | |

MerchantId and ProfileId form the unique key.

The table ACProfileCountryBlackout represents the regions that are to be blacked out for a certain profile.

| Field | Description |
| --- | --- |
| MerchantId | |
| ProfileId | |
| CountryId | Country to be blacked out |

MerchantId, ProfileId, and CountryId form the unique key.

The table ACProfileRegionBlackout represents the regions that are to be blacked out for a certain profile.

| Field | Description |
| --- | --- |
| MerchantId | |
| ProfileId | |
| CountryId | Country to be blacked out |
| RegionId | Region to be blacked out |

MerchantId, ProfileId, CountryId and RegionId form the unique key.

The table ACProfileSet represents an access criteria set (conditions) under which an item is provided to the subscriber.

| Field | Description |
| --- | --- |
| MerchantId | |
| ProfileId | |
| CountryId | |
| RegionId | |
| SetId | Sequence number (order is of importance) |
| SubscriptionFlag | |
| ProductIssuerId | |
| ProductId | |
| PriceFlag | |
| PGWId | Payment gateway ID |
| PurchasePrice | |
| TimePriceFlag | |
| Time | Viewing time associated with purchase price |
| TimePrice | (Used for pricing such as 1$ per minute) |
| ViewTime | Viewing time associated with recurring price (e.g. 1 minute in case of 1$ per minute) |
| LoyaltyFlag | True if subscriber can earn loyalty points. |
| LoyaltySchemeId | Loyalty scheme such as air-miles or FFP (future use) |
| LoyaltyPoints | Number of points (future use) |
| ParentalFlag | True if access is restricted to certain minimal age |
| ParentalCode | Minimum age |
| TimeWindowFlag | True if access must be blocked during certain hours |
| TimeWindowStart | Local time to start blocking access |
| TimeWindowEnd | Local time to stop blocking access |
| DateWindowFlag | True if access must be blocked before or after certain date range |
| DateWindowStart | |
| DateWindowEnd | |
| FormattedAC | Formatted access criteria (future use for improved performance) |

MerchantId, ProfileId, CountryId, RegionId and SetId form the unique key.

Transaction Tables

The table CashMonitor represents a credit counter for the subscriber transactions and is used for monitoring purposes only.

| Field | Description |
| --- | --- |
| MerchantId | Merchant (content provider) |
| PGWId | Payment gateway |
| ResetDate | |
| Subscriptions | Total subscription revenues since reset date |
| PayPerView | Total PPV revenues since reset date |

MerchantId and PGWId form the unique key.

The table Transaction contains all the transactions.

| Field | Description | Unique Key |
| --- | --- | --- |
| MerchantId | Merchant | |
| Received | | |
| Type | Subscription/PPV | |
| CaAgentId | (0 if subscription) | |
| Transaction | | |

MerchantId and Received form the key.

Overview—Conditional Access Agent 28

A conditional access agent 28 operates as a secure gatekeeper to actual content provided via a content distributor 20. A conditional access agent 28, in one exemplary embodiment of embodiment, is co-located with a local content server 40 to "police" local subscriber accesses to protected content stored on that media server.

A conditional access agent 28 provides at least two functions namely (1) a verification function that includes verification of content destination (e.g., subscriber) requests for secure content against access criteria defined by a content provider 16, and (2) a gateway function including decryption, watermarking and re-encryption of secure content, depending on content security settings.

Dealing more specifically with the verification function and utilizing the example of a subscriber as a content destination 22, a conditional access agent 28 manages subscriber access to the content by evaluating the access criteria and the subscriber credentials. The agent 28 verifies and processes the subscriber request before (and during) the provision of the requested content. Access criteria are defined by the content provider 16, signed by a conditional access server 36 and distributed as described above. In one embodiment, the agent 28 selects the first appropriate access criteria set based on the user credentials. The selected access criteria set is sent to the subscriber for signature. This may require an explicit confirmation from the subscriber (in case of a payment) or this may be transparent (in case of a subscription). Subscription forms, originally generated by the subscription form server 70, are cached locally at the conditional access agent 28. If a subscription form is not available or out of date, the conditional access agent 28 retrieves the latest subscription form from the appropriate content provider 16.

Signed pay per view transactions are also cached by the conditional access agent 28 to allow a subscriber to view a movie multiple times within the allowed time window without charge.

Not all conditional access clients may support all types of access criteria. The conditional access agent 28 therefore interprets the client type before suggesting a specific access criteria set.

Turning now to the gateway function performed by a conditional access agent 28, after a subscriber (or user) has been granted access to the content, a request is sent to the local content server 40 to 'release' the content. This request contains all the necessary data, including the IP destination address/port, subscriber signed access criteria, the subscriber certificate and the key to decrypt the content (encrypted with the public key or secret group key of the conditional access agent 28). The content is then decrypted, watermarked and optionally re-encrypted with a different key (e.g., a unique user key).

The conditional access agent 28 interfaces with the secure device server 44 to:
 (1) Verify the current debit/credit level of the subscriber (e.g., in the cases of PPV or PPT transactions).
 (2) (If required) verify the age of the user associated with the secure device server 44.
 (3) Forward the signed PPV/PPT transactions to the secure device server 46 for clearing and administration purposes.
For this interface, the agent 28 acts as the client.

The conditional access agent 28 interfaces with the conditional access server 36 to query subscriptions. For this interface, the conditional access agent 28 acts as the client.

The agent 28 also interfaces with the conditional access server 36 to query access criteria and keys and to forward transactional information statistics.

The conditional access agent 28 interfaces with the conditional access client 48 to send a payment request, receive a transaction (signed payment request) and to pass any result messages (such as service denial based on insufficient debit/credit, regional blackout, etc). For this interface, the conditional access agent 28 acts as the server.

The conditional access agent 28 interfaces, in one exemplary embodiment, with a media client 49 and the content server 40 using the Real Time Streaming Protocol over TCP/IP (for control interfacing) or UDP/IP (for data interfacing). In this case, the conditional access agent 28 usually acts as a transparent proxy, but will carry out specific actions when the subscriber attempts to access secured content (such as evaluating the access criteria and the subscriber credentials).

Figure 5:
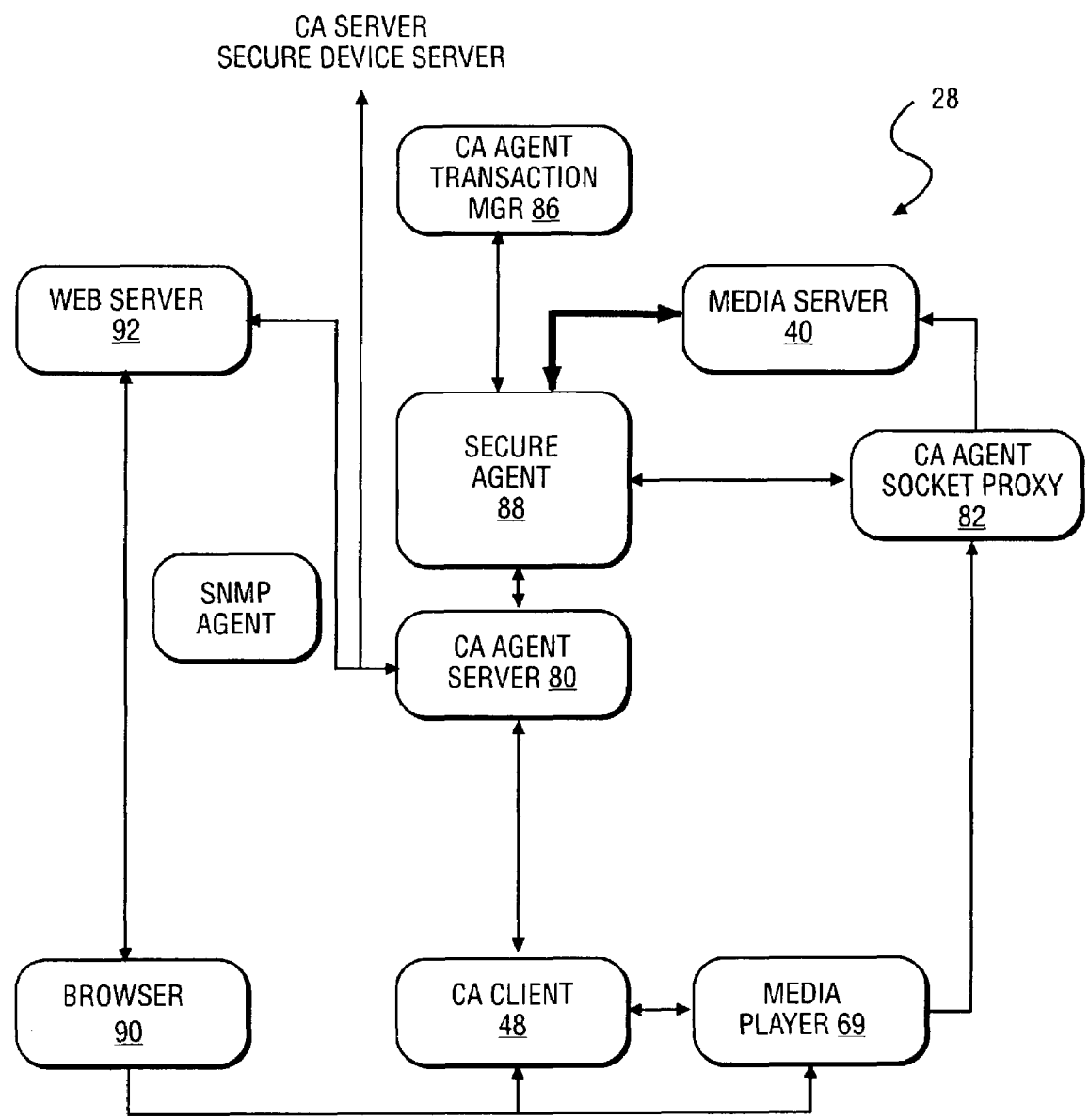
FIG. 5 is a block diagram illustrating various processes that constitute a conditional access agent, according to an exemplary embodiment of the present invention.

Architecturally, the conditional access agent 28 comprises a number of real-time processes that together provide the required functionality. FIG. 5 is a block diagram illustrating various processes that constitute the conditional access agent 28, according to an exemplary embodiment of the present invention. A conditional access agent server 80 communicates with external processes, such as the conditional access server 36, the secure device server 44 and the conditional access client 48 utilizing a number of interfaces. The conditional access agent server 80 provides a server implementation of a conditional access agent 28 for the client/agent interface. A conditional access client 48 uses this interface to connect to the conditional access agent server 80 to complete a secure XML-based transaction based on access criteria associated with a requested content item. At the end of a successful session, a product key is transmitted to the conditional access client 48.

A conditional access agent socket proxy 82 operates as a transparent proxy between a media player 84 and the content server 40 control channel, and is responsible for preventing unauthorized access to the content.

A conditional access agent transaction manager 86 forwards the transactions from a secure agent 88 to the secure device server 44 and sends the received receipt back to the secure agent 88 to delete the transactions.

The secure agent 88 is central to the conditional access agent 28, performs the following functions:
 (1) Keeps track of all secure (user) sessions (session id, user IP address, timers, etc).
 (2) Decrypts and watermarks content in a controlled fashion.
 (3) Maintains Store and Forward transactions.
 (4) Stores the conditional access agent private key, certificate and the conditional access server public key.
 (5) Stores the registered payment gateways and associated Certificate Revocation Lists (CRLs).

The secure agent 88 may, in one embodiment, be implemented in hardware to increase the level of content and transaction security.

An exemplary operational scenario involving the conditional access agent 28 will now be described with reference to FIG. 5:
 (1) Content destination 22 (e.g., user) selects content.
   The user requests a content description file, such as an ASX file, using a regular browser based on HTTP.
 (2) Trigger conditional access client 48.
   A browser 90 identifies a unique tag included in the content description file and is configured to forward the URL of the content description file (e.g., the ASX file) to the conditional access client 48. The client 48 sets up a connection with the conditional access agent server 80, based on the URL, to start a secure ordering process utilizing regular HTTP messages.

(3) Retrieving content description file.

The conditional access agent 28 retrieves the content description file from a Web server 92 using a regular HTTP GET request. From this content description file, the access agent 28 retrieves an access criteria URL.

(4) Selecting access criteria.

The conditional access agent 28 retrieves the access criteria using a regular HTTP connection with a proxy (which may have the access criteria cached from a previous session). The conditional access agent 28 registers a new session with the secure agent 88 using the information it has received (subscriber information, access criteria, etc). At session creation, the secure agent 88 verifies:

(1) That a payment gateway (associated with the user's token) is supported;

(2) That the serial number is not on the Certificate Revocation List; and (3) The (default) host of the secure device server associated with the user's token.

(5) Retrieving token information.

The conditional access agent 28 retrieves the secure device information (such as purse information) from the secure device server host to verify purse levels and optionally check age restriction settings.

(6) Constructing the order request/proposal.

Based on the user credentials, access criteria and local time, the conditional access agent server 80 constructs an order request (the offer) and sends this to the conditional access client 48 for approval (or decides to refuse access to this particular user). The order request is also registered with the secure agent 88, which stores this information together with the other session information.

(7) User signs order.

The user signs the order and sends the signature to the conditional access agent 28 using a regular HTTP POST message. The conditional access agent 28 forwards the signature to the secure agent 88. The secure agent 88 will verify all session information (access criteria, user credentials, local time, signature etc.) before granting access.

(8) Opening of the content 'gate'.

In a first exemplary embodiment, the content is stored in the clear and the security relies on the socket proxy to block unauthorized access. The socket proxy can query the secure agent 88 for session information. This is not secure as the content is not encrypted and there is no control over which files are streamed.

In a second embodiment, the content is encrypted and a key will therefore be required by the conditional access client 48 in order to decrypt the content. The socket proxy will now be a RTSP proxy to provide intelligent blocking to implement functionality such as Pay Per Time.

In case of personalized content security, the secure agent 88 controls the gate since the encrypted content will have to go through the to agent 88 to be decrypted, optionally watermarked, and re-encrypted. This feature is supported for standard compression algorithms, such as MPEG-2, MPEG-4 and MPEG-7.

The conditional access client 48 receives an OK (assuming a positive authentication and verification) from the conditional access agent 28 using a regular HTTP message, optionally including the session key encrypted under the user public key.

(9) Transaction forwarding.

Assuming all went well, the conditional access agent transaction manager 86 forwards the signed order to a secure device server for clearing purposes. The signed order is also sent to the conditional access server 36 for monitoring and statistics.

Overview—Conditional Access Client 32

The conditional access client 32 is executed on a subscriber terminal (e.g., a personal computer (or STB), and is responsible for presenting a user interface to a end user (e.g., a subscriber) and also for interfacing between the secure device 46 and other security sub-systems.

The conditional access client 48, in one embodiment, allows external applications (e.g., web clients or plug ins) to manage the secure device 46. The following management requests pertaining to the secure device 46 are, in one embodiment, supported:

(1) Changing of a user Personal Identification Number (PIN);

(2) Querying the status of the secure device 46 (e.g., error not inserted, ready, etc.);

(3) Publishing the status of the secure device 46; and (4) Querying the secure device serial number and certificate.

In addition to providing the above described management interface, the conditional access client 48 also operates to assign requests, received from the conditional access agent 28, and to advise a user accordingly. A signing request that does not require a PIN may be transparent to a subscriber.

Receipt of a request that requires a PIN to sign the request causes the client 48 to display descriptive information regarding the request (e.g., a movie title) to the subscriber in conjunction with a payment amount. The subscriber is asked to enter a PIN code. If the request relates to a subscription, the client 48 updates a subscription counter on local storage and, in one embodiment, on the secure device 46. This subscription counter is utilized by the conditional access client 48 to detect that new subscriptions may be available. If the secure device 46 and the conditional access client 48 do not allow for storage, the client 48 may maintain the subscription counter in memory.

If a subscription request is not successfully completed, the client 48 displays an error message to the user, the error message including an error code and an English-language error description. In one embodiment, the error code may be mapped to a local error string, instead of showing the English-language error description. The error message may also contain a URL, for example, identifying a site for which appropriate subscription may be obtained if the lack of such a subscription results in the error message.

Overview—Secure Device 46

A particular secure device 46 is, in one exemplary embodiment, associated with a particular end-user (e.g., a subscriber). In various exemplary embodiments, the secure device 46 may be a dedicated device specifically for use within the content distribution system 10; a shared device manufactured for use within a different system (e.g., a banking system), but also leveraged within the content distribution system 10; or an embedded device that is embedded within a closed media device (e.g., a smart card in a Set Top Box (STB)), or a SIM card in a mobile telephone that is again for use in alternative system, but leveraged within the content distribution system 10.

A minimum requirement for the secure device 46, in one exemplary embodiment, is that its supports digital signing using private/public key technology. Secure devices 46 embedded in close media devices need not adhere to specific requirements, other than providing sufficient security to warrant protection of a user private key. Shared secure devices (e.g., banking cards), in order to be utilized within the content distribution system 10, are required to adhere to at least a subset of the requirements defined below, this subset of requirements varying depending on the commercial and technical issues. A set of requirements, according to one exemplary embodiment of the present invention, for dedicated secure device are set out below.

In one embodiment, a dedicated secure device 46 hosts at least two private keys, namely a first private key for encryption and a second private key for signing. The private key for key encryption is available to external applications without user PIN submission. The private key for signing is only available to external applications after PIN submission.

The secure device 46 may have a co-processor for secure RSA signing with the secure device unique private key.

Storage within the secure device 46, in one embodiment, follows the PKCS#11 model and may offer:

Public storage, available for guests (read), admin (read/write) and user (read/write). This storage is used for public keys (label: "Public key" and "Public key encrypt"), certificates (label: "Certificate", 1500 bytes) and public free format system information (label: "System data", 400 bytes). The free format system information shall contain a valid XML string with various Entriq and other system defined tags.

Private storage, available for admin (read) and user (read/write). This storage is used for free format user information (label: "User data", 800 bytes). The free format user information shall contain a valid XML string with various Entriq and other defined tags.

Two-Factor secret, available for user (write/use). This storage is used for the signing private key (label: "Private key").

One-Factor secret, available for guests (use), admin (use) and user (write/use). This storage is used for the key decryption private key (label: "Private key decrypt").

The secure device 46 may also be pre-configured with two public/private key pairs, and a certificate signed with the private key of a commerce service provider 42 (or payment gateway). This private key of the payment gateway is hosted by a secure device 46 manufacturer to allow the secure device 46 to be pre-loaded with a valid certificate by delivery into the field. The certificate may, in one embodiment, be X.509 compliant.

The secure device 46 is furthermore personalized with a fixed PIN code, and may allow a user to set a new PIN after submission of a current user PIN.

Distributed Secure Agents

The content distribution system 10, as described above with reference to FIGS. 1–3, in one embodiment, proposes that content be encrypted at a content provider 16, and then distributed to regional content distributors 20 (e.g., broadband Internet Service Providers (ISP's)). Conditional access agents 28 are deployed at these content distributors 20 to evaluate content requests from content destinations operating conditional access clients 32 before delivery of the requested content occurs. Upon appropriate authorization of a request, at the content distributor 20 and under control of the conditional access agent 28, the requested content is decrypted and at least one association operation performed on the content before it is forwarded to the content destination 22. The association operation performed at the content distributor 20 may include personal watermarking of the content and/or personal re-encrypting of the content, as will be described in further detail below. With respect to a watermarking operation, the identity of a specific consumer at the content destination 22 is "embedded" in the watermarked content, and the identity of the content consumer can accordingly be detected if the derivative copy of the content is distributed in an unauthorized manner. Accordingly, a content consumer will be discouraged from forwarding copies of the content to others if an unauthorized derivative copy of the content can be traced back to the relevant content consumer utilizing a watermark.

A content consumer (i.e., requesting user) is, in one embodiment, is verified utilizing a public/private key, and additional certificates, that may be stored on a tamper-proof device (e.g., a smart card or mobile telephone). The certificate contains information that may be utilized to identify a secure device 46 associated with the content consumer. A conditional access agent 28 trusts a number of Certification Authorities (CA) and maintain a Certification Revocation List (CRL) of a Certification Authority to prevent unauthorized access with compromised secure devices 46.

The content distribution system 10, which deploys distributed conditional access agents 28 to represent the interests of content providers 16, provides a number of advantages. Firstly, moving security functionality, implemented by a conditional access agent 28 in the manner described below, away from an end user device (e.g., a secure device 46) increases security as this functionality is located outside the reach of hackers at a content destination 22. Secondly, there are economic benefits, as certain security functionality is removed from the content destination 22, and is thus more easily managed and maintained.

A further advantage is that personal re-encryption of content (e.g., utilizing a unique user key) requires that an unauthorized distributor redistribute the entire content, as opposed to just relevant keys.

Fourthly, personal watermarking of content at a remote conditional access agent 28 makes it difficult for a hacker to impact a watermarking process.

Fifthly, the use of public/private key technology at a conditional access agent 28, in the manner described below, makes the solution scalable.

The content distribution system 10 provides security functionality in a distribution system that "pushes" content to the edges of a network before it is delivered, possibly on demand, to content consumers.

Finally, the content distribution system 10, in one embodiment, utilizes secure tokens such as banking, GSM, or pay media smart cards that are already in wide distribution, thus allowing for a large content consumer network.

Figure 6A:
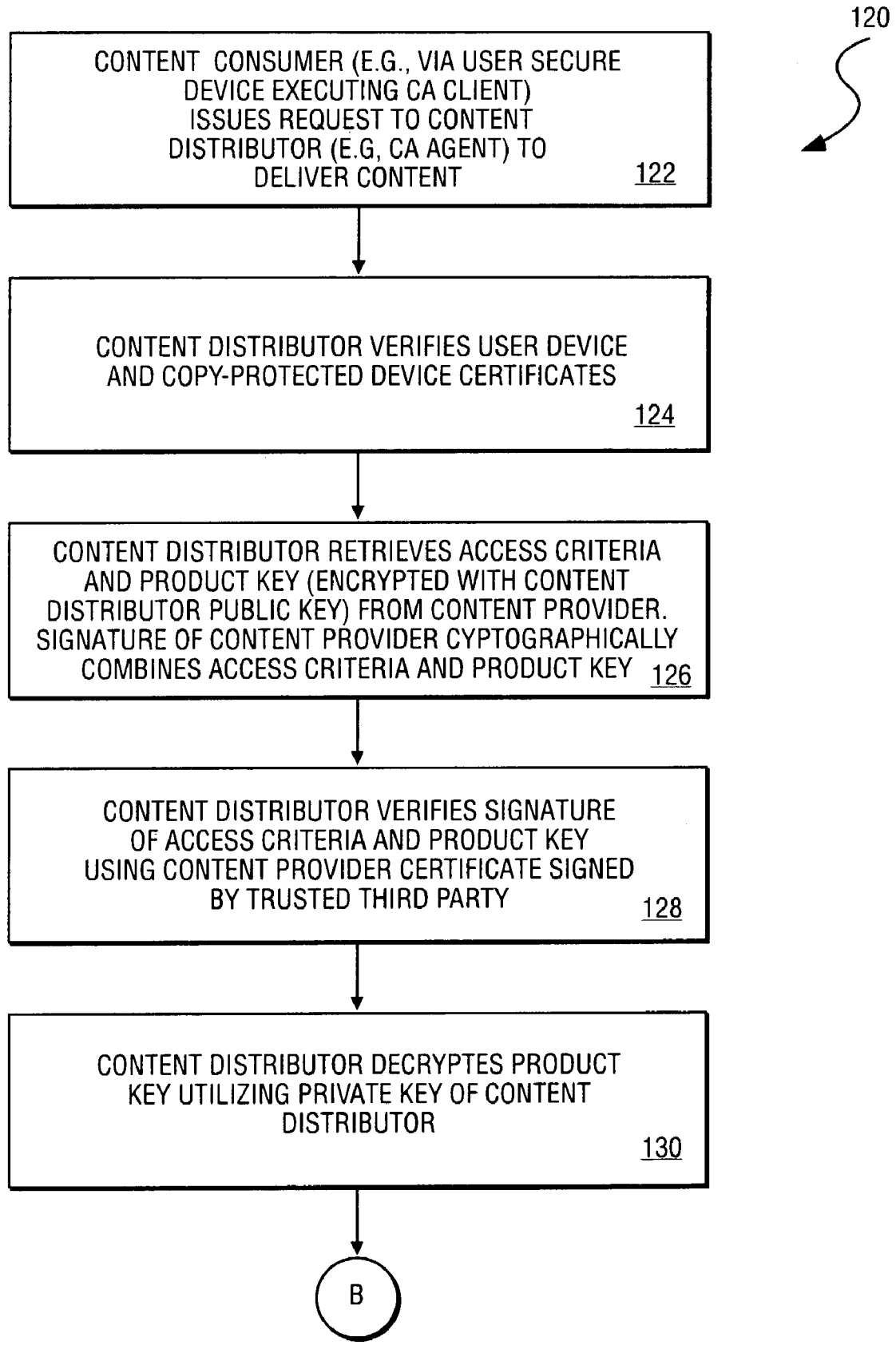
FIGS. 6A–6B show a flowchart illustrating a method, according to an exemplary embodiment of the present invention, of processing a content request received from a content destination.
Figure 6B:
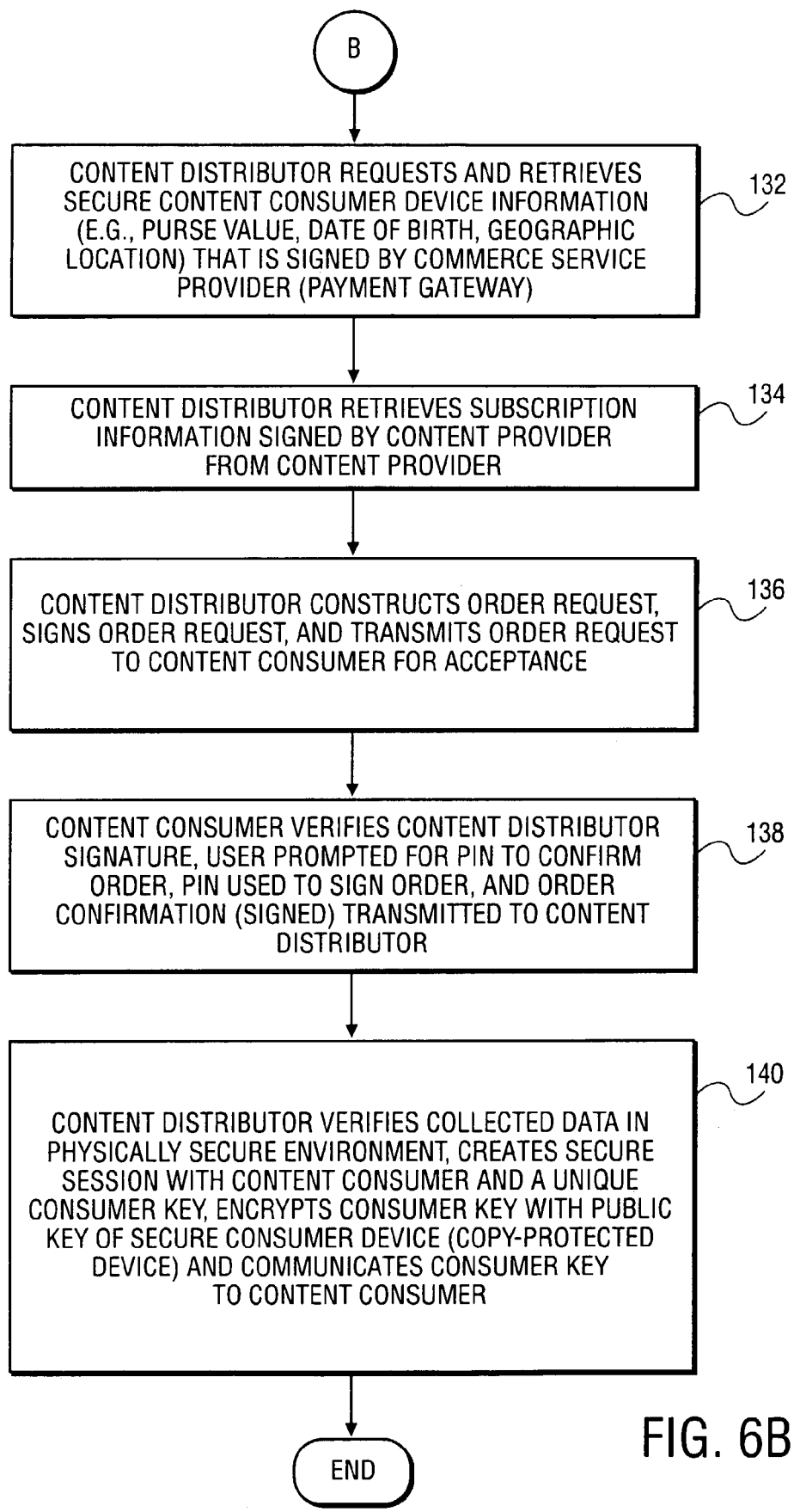

FIGS. 6A–6B show a flow chart illustrating a method 120, according to an exemplary embodiment of the present invention, of processing a content request received from a content destination 22. When discussing the method 120, it is assumed that the requested content is stored at, or redistributed from in the case of live multicasting, a local content server 40 (e.g., video file server or router) that operates in conjunction with a conditional access agent 28. If a conditional access agent 28 is unavailable, a user will fail to obtain access to the required keys.

At block 122, a content consumer, for example utilizing a secure device 46, issues a request via the network 18 to a content distributor 20, operating a conditional access agent 28, to deliver (e.g., via streaming) particular content. In response to the issuance of such a request, a conditional access client 48 executing on a user viewing device (e.g., a PC or set top box) initiates communications with an appropriate conditional access agent 28, via a network 18, to obtain the necessary keys. Specifically, at block 122, as part of the request, the conditional access client 48 communicates a user certificate (e.g., issued by a payment gateway) and optionally a copy-protected device certificate to the conditional access agent 28.

At block 124, the content distributor 20 utilizing the conditional access agent 28, verifies the received user certificate and optionally the copy-protected device certificate by verifying a challenge communicated by the client 48 to the agent 28 in association with the user device and copy-protected device certificates.

At block 126, the content distributor 20 utilizing the conditional access agent 28, retrieves access criteria and a product key related to the requested content from a content provider 16. As discussed above, the access criteria and the product key ($S_p$) are encrypted with a public key of the conditional access agent 28 so that only the specific conditional access agent 28 is able to access the product key.

The retrieval of the access criteria and product key involves the conditional access agent 28 issuing a request to a conditional access server 36, responsive to which the server 36 verifies regional constraints associated with the requested content in order to return the appropriate access criteria. Specifically, access criteria may differ per region, and accordingly per conditional access agent 28.

The conditional access server 36 secures the access criteria and product key by encrypting the product key with the public key of the conditional access agent 28, and signs the access criteria, including the encrypted product key, with the conditional access server 36 private key. The product key will thus only be available to the intended conditional access agent 28.

At block 128, the content distributor 20, and specifically the conditional access agent 28, verifies the signature of the access criteria and the product key using a certificate of the content provider 16, as provided by a trusted third-party. A public key of the trusted third-party would be well known, and embedded within the conditional access agent 28.

In an alternative embodiment, performance constraints imposed by large live events (e.g., a popular soccer game) may require that the access criteria and the product key are signed utilizing a shared secret key as opposed to the private key of the conditional access private key.

At block 130, the content distributor 16, and specifically the conditional access agent 28, decrypts the received product key associated with the requested content, utilizing a private key of the conditional access agent 28.

Turning now to FIG. 6B, at block 132, the conditional access agent 28 of the content distributor 20 requests information concerning a secure device 46 of a content consumer from the secure device server 44 of a commerce service provider 42 (e.g., payment gateway). This information concerning the secure device 46 may include a purse value, date of birth, geographic location, etc., and is signed by the commerce service provider 42. In an alternative embodiment, performance constraints imposed by a large live event may required that the information concerning the secure device 46 be signed utilizing a shared secret key as opposed to a private key of the commerce service provider 42.

At block 134, the conditional access agent 28 of the content distributor 20 receives subscription information from the conditional access server 36, this subscription information having been signed by the content provider server 34.

At block 136, utilizing the required information (e.g., the secure device information, access criteria, subscriptions, etc.), the conditional access agent 28 of the content distributor 20 constructs an order request based on a current date and time, signs the order request, and transmits the order request to a conditional access client 48 of the content consumer for acceptance. The conditional access agent 28 utilizes a secure clock to validate the current time against the access criteria settings of the content provider server 34. The order request may furthermore consist of a number of order options, if applicable (e.g., a pricing of $8.00, or $4.00 for a predetermined amount of time plus $1.00 per minute thereafter).

At block 138, the conditional access client 48 of the content consumer verifies a signature of the conditional access agent 28 with which the order request has been signed and prompts the user for a PIN to confirm the order. The PIN is utilized to sign the order utilizing the secure device 46, and a resulting order confirmation (signed) is transmitted back to the conditional access agent 28 of the content distributor 20.

At block 140, the conditional access agent 28 verifies the collected data (in a physically secure environment). The collected data includes access criteria, a user signature, a user certificate (signed by the commerce service provider 42), a copy-protected device certificate, subscriptions, current purse levels, and a user date of birth.

If the request passes the verification process, the conditional access agent 28 then establishes a secure session with the conditional access client 48, and generates a unique user key ($U_k$). The unique user key ($U_k$) is then encrypted with a public key of a copy-protected device associated with the secure device 46, and communicated to the conditional access client 48 using the secure session. If a copy-protected device is not available, and not required according to the access criteria, the unique user key may be encrypted utilizing a public key of the secure device 46.

Figure 7:
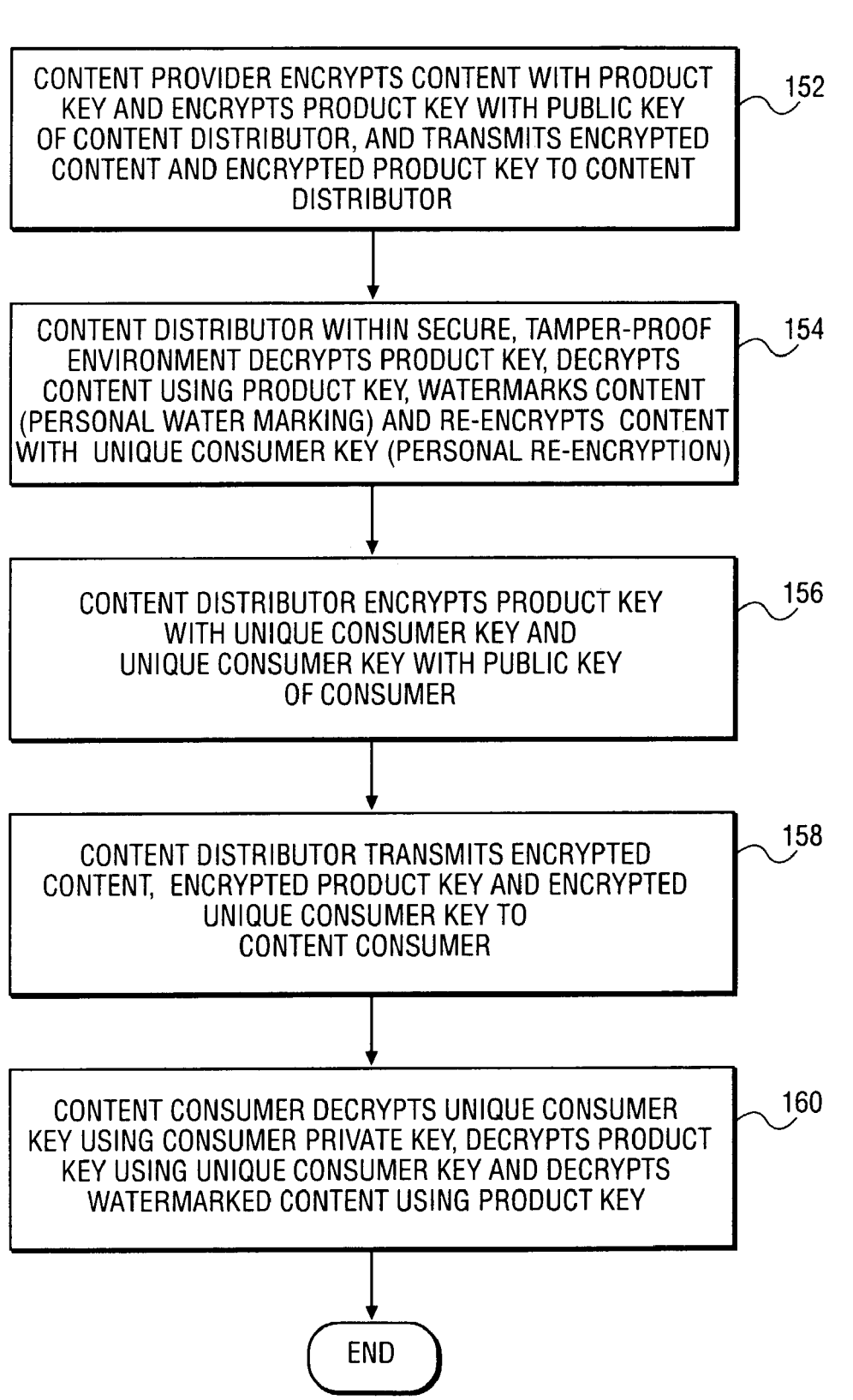
FIG. 7 is a flowchart illustrating a method, according to an exemplary embodiment of the present invention, of securely delivering content from a content provider to a content destination via a content distributor, where the content distributor performs an association operation relating to the content.

FIG. 7 is a flowchart illustrating a method 150, according to an exemplary embodiment of the present invention, of securely delivering content from a content provider 16 to a content consumer via at least one content distributor 20, where the content distributor 20 performs an association operation (e.g., watermarking or encryption) relating to the content. In the method 150, the at least one content distributor 20 is uniquely authorized to perform the operation relating to the content.

The method 150 commences at block 152 with the encryption by a content provider 16, and more specifically a conditional access server 36, of content with a product key ($S_p$). This encrypting of the content is automatically performed prior to a scheduled distribution of particular content to multiple content distributors 20 for local distribution to content destinations 22. Alternatively, the encryption of the content may be performed, in the event of a live event, on the fly and concurrently with provision of the content from the content provider 16 to a content distributor 20. In yet a further embodiment, the encryption of the content may be performed responsive to receipt of a request, at the content provider 16, for the specific content from a particular content destination 22.

Having encrypted specific content with the product key ($S_p$), the conditional access server 36 of the content provider 16 then encrypts the product key ($S_p$) with a public key of a specific content distributor 20. In one embodiment, the public key in which the product key is encrypted is the pubic key of a secure device accessed by a conditional access agent 28.

The content provider 16 then transits the encrypted content and the encrypted product key to the content distributor 20.

At block 154, the content distributor 20, and more specifically the conditional access agent 28, operates to decrypt the product key within a secure, tamper proof environment. A tamperproof environment may be provided by tamperproof hardware, such as an nCypher cryptographic hardware card, tamperproof software, or by a regular PC physically protected from unauthorized access.

Having then decrypted the product key, the content distributor 20, and specifically the conditional access agent 28, proceeds to decrypt the content utilizing the product key, again within the secure, tamper proof environment facilitated by a secure device.

Having decrypted the content, the conditional access agent 28 then operates to perform an association operation relating to the content. In one exemplary embodiment, this operation constitutes watermarking a copy of the content for distribution to a specific content destination 22, a specific content consumer, or an identified group of content destinations 22 or content consumers. Watermarking is a mechanism to, in one embodiment, embed arbitrary data into an audio or video signal, where the embedded data is not easily detectable and/or removable from the resulting signal. "Individual watermarking" is a process of watermarking a signal for a specific content destination 22 (e.g., a content consumer or user) such that the identity of the content consumer can be traced back in case the resulting signal is subject to unauthorized distribution. The watermarking of the content allows a content distributor 20 (or a content provider 16) to associate a specific copy of the content, uniquely watermarked, with a specific content destination 22.

Having performed the operation relating to the content, the conditional access agent 28, again within the secure tamper-proof environment, generates a unique user key ($U_k$), and re-encrypts the content with this unique user key.

As all operations within block 154 are performed within the secure, tamper-proof environment, it will be appreciated that the interests of the content provider 16 are well protected, and that the product key is not exposed outside the secure environment. Further, only an authorized entity (e.g., a specific conditional access agent 28) is authorized to reveal the product key within the secure environment as the private key of a secure device of the agent 28 is required to decrypt the product key. In this way, the content provider 16 exercises strict and rigorous control of which entity is able to decrypt the product key.

In one exemplary embodiment, at block 156, the content distributor 20, utilizing the conditional access agent 28 and within the secure tamper-proof environment, encrypts the product key with the unique user key ($U_k$). The content distributor 20 then also encrypts the unique user key with a public key of the content destination 22. At block 158, the content distributor 20 transmits the encrypted content, the encrypted product key, and the encrypted unique user key to the content consumer at a content destination 22.

At block 160, the content consumer at the content destination 22 decrypts the unique user key utilizing a private key of the secure device 46, then decrypts the product key utilizing the unique user key, and finally decrypts the watermarked content utilizing the decrypted product key.

As discussed above, the method 150 is particularly advantageous in that it enables a content provider 16 to authorize a specific content distributor 20 to perform an operation relating to the content, and in one embodiment, to contribute to combating authorized distribution. Such operations may include, for example, watermarking or further encryption of the content. In addition to the authorization being specific to a content distributor 20, the method 150 is also advantageous in that the operation is performed in a secure, tamperproof environment within which the interests of the content provider 16 are protected and the product key is subject to very limited and controlled exposure.

In this way, a content provider 16 is provided with assurances that distributed secure agents (e.g., conditional access agents 28) located at various distribution points operate to protect the interests of the content provider 16. The content provider 16 is thus provided with a degree of security and assurance regarding operations that are performed by content distributors 20 and the content provider 16 is thus likely to entrust distribution of sensitive and very valuable content to such a content distributor 20.

Further, by performing the operation at block 154 (e.g., watermarking or encrypting) prior to actual delivery of the content to a consumer (i.e., within the network), the risks of piracy are reduced. Upgrades to a secure agent (e.g., the conditional access agent 28) are also more easily implemented than upgrades to processes at consumer locations.

In conclusion, the method 150 enables an association operation (e.g., a watermarking process) to be distributed to content distributors 20 located at ISPs and therefore closer to content consumers. This is advantageous in that it enables load management. The method 150 also addresses concerns of a content provider 16 regarding security resulting from that, in order to perform certain operations on the content (e.g., a watermarking operation) at a distributor 20, the content must "be in the clear" in order to properly perform the operation. The method 150 addresses this concern by providing a secure environment in which the operation is performed, and providing the content provider 16 with control over which content distributors 20 are authorized to generate clear content within the secure, tamper-proof environment with the purposes of performing such operations.

Methodology—Variable Key Content Differentiation

So-called "key hook piracy" occurs when an authorized, but fraudulent, user distributes decryption keys, that may be utilized to decrypt content to unauthorized users. Distributing such a single decryption key over networks, such as the Internet, can be done effectively.

Figure 8A:
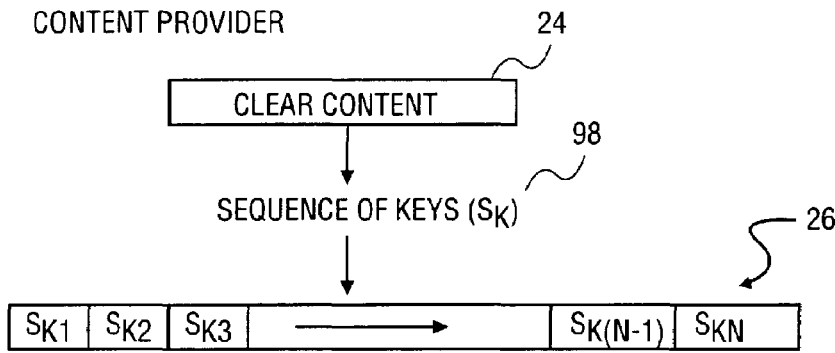
FIGS. 8A–8B are block diagrams illustrating, at a high level and according to an exemplary embodiment of the present invention, a method of combating key-hook piracy by encrypting clear content with a relatively large number of random, time varying session keys.
Figure 8B:
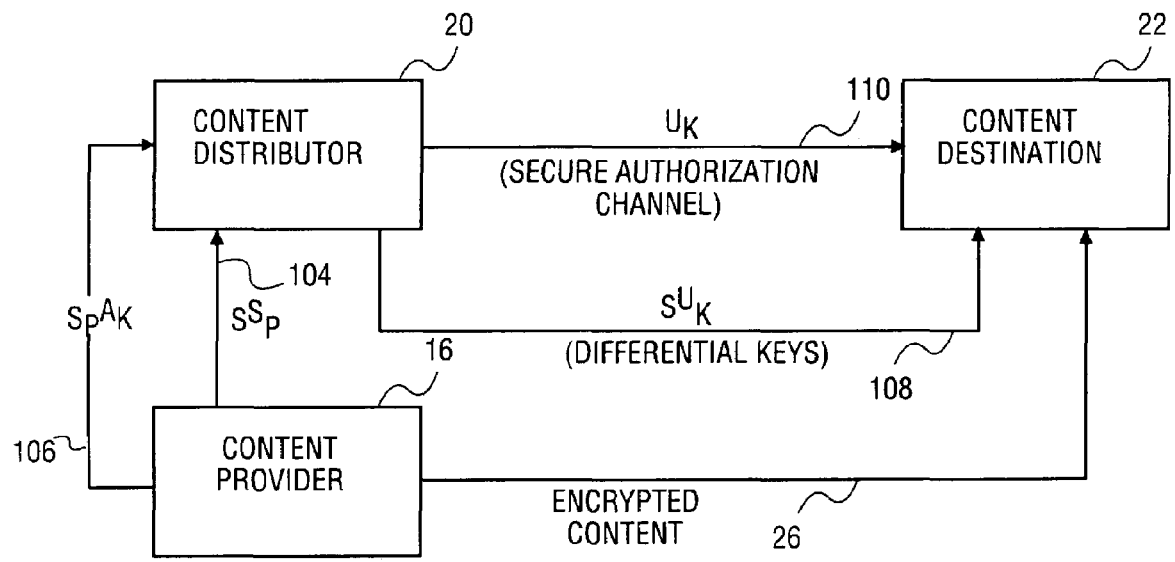

FIGS. 8A and 8B are block diagrams illustrating, at a high level, a method, according to an exemplary embodiment of the present invention, of combating "key hook piracy". With specific reference to FIG. 8A, the present invention proposes encrypting clear content 24 with a relatively large number of session keys 98 to generate encrypted content 26. In one embodiment, the session keys 98 comprise a sequence of random, time-varying session keys.

FIG. 8B illustrates further details regarding the distribution of content and the session keys 98, according to an exemplary embodiment of the present invention. The content provider 16 is shown to firstly distribute encrypted content 26 (i.e., clear content 24 encrypted with the session keys 98). In one embodiment, the content provider 16 may distribute the encrypted content 26 directly to a content destination 22. In an alternative embodiment, the encrypted content 26 may be distributed to a local content server 40 at a content distributor 20, and cached by the local content server 40 for eventual distribution to a content destination 22.

The conditional access server 36 at the content provider 16 also operates to encrypt each of the session keys of the sequence of the time-varying session keys with a product key ($S_p$), and to distribute the encrypted session keys to the conditional access agent 28, as indicated at 104. The conditional access server 36 also operates to encrypt the product key ($S_p$) with the public key of a specific conditional access agent 28, and then to distribute the encrypted product key to the specific conditional access agent 28, as indicated in FIG. 8B at 106. During delivery to a conditional access client 48, the conditional access agent 28 replaces the session keys encrypted with the product key ($S_p$) with session keys encrypted with a unique user key ($U_k$), instead of the product key ($S_p$). Specifically, prior to deliver to a conditional access client 48, the conditional access agent 28 decrypts the encrypted product key received from the conditional access server 36 utilizing the private key (or secret key) of the conditional access agent 28, decrypts the sequence of session keys encrypted with the product key, and then re-encrypts the sequence of session keys utilizing the unique user key ($U_k$). The re-encrypted sequence of session keys is then distributed from the conditional access agent 28 to the conditional access client 48, as indicated at 108. The conditional access agent 28 also distributes the unique user key ($U_k$) to the conditional access client 48 via a secure authorization channel, as indicated in FIG. 8B at 10.

At the conditional access client 48, the user key ($U_k$) is utilized to decrypt the re-encrypted sequence of session keys, the decrypted session keys then in turn being available to decrypt the encrypted content 26.

It will be appreciated, utilizing the above-described system, the product key ($S_p$) remains protected from access at a content destination 22 as it is only communicated from the conditional access server 36 to the conditional access agent 28, and is at no time exposed to the conditional access client 48. For additional security, the decrypting of the product key is performed at the conditional access agent 28 utilizing a tamperproof device (e.g., a smart card).

The user key ($U_k$) is by itself useless to users other than the recipient that receives this user key via the secure authorization channel. An authorized user is furthermore discouraged from performing "key hook piracy" in that such an authorized user will be required to send all session keys to an unauthorized user to enable the unauthorized user to access the encrypted content. By generating a large number of session keys, the effort to forward such session keys to unauthorized users approaches the effort of forwarding the entire encrypted content.

Figure 9:
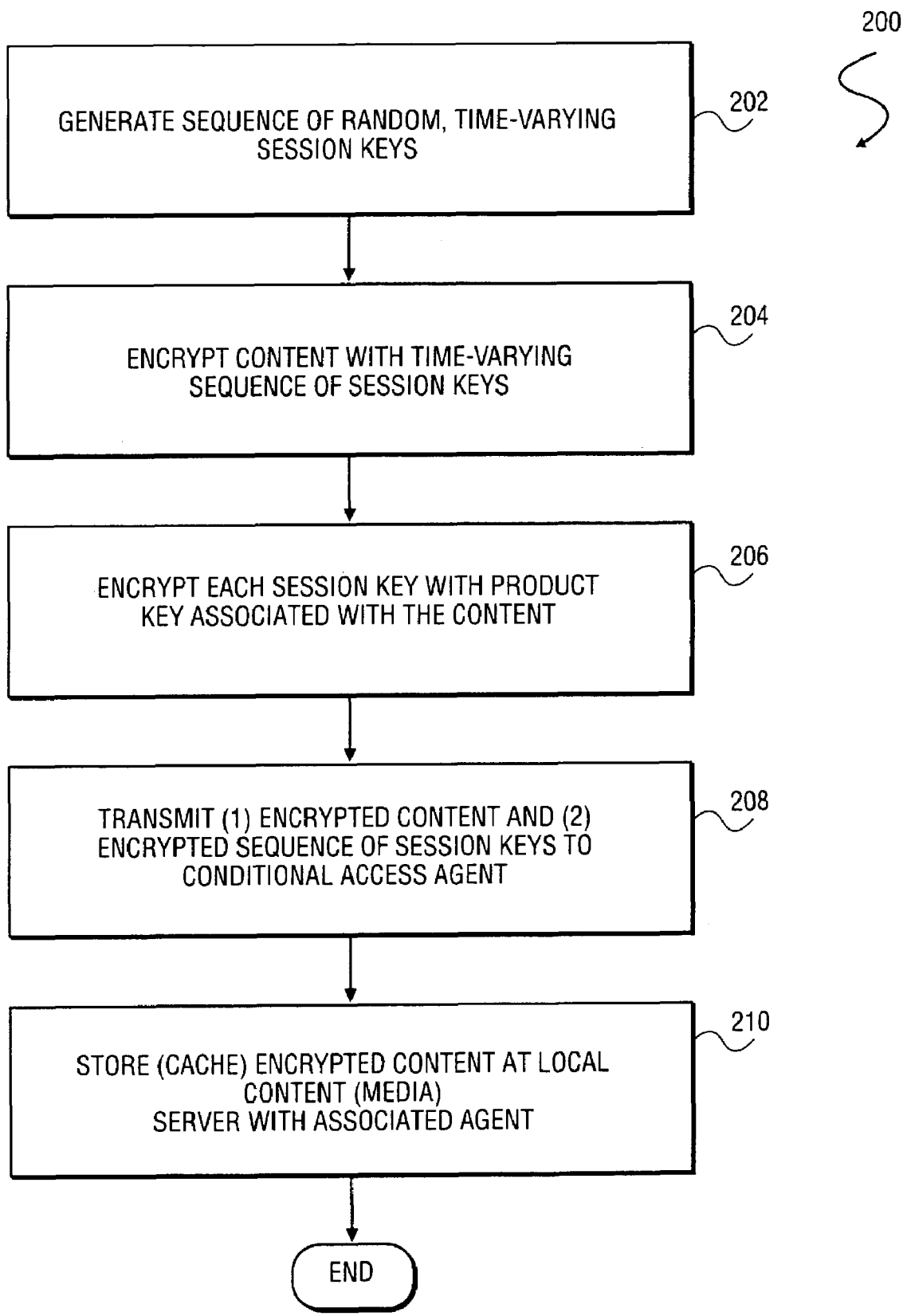
FIG. 9 is a flowchart illustrating a method, according to an exemplary embodiment of the present invention, of encrypting content utilizing a random, time varying sequence of session keys to combat key-hook piracy.

FIGS. 9–10 illustrate a number of flow charts providing further details regarding the operations performed at the conditional access server 36, the conditional access agent 28 and the conditional access client 48.

FIG. 9 is a flow chart illustrating a method 300, according to an exemplary embodiment of the present invention, of encrypting content utilizing a random, time-varying sequence of session keys, so as to combat "key hook piracy". The method 200 commences at block 202 with the generation, at a conditional access server 36, of a sequence of random, time-varying session keys 98. As described with reference to FIG. 2, the conditional access server 36 may be deployed at a content provider 16, or at a conditional access service provider 38 that is accessed by a content provider 16.

At block 204, specific content is encrypted utilizing the random, time-varying sequence of session keys prior to distribution of the content from a content provider 16. Content is typically but not necessarily encrypted using symmetric block or stream ciphers such as DES, AES (Rijndael) or RC4.

At block 206, the conditional access server 36 encrypts each session key with a product key ($S_p$), the product key being uniquely associated with the relevant content. The session key is typically but not necessarily encrypted using symmetric block ciphers such as DES or AES (Rijndael).

At block 208, the content provider 16 transmits the encrypted content to a content distributor 20, for storage on the local content server 40. Alternatively, the content provider 16 may, in one embodiment, distribute the encrypted content directly to a content destination 22.

At block 208, the content provider 16 distributes the encrypted sequence of session keys 98, as indicated at 104 in FIG. 8B, to one or more conditional access agents 28, deployed at one or more content distributors 20.

At block 210, a content distributor 20 stores (or caches) the encrypted content on a local content (or media) server 40 that is associated with a conditional access agent 28.

It will be appreciated that, upon completion of the method 200, a content provider 16 has delivered to a content distributor 20 encrypted content that a content distributor 20 is uniquely enabled to access. The content distributor 20 is enabled o perform one or more operations with respect to the encrypted content and/or the sequence of session keys.

Figure 10A:
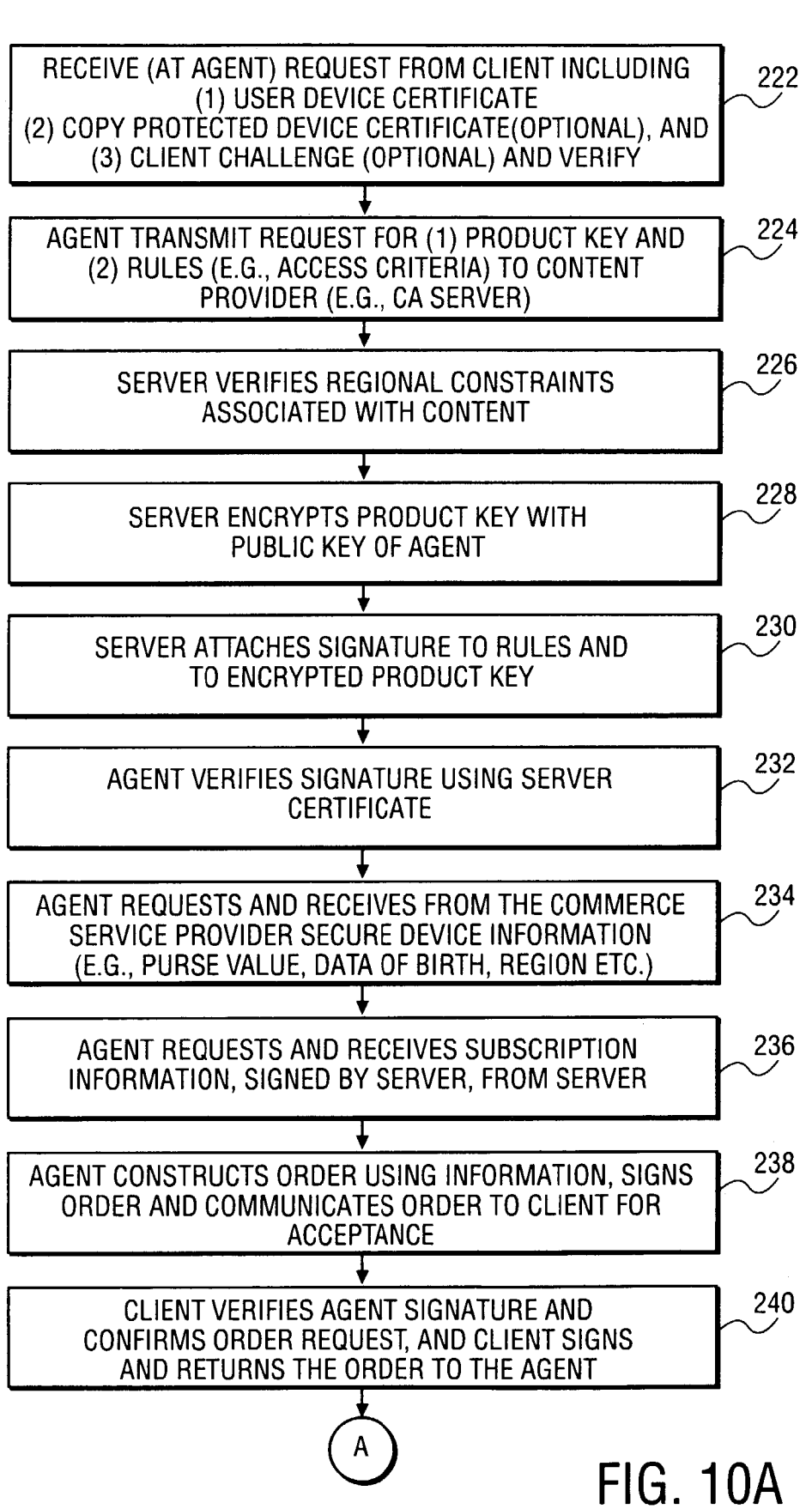
FIGS. 10A–10B show a flow chart illustrating a method, according to an exemplary embodiment of the present invention, of distributing cached content from a content distributor to a content destination, responsive to a request for the content from the content destination.
Figure 10B:
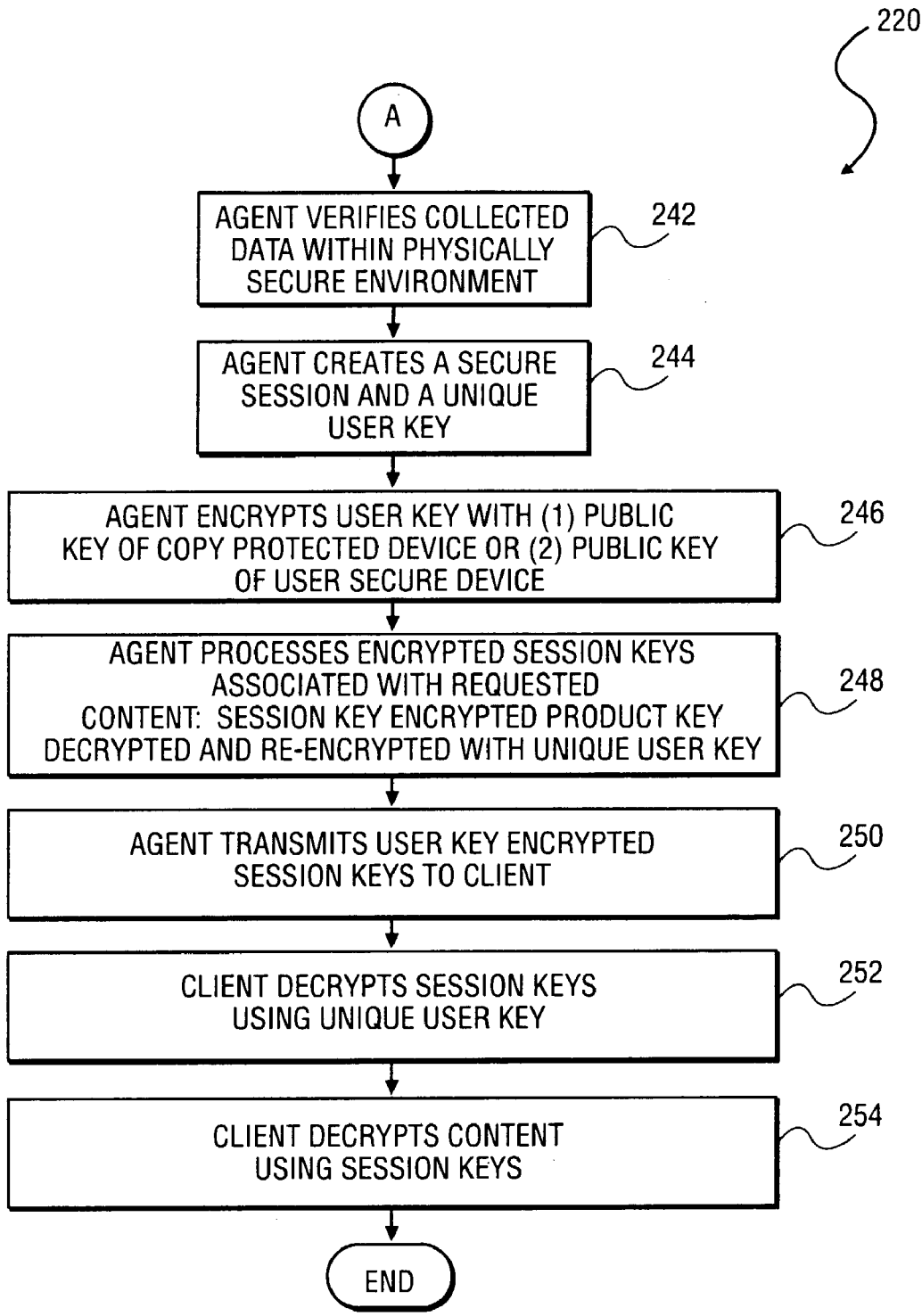

FIG. 9 describes the method 200 whereby a content provider 16 provides encrypted content, and an associated sequence of session keys, to a content distributor 20 for caching at the content distributor 20. FIGS. 10A–10B show a flowchart illustrating a method 220, according to an exemplary embodiment of the present invention, of distributing the cached content from a content distributor 20 to a content destination 22, responsive to a request for the relevant content from the content destination 22. Accordingly, the method 220, in one embodiment, assumes that requested content is cached at a local content server 40 of a content distributor 20. In an alternative embodiment, the method 220 may be performed where content is broadcast in a near real-time manner (e.g., for a live sporting event).

The method 220 commences at block 222 with the receipt of a request at a conditional access agent 28 of a content distributor 20 for content from a conditional access client 48. The request includes a user device certificate, issued by a commerce service provider 42 (e.g., a payment gateway) to identify the requesting user. The request also includes a copy-protected device certificate to identify the viewing device and a client challenge that is used to authenticate the agent 28 to the client 48.

At block 224, the conditional access agent 28 transmits a request to a conditional access server 36, associated with a content provider 16 that is an owner or provider of the requested content, for (1) the product key ($S_p$) in which to decrypt the content and (2) rule information or access criteria, associated with the requested content.

At block 226, the conditional access server 36 verifies regional constraints associated with the content in order to return the appropriate access criteria. Specifically, access criteria may differ by region, and accordingly per conditional access agent 28.

At block 228, the conditional access server 36 encrypts the product key with a public key of a secure device associated with the requesting conditional access agent 28, thereby ensuring that only the specific conditional access agent 28 is able to access the product key.

At block 230, the conditional access server 36 attaches a signature to the rule information, or access criteria, and to the encrypted product key, to thereby cryptographically bind the access criteria with the product key.

At block, 232, the conditional access agent 28 receives the access criteria and product key, and verifies the signature of the access criteria and the product key utilizing a supplied certificate for the conditional access server 36, which is signed by a trusted third party. The public key of the trusted third party is well known and, in one embodiment, embedded within the conditional access agent 28.

At block 234, the conditional access agent 28 requests and receives from the commerce service provider 42 secured device information (e.g., a purse value, date of birth, regional control information, etc.). This secure device information pertains to the secure device 46 of the content consumer and is signed by the commerce service provider 42.

At block 236, the conditional access agent 28 requests and receives subscription information from the conditional access server 36, this subscription information again being signed by the conditional access server 36.

At block 238, the conditional access agent 28 constructs an order request utilizing the acquired information (e.g., the secure device information, access criteria and subscription information), signs the order request, and communicates the order request to the conditional access client 48 associated with the content destination.

At block 240, the conditional access client 48 verifies the signature of the conditional access agent 28, confirms the order request, and signs and returns an order confirmation to the conditional access agent 28.

Turning now to FIG. 10B, at block 242, the conditional access agent 28 verifies the collected data (e.g., access criteria, user signature, user device certificate, copy-protected device certificate, subscriptions, current purse levels and user date of birth) within a physically secure environment implemented at the content distributor 20.

At block 244, the conditional access agent 28 creates a secure session with the conditional access client 48, and generates a unique user key.

At block 246, the conditional access agent 28 encrypts the unique user key with (1) the public key of a copy-protected device or (2) a public key of the secure device 46 associated with a content consumer at the content destination 22.

At block 248, the conditional access agent 28 processes the encrypted session keys 98 associated with the content, the sequence of encrypted session keys 98 having been received at the conditional access agent 28 at block 208 of the method 200 described above with reference to FIG. 9. Specifically, at block 248, each session key, as encrypted with the product key, is decrypted and then re-encrypted with the unique user key. As will be recalled, the product key was encrypted with the public key of the conditional access agent 28, and communicated to the conditional access agent 28 at block 228 shown in FIG. 10A. The personal re-encryption of the sequence of session keys utilizing the unique user key is useful in that it requires a "hacker" to redistribute the entire sequence of session keys.

At block 250, the conditional access agent 28 transmits the sequence of session keys encrypted with the unique user key to the conditional access client 48 at the content destination 22.

At block 252, the conditional access client 48 decrypts the sequence of session keys, utilizing the unique user key, which was received by the conditional access client 48 at block 256 from the agent 28.

At block 254, the conditional access client 48 then decrypts the encrypted content utilizing the decrypted session keys.

Conditional Access Service Provider 38

According to a further aspect of the present invention, and as described briefly above with reference to FIG. 2, a pay media conditional access service provider 38 operates to provide "outsourced" content security function to multiple content providers 16. Utilization of security functions provided by such a service provider 38 may be attractive to content providers 16, as the setup, maintenance and operational costs associated with providing such security functions in-house (e.g., by operating an in-house conditional access server 36) may be high for a single content provide 16*r*.

The content security functions, according to an exemplary embodiment of the present invention, that may be provided by a conditional access service provider 38 include the secure storage and distribution of content encryption keys and associated access criteria (or rules), and also the provision of a secure and scalable key distribution system that is able to manage a potentially large number of content consumers.

Figure 11:
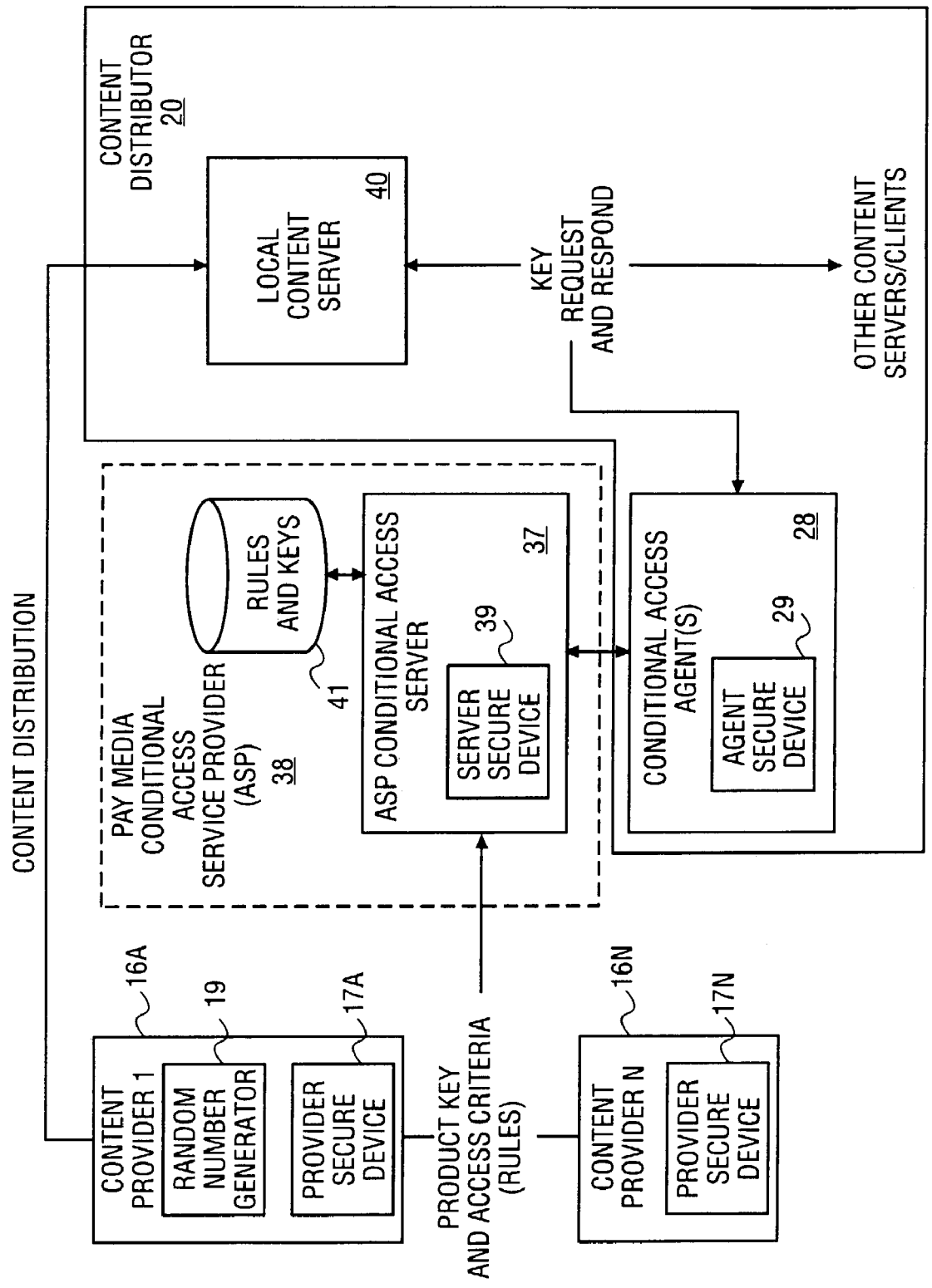
FIG. 11 is a block diagram illustrating a pay media conditional access service provider, according to an exemplary embodiment of the present invention, and illustrates an interaction of a conditional access service provider with multiple content providers, as well as with one of multiple conditional access agents.

FIG. 11 is a block diagram illustrating a pay media conditional access service provider 38, according to an exemplary embodiment of the present invention, and shows an interaction of the conditional access service provider 38 with multiple content providers 16, as well as one of multiple conditional access agents 28. At a high level, content is encrypted at either the content provider 16 or alternatively at the service provider 38, after which a key and access criteria (or rules) are registered with the conditional access service provider 38. The service provider 38 thereafter assumes responsibility for management of user authentication and key distribution, in the manner described below. In this way, conditional access services are provided by the service provider 38, instead of the traditional approach that requires a substantial investment from each content provider 16.

As stated above, a number of advantages flow from having multiple content providers 16 share a common key storage and distribution infrastructure (e.g., the service provider 38). However, a number of challenges face such a service provider 38. Specifically, a number of security issues require attention to secure product key creation, storage and distribution. Exemplary security issues that are addressed by the present invention include:

1. Random product key generation: It will be appreciated that a product key generated by content provider 16, in one embodiment, is random (i.e., approaching a true random key) and created in an environment trusted by the content provider 16.
2. A product key is protected from access by a pay media conditional access provider 38 while stored in a database maintained by the service provider 38.
3. A product key is protected during transport between the service provider 38 and the content provider 16.
4. An association of a product key with access criteria (or rules) is restricted to authorized users only.

The specific methodologies by which the above issues are addressed are described in further detail below with reference to the flow charts shown in FIGS. 12–15.

Referring again to FIG. 11 by way of architectural description, a pay media conditional access service provider 38 is shown to deploy an ASP conditional access server 37, which cooperates with a server secure device 39. The conditional access server 37 operates to perform substantially the same functions as a conditional access server 36 that may be deployed by a content provider 16, and is described above. The server secure device 39 is utilized by the conditional access server 37 to provide a secure, tamper-proof environment within which to perform certain operations, as will be described in further detail below.

A conditional access agent 28 is also shown to deploy an agent secure device 29, which is similarly used by the agent 28 to provide a secure, tamper-proof environment in which to perform certain operations. Each content provider 16 also deploys a provider secure device 17 to again provide a secure, tamper-proof environment for certain sensitive operations.

Figure 12:
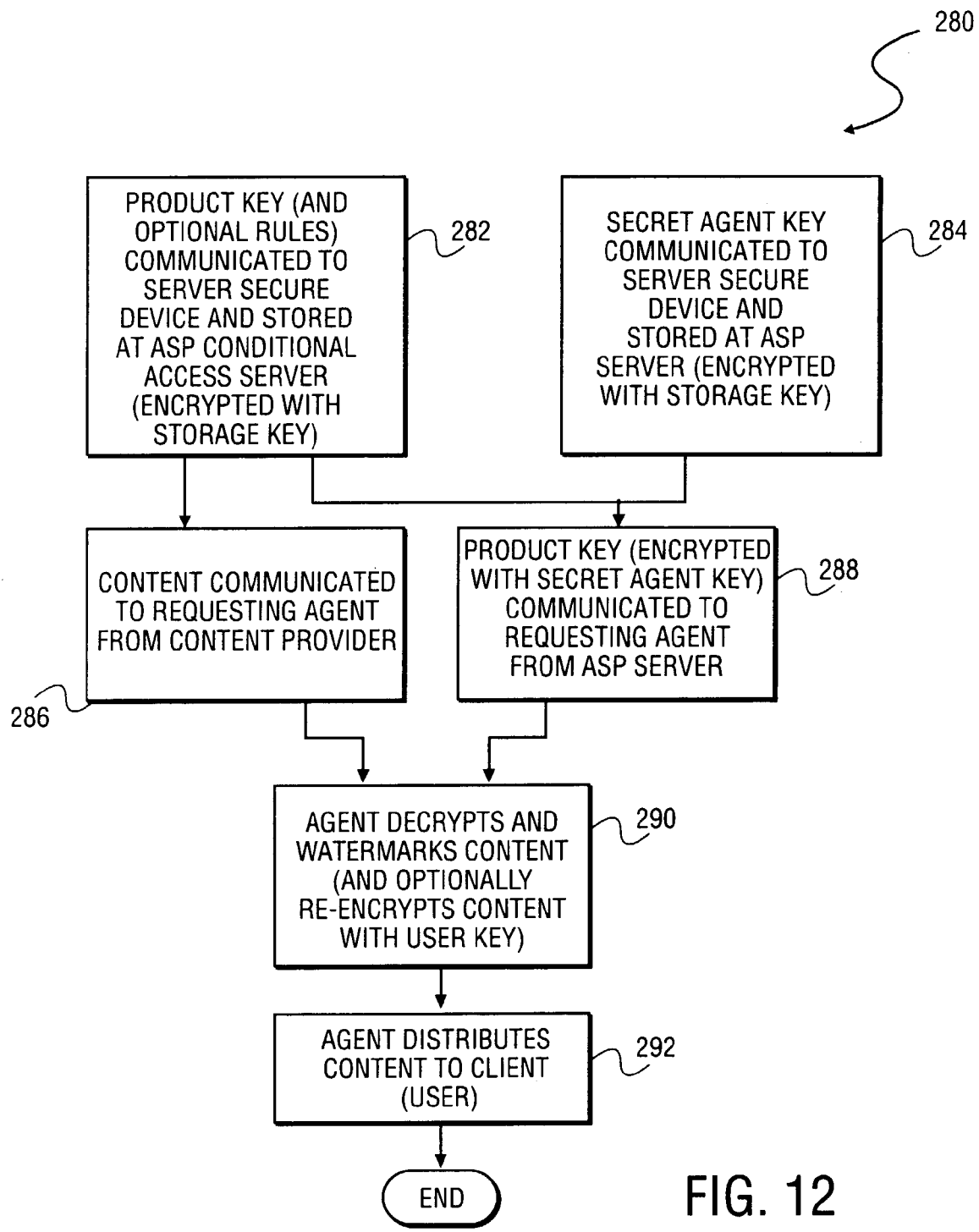
FIG. 12 is a flowchart illustrating a method, according to an exemplary embodiment of the present invention, whereby a conditional access service provider provides security functions to multiple parties within a content distribution system.

FIG. 12 is a flow chart illustrating a high level method 280, according to an exemplary embodiment of the present invention, whereby a conditional access service provider 38 provides security functions to multiple parties within a content distribution system 10.

At block 282, a product key, and optionally the access criteria (or rules), are communicated from a content provider 16 to the service provider 38, and specifically to the server secure device 39 of the service provider 38. The product key and the access criteria are then encrypted, within the server secure device 39 with a storage key, and stored by the conditional access server 37.

At block 284, a secret agent key is communicated from a conditional access agent 28 to the secure server device 39 of the service provider 38, encrypted with a storage key within the server secure device 39, and stored at the service provider 38.

At block 286, a content provider 16 distributes content, encrypted with the product key, to a local content server 40 of a content distributor 20. As described above, the local content server 40 operates to cache the encrypted content, in one exemplary embodiment, for regional distribution. As also illustrated in FIG. 11, the local content server 40 operates in conjunction with a conditional access agent 28 deployed by content distributor 20.

Returning to FIG. 12, at block 288, responsive to a request from a conditional access agent 28, the product key, encrypted by the service provider 38 with the secret agent key, is communicated to the conditional access agent 28 from the ASP conditional access server 37.

At block 290, the conditional access agent 28 decrypts, and optionally performs a personalization (or association) operation with respect to the content so that the content is uniquely associated with a particular content destination 22 (e.g., a particular user). This personalization (or association) operation may comprise a watermarking operation to watermark the content and thereby generate a derivative of the original content that is unique to the relevant content destination 22.

The personalization (or association) operation may also include re-encrypting the content with a unique user key, as described above.

At block 292, the conditional access agent 28, in conjunction with the local content server 40, distributes the content to a content destination 22 (e.g., a user).

Figure 13:
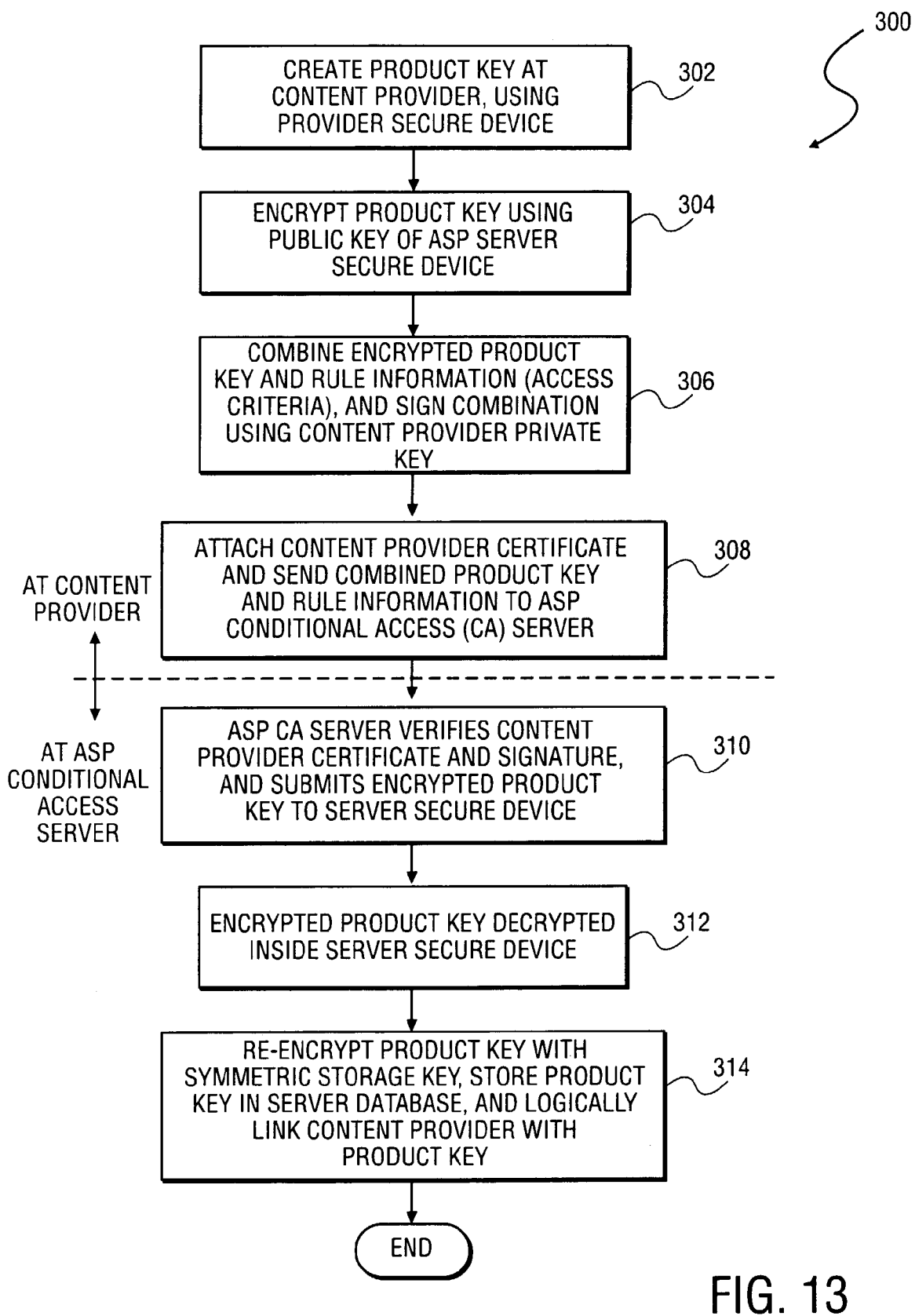
FIG. 13 is a flowchart illustrating a method, according to an exemplary embodiment of the present invention, of generating a product key at a content provider and storing the product key at a conditional access provider.

FIG. 13 is a flow chart illustrating a method 300, according to an exemplary embodiment of the present invention, of generating a product key at a content provider 16 and storing the product key at a conditional access service provider 38.

At block 302, a product key is created at the content provider 16 utilizing a random number generator 19 and optionally a provider secure device 17, to thereby provide a high degree of randomness for the product key. It would be appreciated that a high degree of randomness is desirable to provide an increased level of security for the product key.

At block 304, the product key is encrypted utilizing a public key of the server secure device 39 of the pay media conditional access service provider 38.

At block 306, rule information (e.g., access criteria) associated with the content encrypted utilizing the product key is identified. The encrypted product key is then optionally combined with this rule information by signing both the product key and the rule information utilizing a private key of the content provider 16.

At block 308, a content provider certificate is attached to the encrypted product key (and optionally the combined rule information), and the encrypted product key, rule information, and provider certificate are communicated to the ASP conditional access server 37 operated by the service provider 38.

Turning now to activities performed at the service provider 38, at block 310, the ASP conditional access server 37 verifies the content provider certificate and signature, and submits the encrypted product key to the server secure device 39.

At block 312, within the secure environment provided by the server secure device 39, the encrypted product key is decrypted utilizing the private key of the secure server device 39. It will be recalled that the product key was, at block 314, encrypted utilizing the public key of the server secure device 39.

At block 314, the product key is re-encrypted with a symmetric storage key, and stored within a server database. Furthermore, within the database 41, the encrypted product key (now encrypted with the storage key) is logically linked to the content provider 16 that submitted the product key.

In the event that rule information was submitted in conjunction with the product key, this rule information is similarly stored within the database 41, and also linked with the content provider and product key within the database 41.

By only revealing the product key in the clear within the secure environment provided by the server secure device 39, and encrypting the product key with a symmetric storage key prior to storing the product key within the database 41, it will be appreciated that access to the product key by the pay media conditional access service provider 38 is effectively prevented. The storage key is managed by the operator that hosts the conditional access server 37 (such as Sentriq) and is cycled on a regular basis for new product keys. The storage key must be securely managed since it used to protect many product keys that in turn can decrypt many content items.

Figure 14:
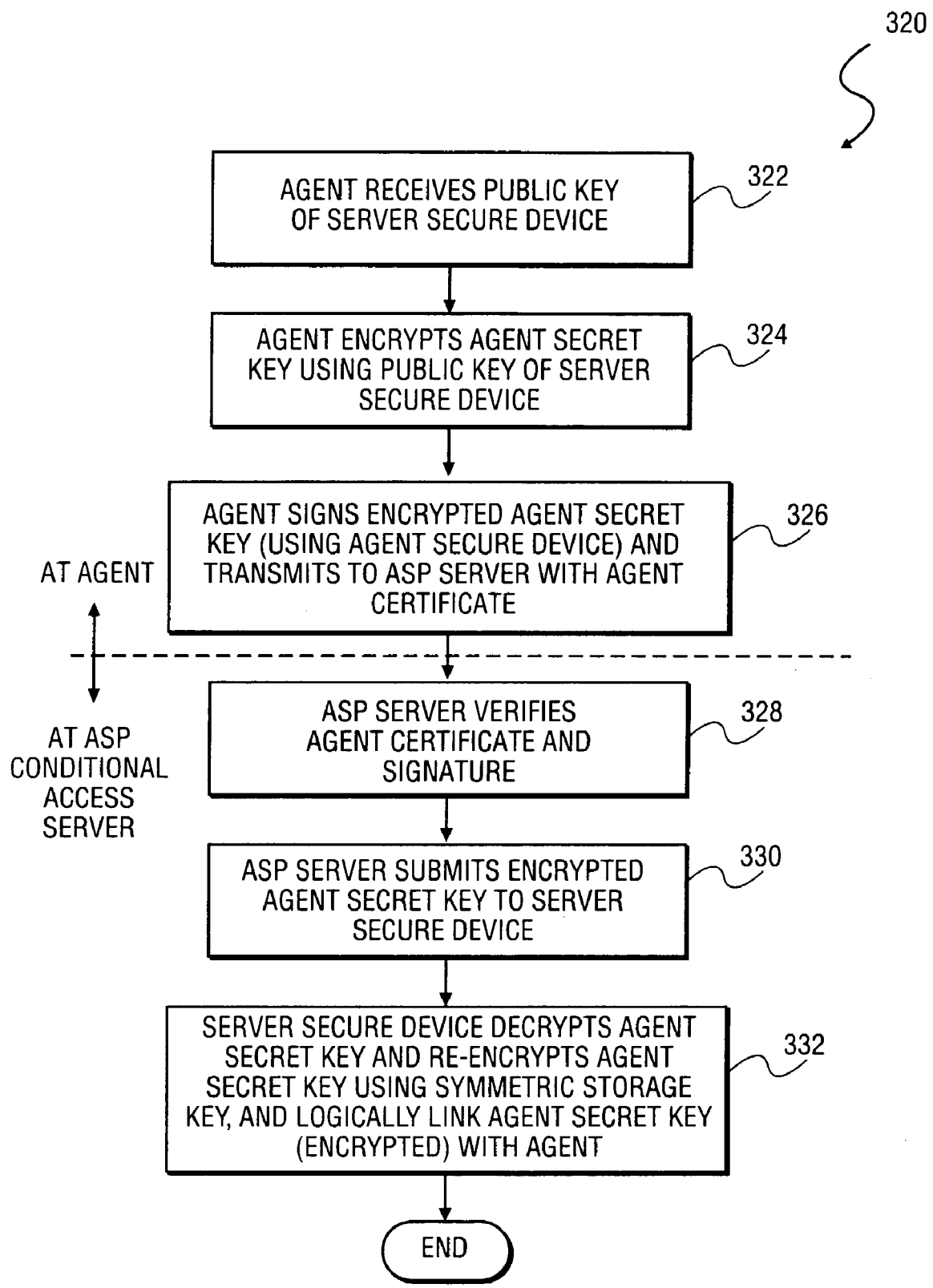
FIG. 14 is a flowchart depicting a method, according to an exemplary embodiment of the present invention, of distributing an agent secret key from a condition access agent to an ASP conditional access server.

FIG. 14 is a flowchart depicting a method 320, according to an exemplary embodiment of the present invention, of distributing an agent secret key from a conditional access agent 28 to the ASP conditional access server 37.

The method 320 commences at block 322, with the receipt at the conditional access agent 28 of the public key of the server secure device 39.

At block 324, the agent 28 encrypts an agent secret key utilizing the public key of the server secure device 39. The agent secret key is used to secure communication between the server 37 and the agent 28

At block 326, the agent 28 signs the encrypted agent secret key utilizing the agent secure device 29, and the encrypted agent secret key is transmitted to the ASP conditional access server 37, together with an agent certificate of the agent 28.

Turning now to activities performed by the ASP conditional access server 37, at block 328, the conditional access server 37 verifies the agent certificate and signature and, at block 330, submits the encrypted agent secret key to the server secure device 39.

At block 332, the server secure device 39 operates to decrypt the agent key within a secure environment, and then re-encrypt the agent secret key utilizing the symmetric storage key. The re-encrypted agent key (encrypted utilizing the storage key) is stored within the database 41, and logically linked to an associated conditional access agent 28.

Figure 15:
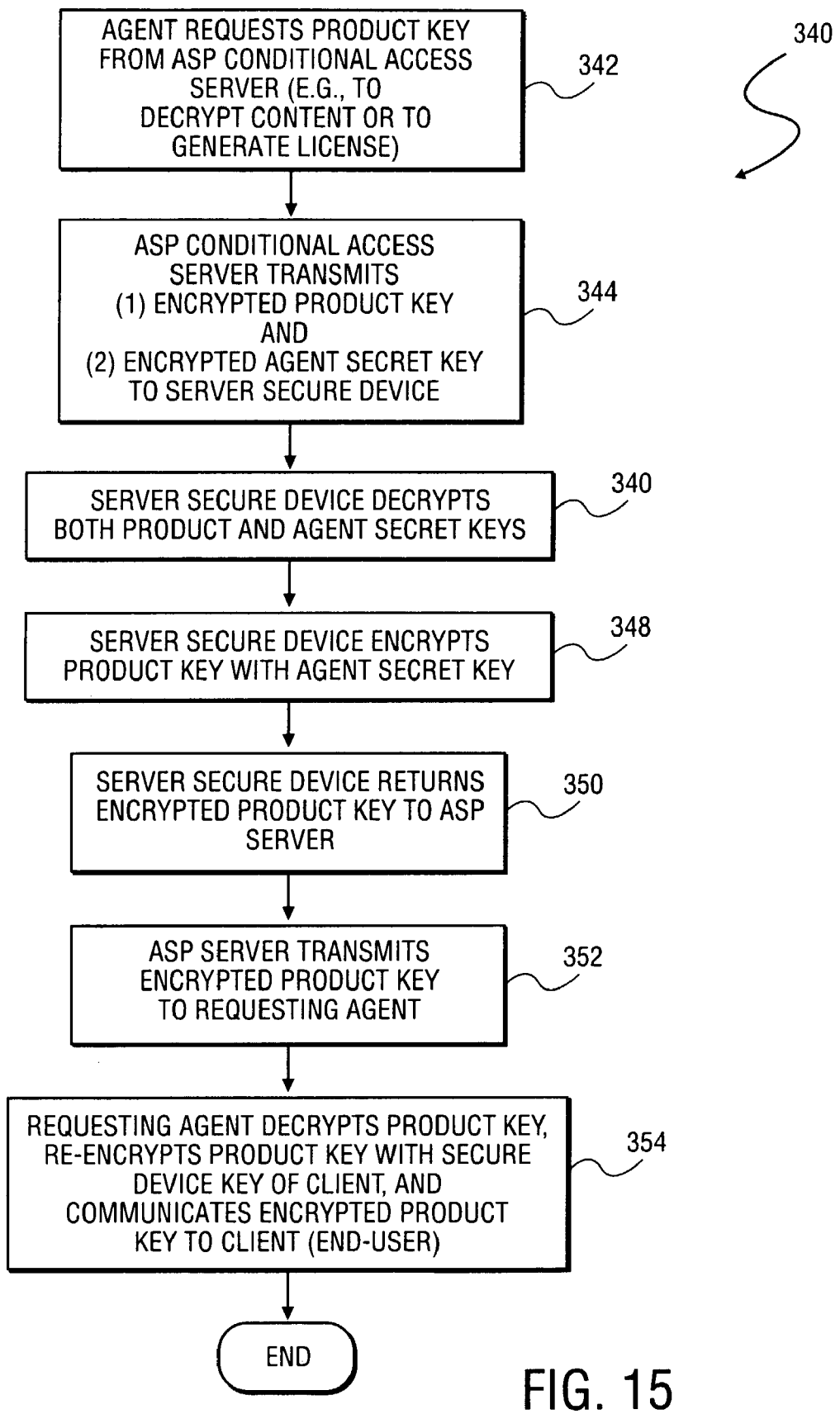
FIG. 15 is a flowchart illustrating a method, according to an exemplary embodiment of the present invention, of product key distribution from a conditional access service provider to a conditional access agent.

FIG. 15 is a flow chart illustrating a method 340, according to an exemplary embodiment of the present invention, of product key distribution from the conditional access service provider 38 to a conditional access agent 28.

At block 342, a conditional access agent 28 issues a request for a product key to the ASP conditional access server 37. This request may be for license generation purposes, or for the purpose of decrypting content, stored at local content server 40 in order to perform an association operation on clear content, or merely to distribute the clear content to a content destination 22.

At block 344, the server 37 transmits the encrypted product key (encrypted with the symmetric storage key) and the encrypted agent secret key (again encrypted with the symmetric storage key) to the server secure device 39.

At block 340, the server secure device 39, within a secure environment, decrypts both the product and agent secret keys, so that these keys are only in the clear within the secure environment.

At block 348, the server secure device 39 then encrypts the product key with the agent secret key.

At block 350, the server secure device 39 returns the encrypted product key (encrypted with the agent secret key) to the ASP conditional access server 37. At block 352, the ASP conditional access server 37 transmits the encrypted product key to the requesting conditional access agent 28.

At block 354, the conditional access agent 28 receives the encrypted product key, decrypts the encrypted product key utilizing the agent secure device 29.

Having now revealed the product key within a secure environment, the conditional access agent 28 may perform any one of a number of operations. In one embodiment, the conditional access agent 28 may, within the secure environment provided by the agent secure device 29, re-encrypted product key with a secure device key of a secure device 46 at a content destination 22, and communicate the re-encrypted product key (encrypted with a key for the secure device 46) to a content destination 22. Alternatively, the conditional access agent 28 that utilized the decrypted product key to generate clear content then performs one or more operations relating to the clear content. For example, the clear content may be communicated directly to content destination 22, may be watermarked and/or may be re-encrypted with a unique user key, before delivery to a content destination 22.

As described above, a content provider 16 may optionally submit rules (i.e., access criteria) to the pay media conditional access service provider 38 for controlling access to a particular content. To this end, the ASP conditional access server 37 may require a valid digital signature of the rule information, generated utilizing the provider secure device 17 operated by the content provider 16. The signed rule information may also include a recent time stamp in order to prevent replay. In an alternative embodiment, the content provider 16 may include a challenge (generated by the ASP conditional access server 37), in a rule change request.

In one embodiment, the pay media conditional access service provider 38 may also permit entities other than the content provider 16 to change or specify rule information, associated with a particular product key, as stored within the database 41. Specifically, the service provider 38 may provide the ability to configure the rights of certain content providers 16. This functionality allows a content provider $16_a$ to modify rule information associated with a product key that was registered by another content provider $16_n$. Further, this functionality allows a content provider $16_a$ to introduce alternative rules for a product key that was previously registered by a further content provider $16_n$. The pay media conditional access provider 38, in one embodiment, provides the following functions:

(1) Registration of a content item, and an associated product key, by a specific content provider 16.

(2) Linking of a product key, associated with a particular content item, to additional, new rule information, and modification of the rule information for product keys associated with a particular content provider.

(3) Registration of a new content item utilizing the same product key that is already associated with a further, already registered content item. However, the new content item, while being registered with an already registered product key, may be registered with different rule information.

In summary, the rights of each content provider 16 are stored and managed by the pay media conditional access provider 38. A content provider 16 may be authorized to register content items for one or more content providers (e.g., content providers $16_a$, $16_b$ and $16_c$). The same content provider $16_a$ may be authorized to update rules for content providers $16_b$ and $16_d$. Finally, for example, content provider $16_b$ may be authorized to create new content items, utilizing a pre-registered product key of a content item registered by further content provider $16_c$ and $16_f$.

Separating User Authentication and Content Security

As described above, current hardware-based content security solutions are based on combining (1) user authentication and (2) content security into a single module (e.g., a smart card). However, this lack of differentiation between copy-protected device authentication and specific user authentication can be undesirable in certain circumstances. For example, it does not necessarily allow user mobility across multiple-protected devices (e.g., copy-protected personal computers or STBs). Accordingly, a specific user is typically only able to access restricted content via a specific copy-protected device purchased by that user, and into which user authentication information is integrated. For example, an authorized user is currently not able to utilize a STB, owned by a friend or relative that the user may be visiting, to view content to which the relevant user is a subscriber.

Figure 16:
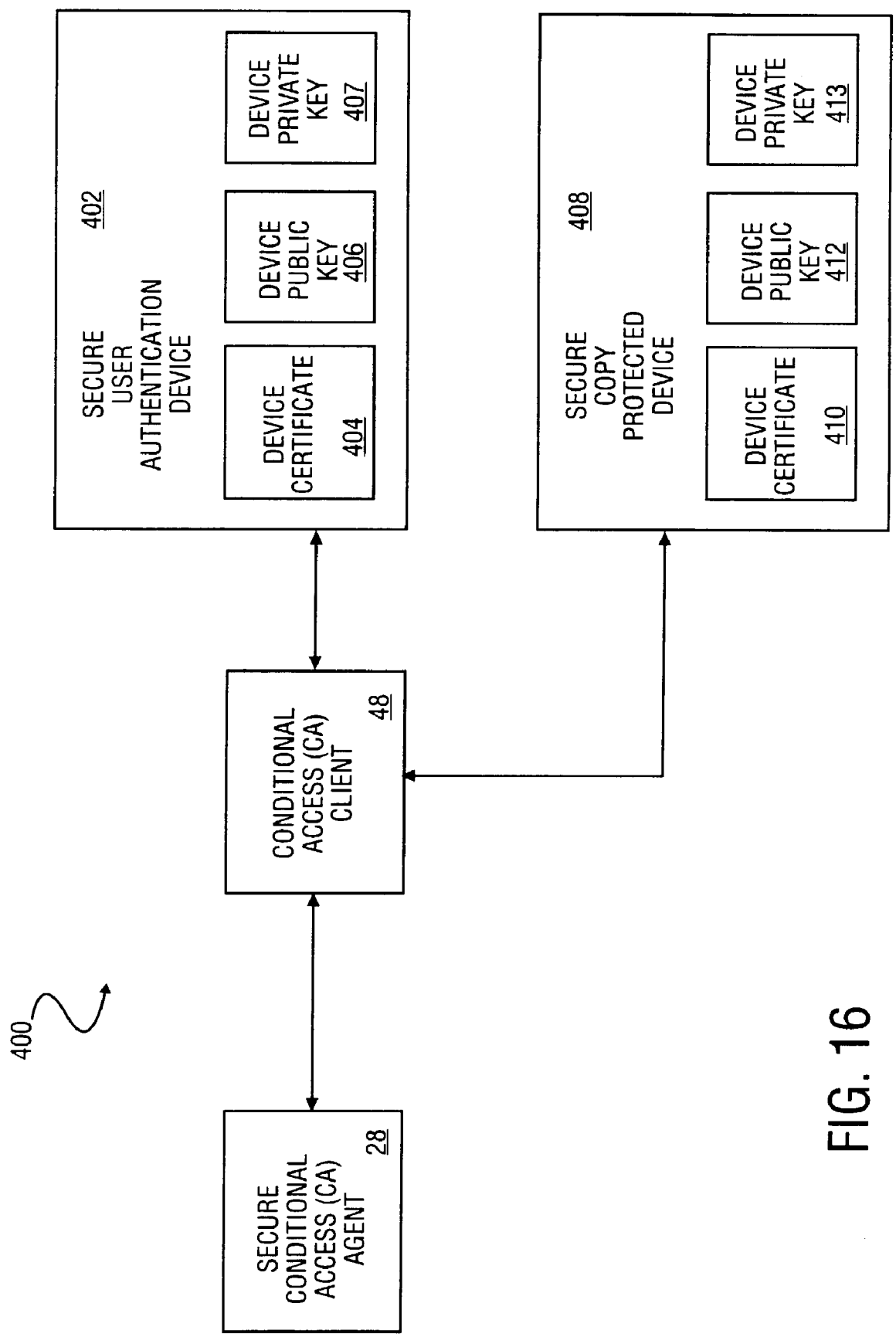
FIG. 16 is a block diagram illustrating a system, according to an exemplary embodiment of the present invention, that provides a product key to access content upon receipt and verification of two separate certificates, namely a user device certificate and a copy-protected device certificate.

According to one aspect of the present invention, this problem may be addressed by logically separating user authentication functionality from content security (i.e., copy-protected device authentication) functionality. To this end FIG. 16 is a block diagram illustrating a system 400, according to an exemplary embodiment of the present invention, that provides a product key to access content upon receipt and verification of two separate certificates, namely a first user device certificate for user authentication and a second secure copy-protected device certificate for content security authentication. More specifically, the system 400 includes a secure conditional access agent 28 that communicates, as described above, with a conditional access client 48. The conditional access client 48, in turn, accesses a secure user authentication device 402 (e.g., a PKI token, smart card or SIM card) and a secure copy-protected device 408 (e.g., a software based tamperproof decoder or hardware based set top box decoder).

The secure user authentication device 402 is, it will be appreciated, associated with a user, and is thus typically portable and carried on the person of a user. The secure copy-protected device 408, on the other hand, is associated with a device within which the ability to copy a content is disabled (or restricted). Accordingly, the secure copy-protected device 408 is typically embedded within, or integrally formed with, a viewing device (e.g., a PC or STB).

Each of the secure user authentication and secure copy-protected devices 402 and 408 is shown to include a respective device certificate 404 and 410, and a device public key 408 and 412.

Figure 17:
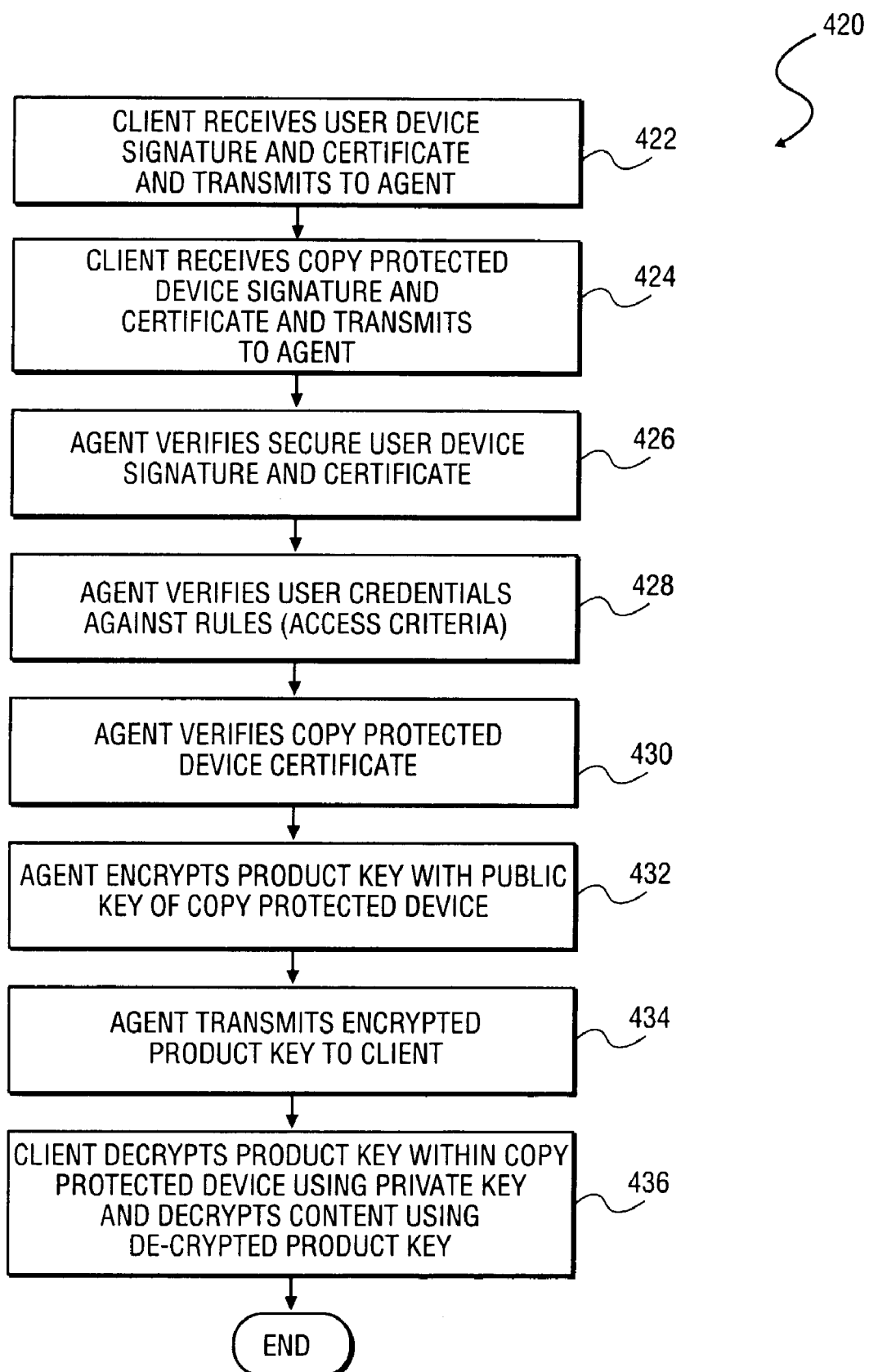
FIG. 17 is a flowchart illustrating a method, according to an exemplary embodiment of the present invention, to secure content for distribution via a network by employing separate user device and copy-protected device authentication processes to protect content from unauthorized access.

FIG. 17 is a flow chart illustrating a method 420, according to an exemplary embodiment of the present invention, to secure content for distribution via a network 18 by employing separate user device and copy-protected device authentication processes to protect content from unauthorized access. At a high level, the method 420 includes associating a user device authentication process with content, and associating a separate, copy-protected device authentication process with the content.

Referring to FIG. 17, the method 420 commences at block 422 with the receipt by the conditional access client 48 of a signature and certificate 404 associated with the secure user authentication device 402. The conditional access client 48 then forwards the user device signature and certificate 404 to the secure conditional access agent 28. At block 424, the conditional access client 48 receives a signature and certificate 410 associated with the copy-protected device 408 and transmits the copy-protected device signature and certificate 410 to the conditional access agent 28.

At block 426, the conditional access agent 28 verifies the secure user device signature and certificate 404 in a first user device authentication process. At block 428, the conditional access agent 28 verifies user credentials against access criteria (or rule information) associated with content requested by the conditional access client 48. The requested content, it will be appreciated, is presented to an authenticated user via the authenticated copy-protected device 408.

At block 430, the conditional access agent 28 verifies the certificate 410 of the secure copy-protected device 408. At block 432, assuming the verification operations is performed at blocks 426–430 are successfully completed, the conditional access agent 28 proceeds to encrypt the requested content with a public key of the copy-protected device 408. At block 434, the conditional access agent 28 authorizes transmission of the encrypted content to the conditional access client 48 for delivery to the secure copy-protected device 408.

At block 436, the conditional access client 48 initiates decryption of the requested content wherein a secure environment provided by the copy-protected device utilizing a private key (not shown) of the copy-protected device 408.

In conclusion, it will be noted that two separate and distinct authentication processes are performed at blocks 426–428 and 430. Further, it will be noted that each of these separate authentication processes verify separate and distinct user device and copy-protected device information (e.g., separate device certificates). By separating the authentication processes, an authorized user, in one exemplary use scenario, is enabled to utilize a copy-protected device of a third party to request and view content, for which that particular user is authorized. For example, the user authentication device may comprise a smart card, PKI token, SIM card or the like, that may be inserted into a personal computer, STB, PDA, cell phone or the like of a third party, thus enabling the authorized user to request content via a third party's copy-protected device 408.

Associating a License with a Particular User

Content licenses, such as those implemented by Microsoft Windows Media DRM technology and Intel ISIS are typically linked in a cryptographic manner to a specific player (e.g., a user computer). However, such content licenses are not tied to a particular user, and thus can be utilized by any one with access to the relevant player. This situation is undesirable both from a content owner (license issuer) as well as a user (license holder) viewpoint.

At a high level, according to one aspect of the present invention, a method of associating a license with a particular user includes encrypt a product key, to be included within a license to particular content, with both the public key 412 of the copy-protected device and the public key 406 of a user authentication device. According to one aspect of the present invention, a method of securing content for distribution to a network would include the operations of method 420 described above with reference to FIG. 17, but differ in that at block 432, the conditional access agent 28 would encrypt the product key with both the public keys 406 and 412, as opposed to only the public key 412.

Figure 18:
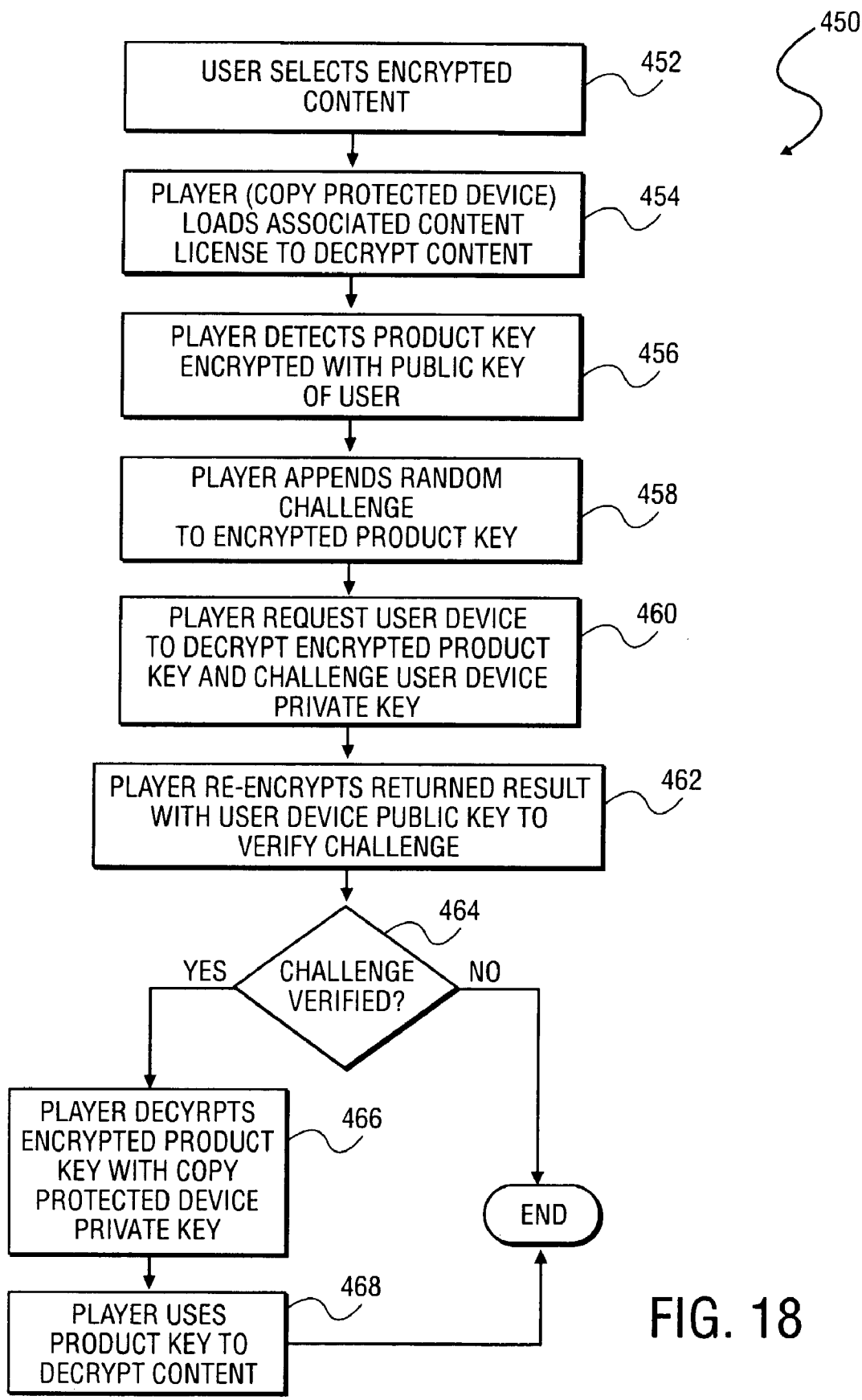
FIG. 18 is a flowchart illustrating a method, according to an exemplary embodiment of the present invention, of communicating a product key, encrypted with the public keys of both a copy-protected device and a user authentication device.

FIG. 18 is a flow chart illustrating a method 450, according to an exemplary embodiment of the present invention, of communicating a product key, encrypted with the public keys of both a copy-protected device and a user authentication device to a copy-protected device and a user authentication device. In one embodiment, the product key is firstly encrypted utilizing the public key of the copy-protected device 408, and then again encrypted with the public key 406 of the user authentication device 402. In this embodiment, it will be appreciated that, in order for the copy-protected device 408 to access the product key, the copy-protected device 408 requires the user authentication device 402 to first decrypt the product key. In order to prevent replay attacks, the copy-protected device 108 may append a challenge to the encrypted key when requesting the user to decrypt the product key.

Turning specifically now to the method 450 illustrated in FIG. 18, at block 452, a user, via integrated or separate user-authentication and copy-protected devices 402 and 408, selects particular encrypted content for viewing via the copy-protected device 408.

Figure 19:
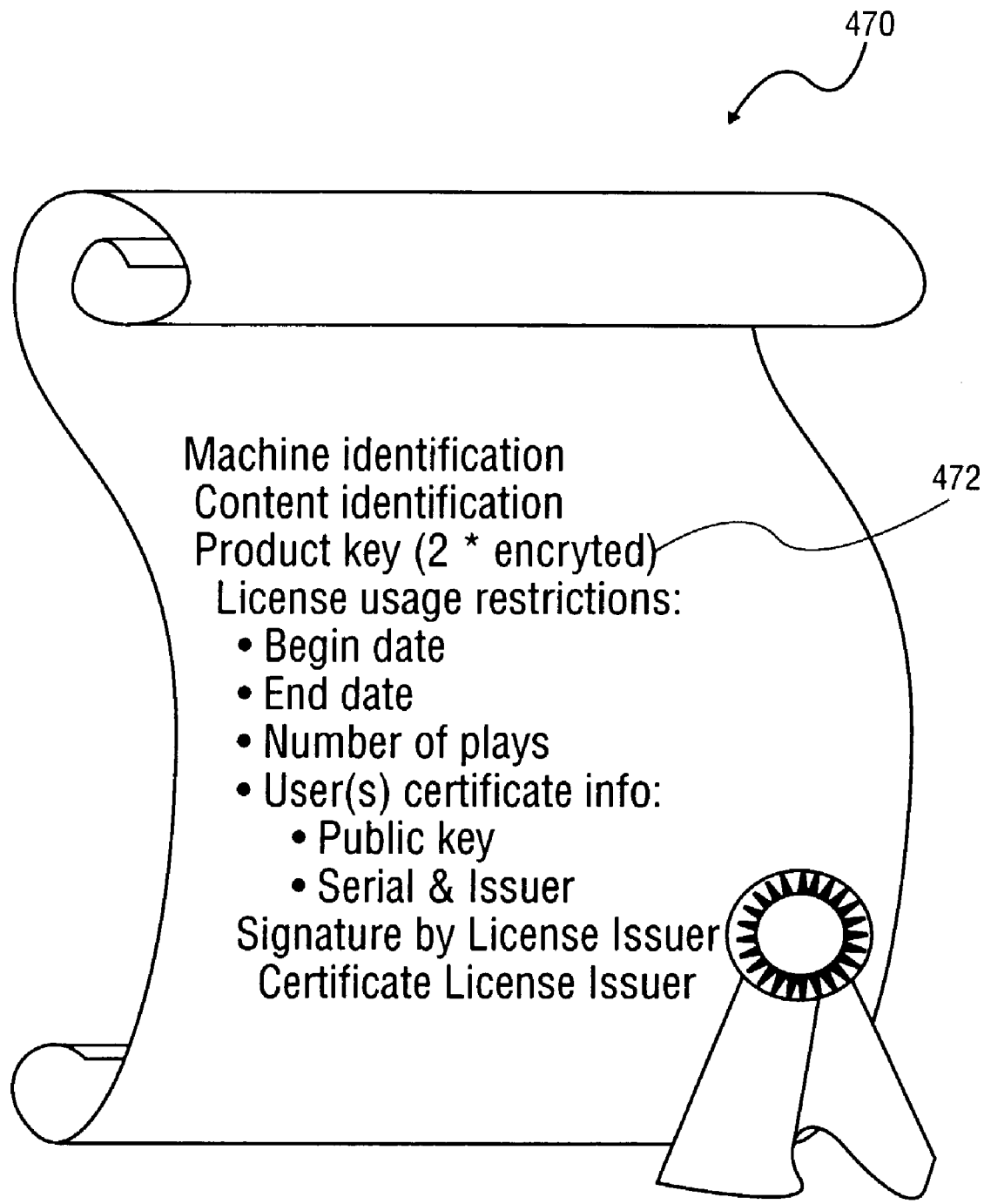
FIG. 19 is a diagrammatic representation of a content license, according to an exemplary embodiment of the present invention.

At block 454, the copy-protected device 408 loads a content license, associated with the requested content and required to decrypt the content. FIG. 19 is a diagrammatic representation of an exemplary content license 470 that may be loaded at block 454. As illustrated, the content license 470 includes a machine identification identifying the copy-protected device 408, content identification identifying the requested content, a twice-encrypted product key 472, license usage restrictions, a signature of the license issuer, and a certificate of the license issuer.

Returning to FIG. 18, at block 456, the copy-protected device 408 detects that the product key 472 is encrypted with the public key 406 of the user authentication device 402. This is indicated in the license usage restrictions. At block 458, the copy-protected device 408 appends a random challenge to the encrypted product key 472 and, at block 460, requests the user authentication device 402 to decrypt the encrypted product key, and also issues a challenge to the user authentication device 402 utilizing the private key (not shown) of the user authentication device 402.

At block 462, the copy-protected device 408 re-encrypts a result returned from the user authentication device 402 with the public key 406 of the device 402 to thereby verify the challenge.

At decision block 464, a determination is made as to whether the challenge was successfully verified or not. If so, at block 466, the copy-protected device 408 decrypts the encrypted product key utilizing the private key of the copy-protected device 408 to reveal the product key. At block 468, the copy-protected device 408 then utilizes the revealed product key to decrypt the requested content.

The above-described aspect of the present invention may be utilized in one exemplary use scenario to secure highly confidential data that is delivered to, and stored on, a copy-protected device 408 (e.g., a user's computer). Depending upon the user's authentication mechanism, a user may be required to utilize a hardware PKI token to authenticate the user to the copy-protected device 408 prior to obtaining access to the encrypted content.

License Generation Utilizing Symmetric Keys

As noted above, the signing of content licenses utilizing a private key operation is computationally expensive when a large number of simultaneous transactions are required (e.g., when the content is live, broadcast event). Additionally, the operational costs of managing private keys, and associated certification authorities may be high.

With a view to addressing the above-identified problems, the present invention proposes, in one exemplary embodiment, signing a license utilizing a secret symmetric key. In one embodiment, the secret symmetric key comprises a product key that encrypts content to which the license pertains. In an alternative embodiment, the symmetric key constitutes a key that is utilized to encrypt a product key that is in turn utilized to encrypt the content.

Signing a content license utilizing a symmetric key is advantageous in that the computational costs of a symmetric key operation are substantially less than the computational costs of a private key operation. In this manner, the present invention allows a content distribution infrastructure to generate an increased number of licenses in a potentially shorter time period. A further benefit is that the additional costs of managing a public key infrastructure are substantially avoided, as in the embodiment where the symmetric key constitutes a product key, this product key is known to the license issuer anyway as a license will typically include such a products key.

Signing licenses with a symmetric key (e.g., the product key) rather than a private key allows anyone with access to the product key to create licenses, rather than restricting the creation of licenses to certified license issuers.

Figure 20:
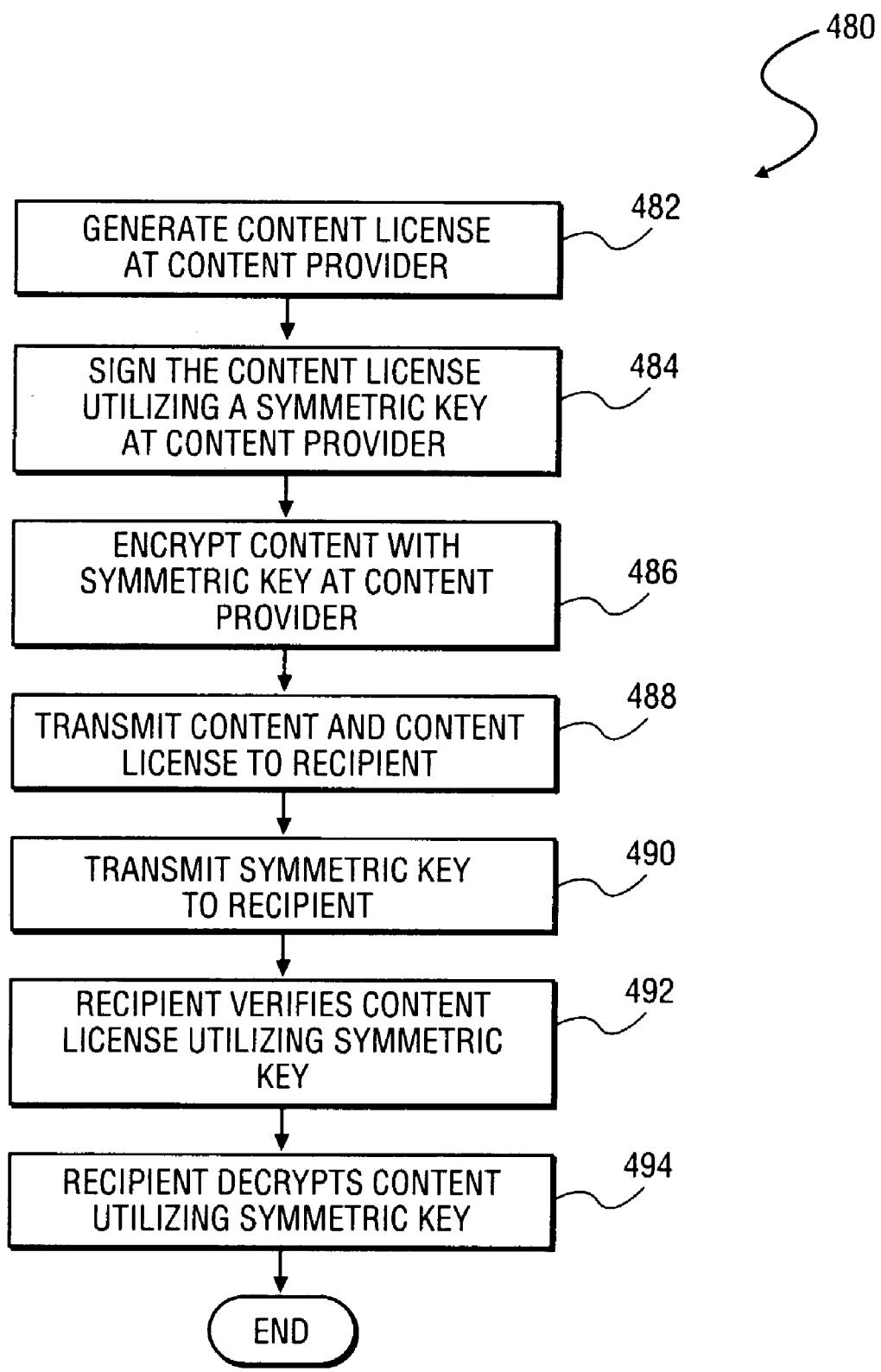
FIG. 20 is a flowchart illustrating a method, according to an exemplary embodiment of the present invention, of signing a content license utilizing a symmetric key.

FIG. 20 is a flow chart illustrating a method 480, according to an exemplary embodiment of the present invention, of signing a content license utilizing a symmetric key.

At block 482, a content license is generated at a content provider 16. At block 484, the content provider 16 then signs the content license utilizing a symmetric key. In one embodiment, the symmetric key comprises a product key with which content, associated with the content license, is encrypted. In an alternative embodiment, the symmetric key is a symmetric key that the content provider 16 utilized to encrypt a product key that was utilized to encrypt the associated content.

At block 486, the content provider 16 proceeds to encrypt the content, to which the content license pertains, with the symmetric product key.

At block 488, the content provider 16 then distributes the content, and the associated content license, to a recipient (e.g., to a content distributor 20, or directly to a content destination 22).

At block 490, the content provider 16 distributes the symmetric product key to a recipient (e.g., a content distributor 20 or a content destination 22). The distribution of the symmetric key may be according to any one of the methodologies discussed. For example, the symmetric key may be encrypted utilizing the public key of a copy-protected device 408 associated with the recipient.

At block 492, the recipient verifies the content license utilizing the symmetric key. For example, the recipient may decrypt the product key utilizing a private key for a copy-protected device 408 associated with the recipient, and then utilize the decrypted product key to verify the content license.

Having verified the content license at block 494, the recipients may then optionally decrypt the content utilizing the symmetric product key.

Figure 21:
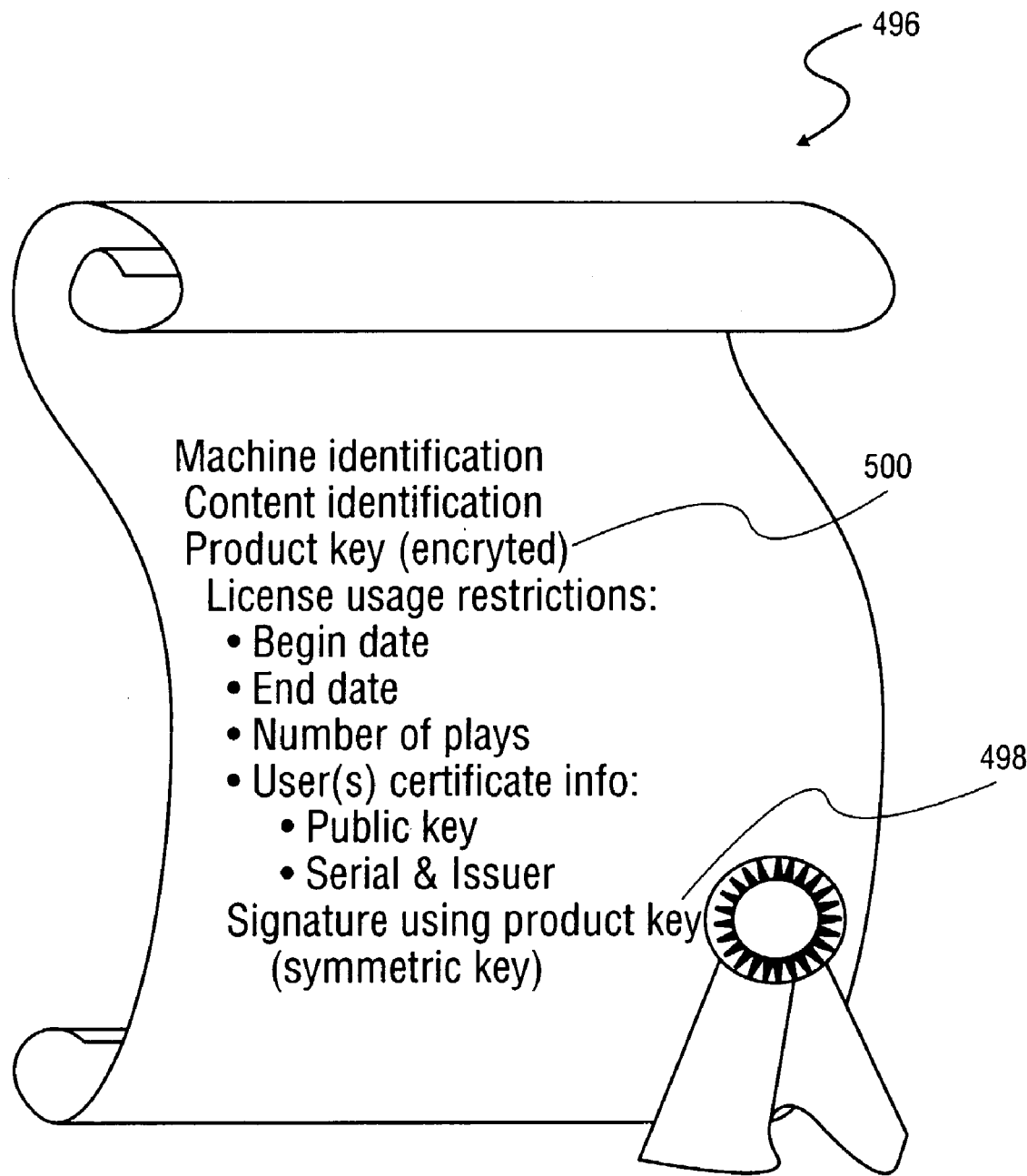
FIG. 21 is a diagrammatic representation of a further content license, according to an exemplary embodiment of the present invention, that is signed utilizing a digital signature in the form of a symmetric key.

FIG. 21 is a diagrammatic representation of a content license 496, according to an exemplary embodiment of the present invention. As illustrated, the content license 496 is signed utilizing digital signature 498 in the form of a symmetric key. In one embodiment, the symmetric key is a product key with which associated content is encrypted. The content license 496 is shown to include substantially the same information as the content license 470 shown in FIG. 19, but differs in that the license 496 is signed by the product key, as opposed to being signed by a license issuer.

Figure 22:
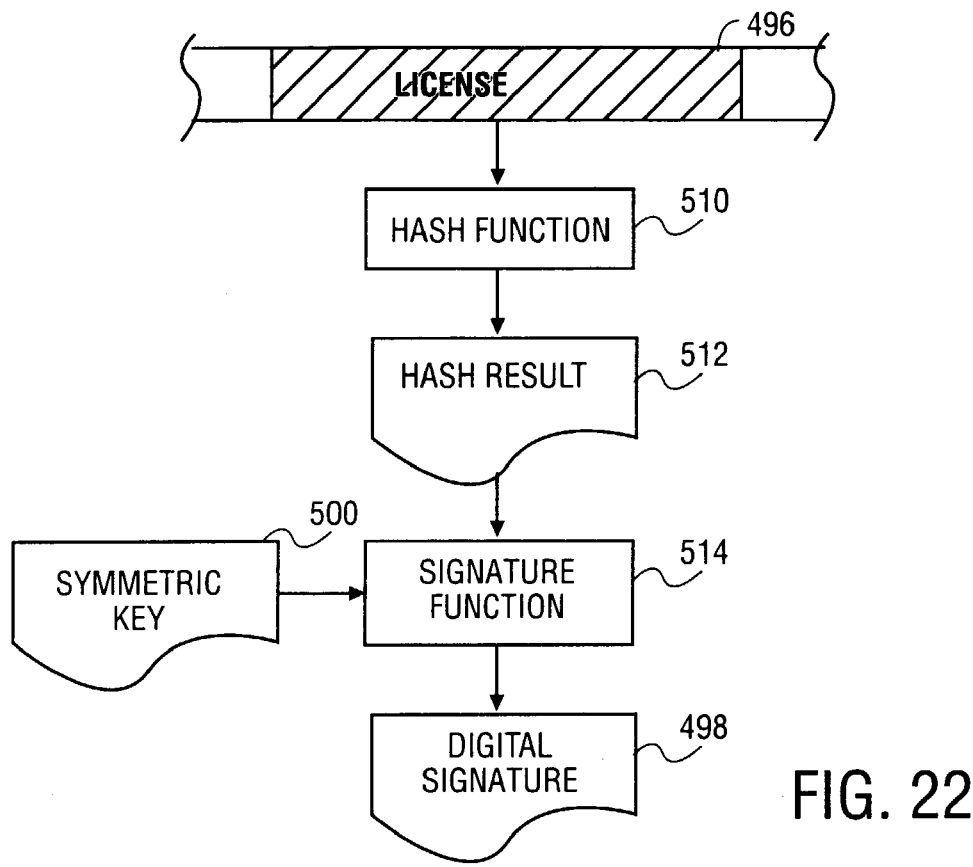
FIG. 22 is a flowchart illustrating further details regarding a method, according to an exemplary embodiment of the present invention, of generating a digital signature for a license utilizing a symmetric key.

FIG. 22 is a flowchart providing further details regarding a method, according to an exemplary embodiment of the present invention, of generating the digital signature 498 for a license 496 utilizing a symmetric key (e.g., a product key).

As illustrated in FIG. 22, the license 496 is subject to a hash function 510 to generate a hash result 512. The hash result 512 and a symmetric key in the exemplary form of a product key 500 provide input to a signature function 514 that generates a digital signature 498 for the license 496 from these two inputs.

Figure 23:
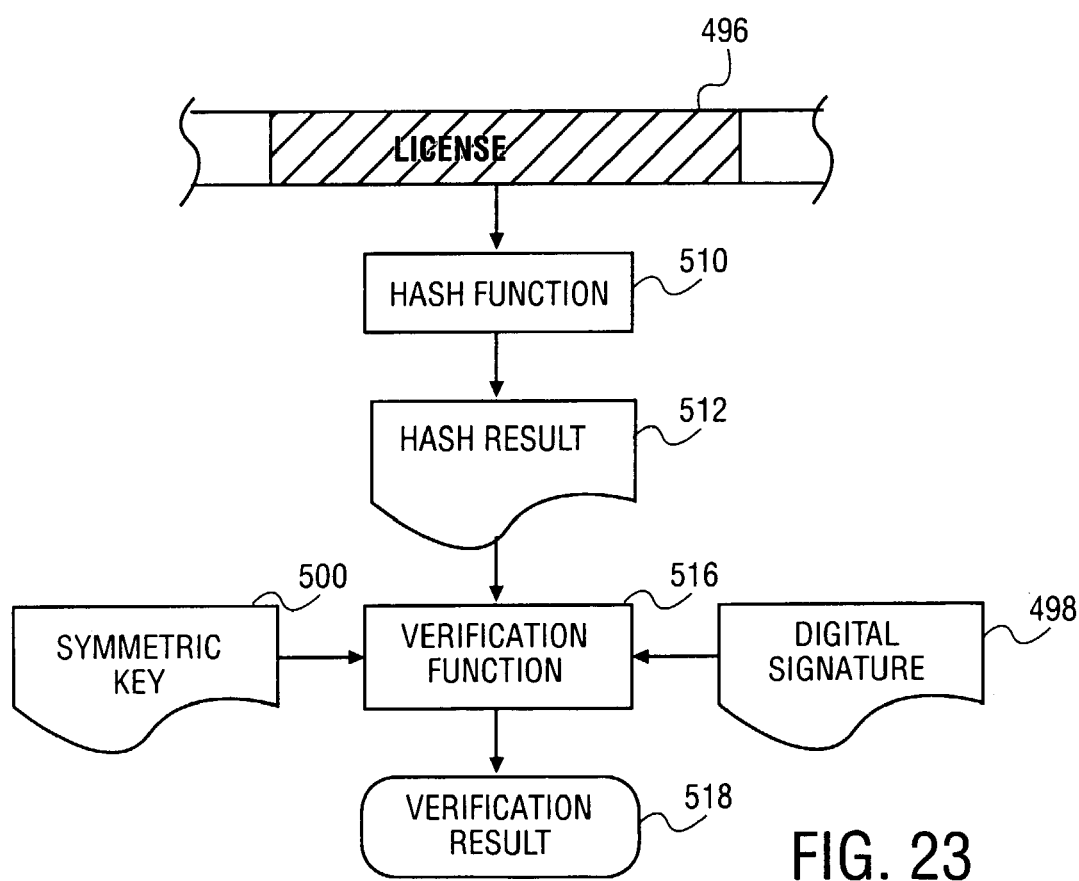
FIG. 23 is a flowchart illustrating a method, according to an exemplary embodiment of the present invention, of verifying a content license utilizing a digital signature that embodies a symmetric key.

FIG. 23 is a flowchart illustrating a method, according to an exemplary embodiment of the present invention, of verifying a content license 496, utilizing a digital signature 498 generated utilizing a symmetric key (e.g., a product key).

The license 496 is again subject to the hash function 510 to regenerate the hash result 512. A verification function 516 receives the three inputs, namely the hash result 512, the symmetric key 500 and the digital signature 498. As the digital signature 498 was generated utilizing the symmetric key 500, the verification function 516 is able to verify the content license 496 utilizing these three inputs.

Geographic Control of Content Distribution

It is desirable to provide a content provider 16 with geographic control over the distribution of content for a number of reasons. For example, a content provider 16 may wish to distribute a live event over the Internet worldwide, but need to block certain countries (e.g., or reasons due to exclusive broadcasting rights having been sold to broadcasters in those regions). According to one aspect of the present invention, there is provided a method and system to provide content providers 16 with secure geographic distribution control.

At a high level, the present invention proposes that content providers 16 encrypt content before distribution of a network (e.g., the Internet). In order to view the encrypted content, a content destination 22 will need to retrieve the encrypted content and the associated encryption key (or keys). Prior to communicating such encryption keys and content, according to one aspect of the present invention, a user and/or a copy-protected device are authenticated with secure hardware devices (e.g., PKI-enabled hardware devices such as smart cards or USB e Tokens). Once a user or copy-protected device has been identified, a number of geographic location checks are then performed against geographic access criteria to determine whether or not to release content to a requesting content destination 22.

Figure 24:
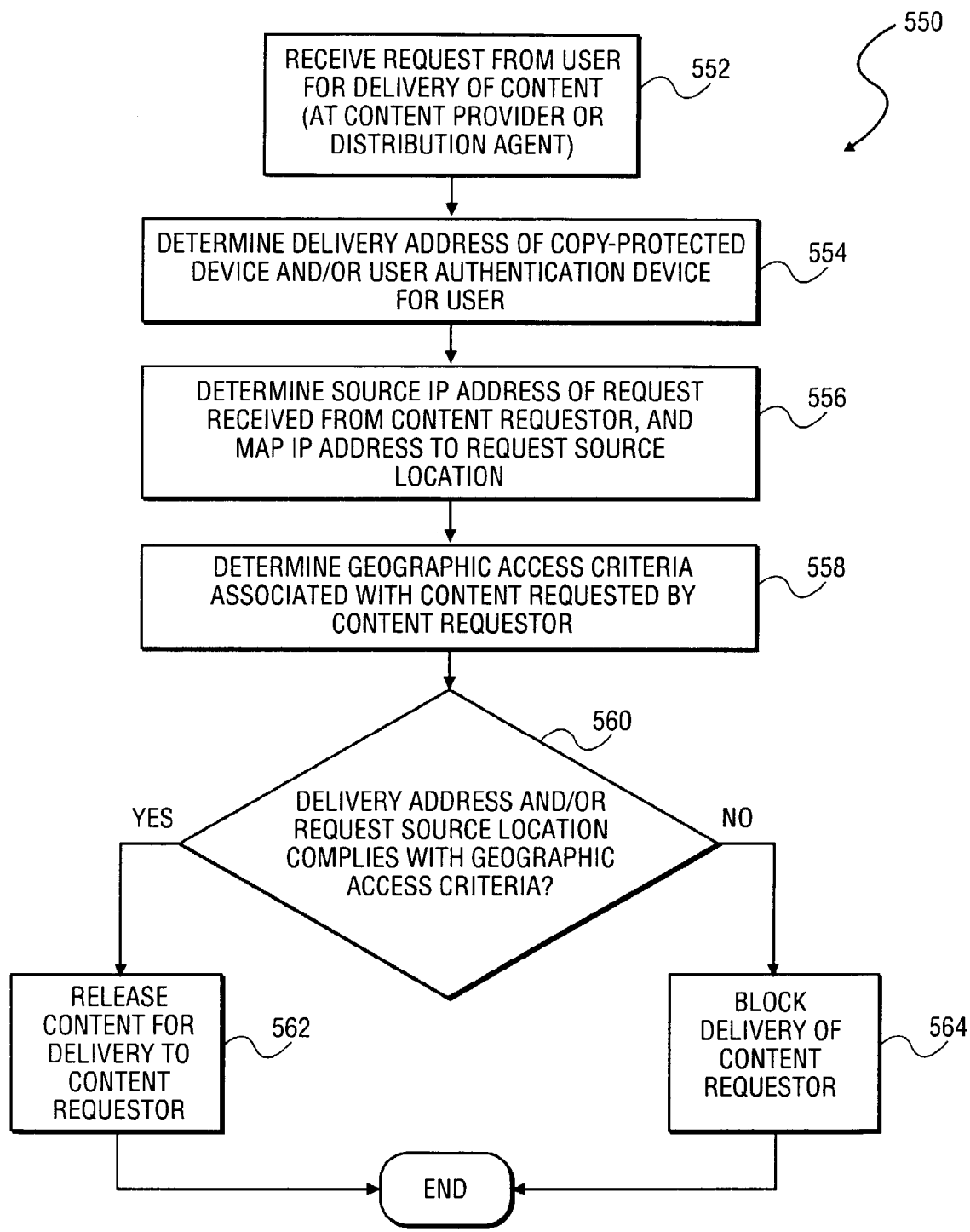
FIG. 24 is a flowchart illustrating a method, according to an exemplary embodiment of the present invention, of distributing content via a network in a geographically controlled manner.

FIG. 24 is a flowchart illustrating a method 550, according to an exemplary embodiment of the present invention, of distributing content via a network (e.g., the Internet) in a geographically controlled manner. The method 550 commences at block 552 with the receipt of a request from a content requester located at a content destination 22 for delivery of content via a network to the content destination 22. The request may, for example, be received at conditional access agent 28, as illustrated in FIG. 2 from a conditional access client 48, located at the content destination 22. As described above with reference to FIG. 16, the request to the conditional access agent 18 may include both a user authentication device certificate 404 and a copy-protected device certificate 410.

At block 554, the conditional access agent 28, in the manner described above, retrieves access criteria associated with the request content from an appropriate conditional access server 36 operated via a content provider 16, or by a service provider 38. The retrieved access criteria includes geographic access criteria specifying geographic regions (e.g., countries, states, provinces, counties, towns, municipal areas, etc.) and access conditions associated with those geographic regions. For example, the geographic access criteria may prohibit, or alternatively authorize, distribution of the associated content to a specific geographic region or regions. For the purposes of the present specification the term "geographic location" shall be taken to include any geographic location identifiable by any criteria, including national, state, municipal, city, town, economic, demographic, historical, or a socio-economic criteria.

At block 554, the conditional access agent 28 also commences a content requestor or authentication process that, in one embodiment, includes performing a lookup to determine the physical delivery address of the copy-protected device 408 utilizing the copy-protected device certificate. In an alternative embodiment, at block 554, the conditional access agent 28 may perform a lookup of the delivery address of the user authentication device 402, utilizing information contained in the user device certificate 440. In yet a further embodiment, the conditional access agent 28 may lookup the delivery addresses for both the copy-protected and the user authentication devices. The delivery address information may be included in the certificate, or stored in the network as information linked with the user and/or device.

At block 556, the conditional access agent 28 determines the source IP address of the request received from the content requestor at the content destination 22, and attempts to map the source IP address to a geographic location. To this end, the conditional access agent 28 may have access to an external geographic location service, such as those offered by Quova, Inc., or Digital Envoy, Inc. that provide sophisticated IP geographic location services.

At block 558, the conditional access agent 28 examines the geographic access criteria, included in the access criteria retrieved from the conditional access server 36.

At decision block 560, the conditional access agent 28 makes a determination as to whether the delivery address (or addresses) determined at block 554 and/or the geographic location associated with the source IP address determined at block 556 comply with the geographic access criteria. Following a positive determination at decision block 560, the conditional access agent 28 releases the requested content, stored on the local content server 40 for delivery to the content destination 22 of the content requester. On the other hand, following a negative determination at block 560, delivery of the requested content to the content requester at the content destination 22 is blocked.

It will be appreciated that the above-described methodology may find broad application in digital rights management and exercising geographic control over content distribution. For example, a content provider 16 (or distributor 20) may distribute USB eTokens in the U.S.A. for immigrants that wish to access sports events broadcast over the Internet from a country of origin. The sports clubs (e.g., the content providers 16) can, utilizing the above method 550, verify that a content requester is located at a content destination 22 in the U.S.A. by verifying the content requestor's digital certificate and signature, for distributing encrypted content and in appropriate key.

By checking that both the delivery address of a user authentication or copy-protected device, and the source IP address of a content request are located within an authorized geographic location, the present invention seeks to prevent a user from utilizing a secure device, properly authorized, within an unauthorized geographic location. Specifically, the IP source address check decreases the ability of a fraudulent user to access content from a "blocked" geographic location. Content and keys are only delivered if a user has access to a user authentication and/or copy-protected device that is not officially distributed to any blocked region, and the source IP address of the content requestor is not mapped to any blocked region.

Dynamic Selection of Payment Gateways

Traditional Internet-based payment solutions may require a user to provide financial information to companies which they do not have a trust relationship, and also to provide financial information to a wide range of content providers 16 from which the user may wish to obtain content. This potentially creates barriers to entry for a user.

According to one aspect of the present invention, these problems are addressed by having a content provider 16, and more specifically a conditional access server 36, order a list of payment gateways through which the content provider 16 will accept payment such that a preferred payment gateway is highly ranked in the ordered list, and a least preferred payment gateway is ranked low within the ordered list.

Upon receiving a user request for access to content of a particular content provider 16 at a conditional access agent 28, the conditional access agent 28 may reorder (or re-rank) the list of accepted gateways to leverage existing trust relationships between the content requester and, for example, a content distributor 20 hosting the conditional access agent 28. In one embodiment, the list of payment gateways presented by the conditional access agent 28 to the content requester is dictated by the content provider 16. The content distributor 20 is not authorized to add payment gateways to this list, but merely to reorder the list to reflect an existing trust relationship that the content requester may have established. In an alternative embodiment, the content distributor 20 may modify a list of payment gateways, by adding or subtracting payment gateways to that list. Specifically, the content distributor 20 may have established relationships with additional payment gateways that have no relationship with the content provider 16. In this case, the content distributor 20 may include such further additional payment gateways in the list presented to the content requester. In this case, the content distributor 20 will assume responsibility for the appropriate transfer of the funds to the content provider 16.

Dealing more specifically with payment gateways, as stated above, a commerce service provider 42, such as that illustrated in FIG. 2, may act as a payment gateway with respect to a content provider 16, a content distributor 20 and/or a content destination 22. For the purposes of the present invention, the term "payment gateway" will be taken to include any party that acquires transactions from a further party, and processes such transactions through a financial system (e.g., a banking or credit card system). Merely for example, a payment gateway may be used to link a banking network with the Internet. A payment gateway may furthermore link a number of banking systems together (e.g., Visa, MasterCard and American Express), and may typically not be vendor or bank specific, although occasionally this is the case. In providing an interface between a merchant (e.g., a content provider 16 or a content distributor 20) and a bank's payment processing system, a payment gateway may operate to translate messages into other formats (e.g., VisaNet) that are utilized for authorization and settlement of merchant transactions. A payment gateway typically acquires a transaction, certifies it and routes it. Many payment gateways are based on Secure Electronic Transaction (ACT) technology.

Figure 25:
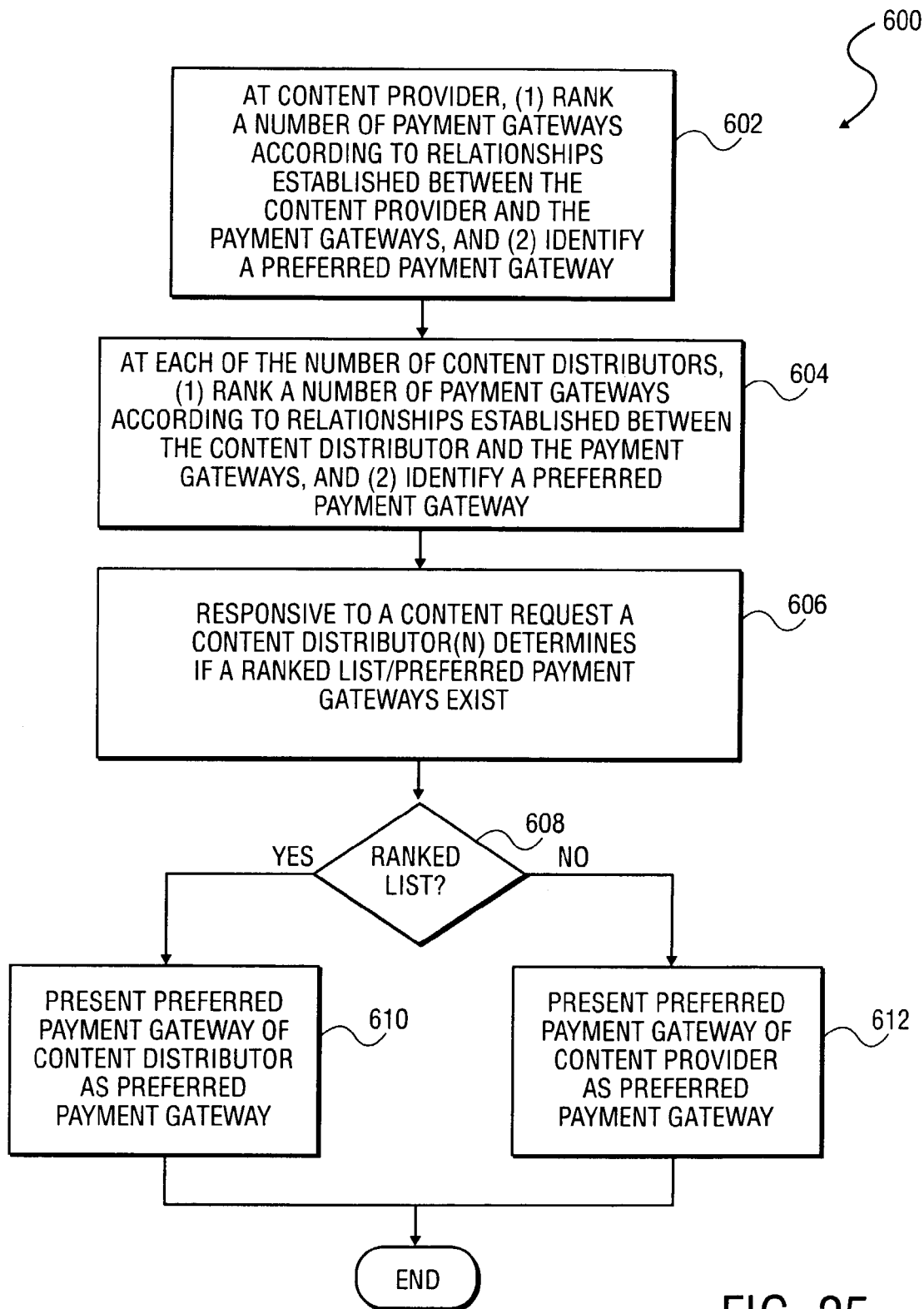
FIG. 25 is a flowchart illustrating a method, according to an exemplary embodiment of the present invention, to dynamically present a payment gateway to a content requester.

FIG. 25 is a flowchart illustrating a method 600, according to an exemplary embodiment of the present invention, to dynamically present a payment gateway to a content requestor (e.g., as a content destination 22).

The method 600 commences at block 602 at a content provider 16, which performs a ranking operation to generate an ordered list of payment gateways according to relationships established between the content provider 16 and such payment gateways. More specifically, as discussed above, a conditional access server 36 may utilize a number of tables to support functionally supplied to a content provider 16. Such tables include, as discussed above, the table PaymentGateway that is populated with records for each of a number of payment gateways with which a content provider 16 has established relationships. The table PaymentGateway, in one embodiment of the present invention, is provided with an additional "rank" field that indicates the ranking within an ordered list of payment gateways attributed to the relevant payment gateway by a content provider 16. The ranking operation performed at block 602 includes the identification of a preferred payment gateway that is identified by the content provider 16 as being it's first choice of a payment gateway through which to receive payment for access to content that it provides.

At block 604, each of a number of content distributors 20 may optionally rank a number of payment gateways according to relationships established between each of the respective content distributors 20 and the payment gateways, and again each identify a preferred payment gateway. In the simplest implementation, the content distributor 20 itself may implement a payment gateway, and not have established any relationships with third party gateways. For example, Excite@Home may operate both as a content distributor 20, and a payment gateway. In this case, Excite@Home may simply identify an "Excite@Home wallet" as the preferred payment gateway. In a more complex implementation, a content distributor 20 may have established relationships with a number of payment gateways, and in this case may maintain a table similar to the table PaymentGateway of the conditional access server 36.

At blocks 606, responsive to receipt of a content request at a content distributor 20, and more specifically a conditional access agent 28, the conditional access agent 28 requests certain information as described, from a conditional access server 36 of a content provider 16. According to the present invention, the information communicated from the conditional access server 36 to the conditional access agent 28 as part of this communication includes a list of payment gateways accepted by the content provide 16. This list of payment gateways includes the ordered ranking of payment gateways and the identification of the provider-preferred payment gateway. At block 606, the conditional access agent 28 also makes a determination as to whether a ranked list of payment gateways (or at least a preferred payment gateway) has been specified by the content distributor 20.

Following a positive determination at block 608 (i.e., the content distributor 20 has identified a preferred payment gateway), at block 610, the conditional access agent 28 causes the preferred payment gateway of the content distributor 20 to be presented to the content requester, if appropriate. More specifically, in one embodiment, the conditional access agent 28 may reorder the list of provider-accepted payment gateways to reflect relationships established between the content distributor 20 and appropriate payment gateways, or to reflect trust relationships established between the content requestor and the content distributor 20 (e.g., in the case of Excite@Home) or another third-party payment gateway. This reordered list of provider-accepted gateways is then communicated from the conditional access agent 28 to the conditional access client 48 for presentation to the content requestor (e.g., via a browser).

In an alternative embodiment, at block 610, the conditional access agent 28 may modify the list of accepted payment gateways to include payment gateways with which the content distributor 20 has relationships, but with which the content provider 16 does not have relationships. In this way, the list of accepted payment gateways may be expanded or reduced, depending on relationships established by the content distributor 20. In this case, the modified list of accepted payment gateways will again be communicated to the conditional access client 48 for presentation to the content requester, with a preferred payment gateway being identified for presentation to the content requestor as such.

On the other hand, following a negative determination at decision block 608 (i.e., the content distributor 20 has no preference with respect to payment gateways), the conditional access agent 28 forwards the provider-accepted list of payment gateways, unaltered, to the conditional access client 48 for presentation to the content requester. In this case, the preferred payment gateway, as identified by the content provider 16, will be presented to the content requestor as such.

In one embodiment of the present invention, the actual preferred payment gateway that is presented to the content requestor at block 610 or 612 is presented as a default payment gateway. In one embodiment, this may involve presenting only the preferred payment gateway to the content requester, without presenting other options. In an alternative embodiment, a list of payment gateways, with the preferred (or default) payment gateway being selected in the absence of selection of the content requestor to the contrary, may be presented to the content requester.

Figure 26:
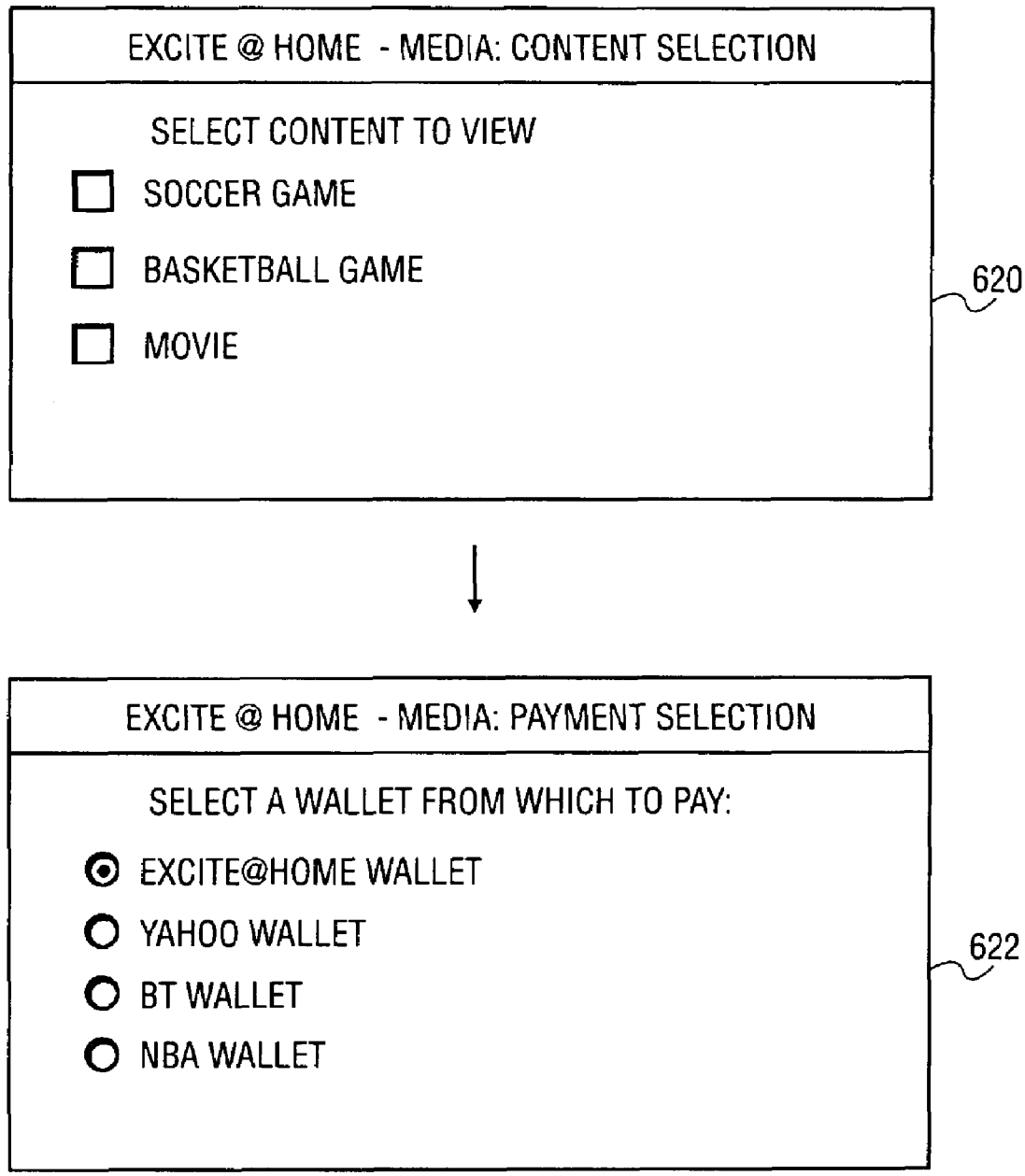
FIG. 26 illustrates an exemplary sequence of interfaces that may be presented by a client application executing at a content destination to present an order list of payment gateways.

FIG. 26 illustrates an exemplary sequence of user interfaces that may be presented by a client (e.g., a browser), executing on a client device (e.g., a personal computer) at a content destination 22, and also hosting a conditional access client 48. The sequence of interfaces includes a first content selection interface 620, according to an exemplary embodiment of the present invention, which allows a content requestor to select particular content. To this end, the exemplary content selection interface 620 presents titles for each a number of content items, and a check box adjacent to each of these titles that the user may check to indicate selection of a content item.

A payment selection interface 622, according to an exemplary embodiment, presents a number of payment gateways, in the exemplary form of "wallets" from which the content requestor may select a wallet via which payment for one or more content items may be made. As illustrated in the exemplary payment selection interface 622, Excite@Home wallet is indicated as a preferred, default payment gateway as a radio button displayed adjacent a listing for this wallet is pre-selected. Additional wallets are listed below the Excite@Home wallet in an order determined by the content distributor 20, or in the absence of any preference by the content distributor 20, by the content provider 16.

The methodology as described above enables the following illustrative exemplary scenario. The National Basketball Association (NBA) may distribute a live basketball game over a network (e.g., the Internet). The NBA, as a content provider 16, may accept payment utilizing a NBA wallet, an Excite@Home wallet, and an English "British Telecom" wallet, and may designate the NBA wallet as a preferred, default wallet.

When an Excite@Home user requests access to the game via a conditional access agent 28 deployed by Excite@Home, operating as a content distributor 20, the relevant conditional access agent 28 may, in the manner described above, reorder a list of payment gateways, accepted by the NBA and received from a conditional access server 36 operated by the NBA, to reflect the Excite@Home wallet as the preferred and default wallet. Accordingly, the Excite@Home wallet would in this case be presented to the end user as the default wallet.

Alternatively, when a British Telcom user requests access to the game via a conditional access agent 28 deployed by British Telcom in its capacity as a content distributor 20, the preferred and default payment gateway may be switched to the British Telcom wallet by the relevant conditional access agent 28.

Finally, if a user requests content to the game outside the Excite@Home and British Telcom networks, the payment gateway communicated to the content requester as the default and preferred payment gateway (in the absence of a reconfiguring by the appropriate content distributor 20) will be the NBA wallet, as specified by the NBA in its capacity as a content provider 16.

This enables a content provider 16 (e.g., the NBA) to sell access to a basketball game with minimal user inconvenience for Excite@Home and British Telcom users, as these users are not required to establish an account with the NBA. Such users will then be spared the inconvenience of having to re-supply confidential information to the NBA.

With a view to implementing the method 600 described above, both a content provider 16 and a content distributor 20 may maintain an ordered (or ranked) list of payment gateways. To enable the content distributor 20 to determine which payment gateways should be presented to a user, the ranked list of payment gateways may be communicated from the content provider 16 to the content distributor 20.

Similarly, in one embodiment, the content distributor 20 may maintain a similarly ranked list of payment gateways.

In one embodiment, the content distributor 20 may present both the first and second ranked lists of payment gateways to a user for selection. In a further embodiment, the content distributor 20 may operate to only present payment gateways within the lists that correspond. In other words, only payment gateways that appear on the list of the content distributor 20 are presented to the requester, with other payment gateways that do not appear on the list maintained by the content distributor 20 being filtered out.

In yet a further embodiment, the content distributor 20 may reorder payment gateways communicated in the ranked list of the content provider 16 to reflect relationships established between the content distributor 20 and at least one payment gateway.

In yet a further embodiment of the present invention, a content distributor 20 may be authorized to only present payment gateways that are included in the ranked list generated by the content provider 16, and communicated to the content distributor 20. Nonetheless, in this embodiment, the content distributor 20 is presented with the option of re-ordering, or only displaying selected payment gateways, in accordance with relationships that may have been established between the content distributor 20 and the payment gateways, or relationships that may have been established between the end user and the payment gateways.

Computer System

Figure 27:
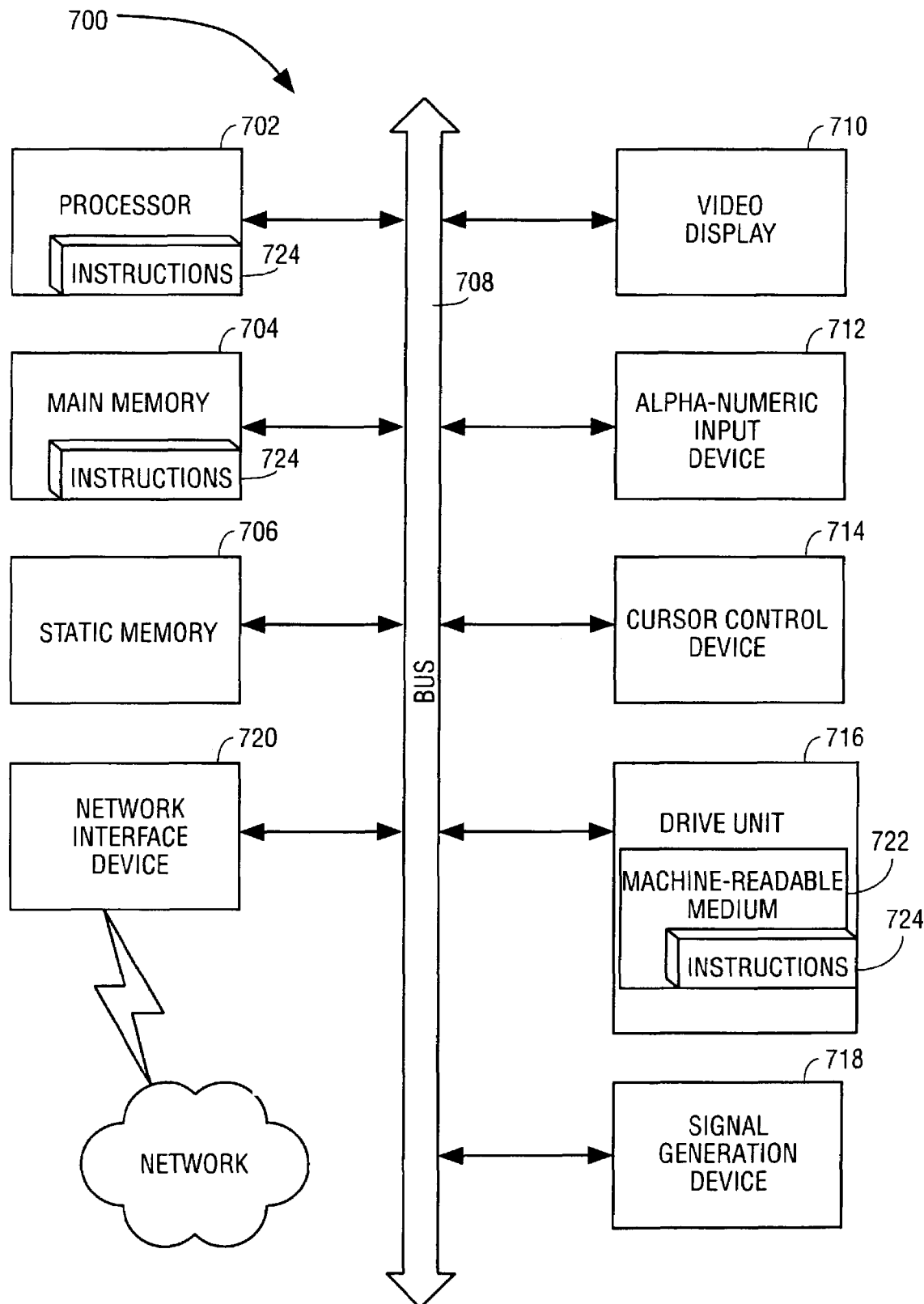
FIG. 27 is a block diagram illustrating a machine, in an exemplary form of a computer system, that may operate to execute a sequence of instructions, stored on a machine-readable medium, for causing the machine to perform any of the methodologies discussed in the present specification.

FIG. 27 is a diagrammatic representation of a machine in the form of computer system 700 within which software, in the form of a series of machine-readable instructions, for performing any one of the methods discussed above may be executed. The computer system 700 includes a processor 702, a main memory 704 and a static memory 706, which communicate via a bus 708. The computer system 700 is further shown to include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720. The disk drive unit 716 accommodates a machine-readable medium 722 on which software 724 embodying any one of the methods described above is stored. The software 724 is shown to also reside, completely or at least partially, within the main memory 704 and/or within the processor 702. The software 724 may furthermore be transmitted or received by the network interface device 720. For the purposes of the present specification, the term "machine-readable medium" shall be taken to include any medium that is capable of storing or encoding a sequence of instructions for execution by a machine, such as the computer system 700, and that causes the machine to perform the methods of the present invention. The term "machine-readable medium" shall be taken to include, but not be limited to, solid-state memories, optical and magnetic disks, and carrier wave signals.

If written in a programming language conforming to a recognized standard, the software 724 can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic.), as taking an action or causing a result. Such expressions are merely a shorthand way of saying that execution of the software by a machine, such as the computer system 700, to perform an action or a produce a result.

Thus, methods and systems to distribute content via a network utilizing distributed conditional access agents and secure agents, and to perform digital rights management (DRM) have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to distribute content via a network, the method including:
   at a content provider, generating a sequence of session keys and encrypting content utilizing the sequence of session keys to generate encrypted content;
   communicating the sequence of session keys to a content distributor;
   at the content distributor, encrypting the sequence of session keys utilizing a user key to generate a set of encrypted keys;
   transmitting the encrypted content to a content destination;
   transmitting the set of encrypted keys from the content distributor to the content destination;
   transmitting the user key from the content distributor to the content destination so as to enable the content destination to decrypt the set of encrypted keys to extract the sequence of session keys; and
   at the content destination, utilizing the sequence of session keys to decrypt the encrypted content.

2. The method of claim 1 wherein the sequence of session keys comprises a time-varying sequence of session keys.

3. The method of claim 1 wherein the communication of the sequence of session keys to the content distributor includes:
   at the content provider, encrypting the sequence of session keys utilizing a product key to generate a set of master encrypted keys;
   communicating the set of master encrypted keys from the content provider to the content distributor;
   communicating the product key from the content provider to the content distributor; and
   at the content distributor, decrypting the set of master encrypted keys utilizing the product key to extract the sequence of session keys.

4. The method of claim 3 wherein the product key is encrypted with a public key of the content distributor prior to communication of the product key from the content provider to the content distributor so that the public key is only available to the content distributor.

5. The method of claim 1 including receiving, from the content destination and at the content distributor, a request to deliver of the content to the content destination.

6. The method of claim 5 including receiving, from the content destination and at the content distributor, a user certificate in association with the request.

7. The method of claim 5 including receiving, from the content destination and at the content distributor, a copy-protected device certificate in association with the request.

8. The method of claim 3 including, at the content distributor, generating a request for access criteria and the product key, and communicating the request for the access criteria to the content provider.

9. The method of claim 8 including, at the content provider attaching a signature of the content provider to the access criteria and the product key to cryptographically bind the access criteria with the product key, and communicating the signature, the access criteria and the product key to the content distributor.

10. The method of claim 9 including, at the content provider, encrypting the product key with a public key of the content distributor prior to communication of the product key to the content distributor.

11. The method of claim 10 including, at the content distributor, verifying the signature of the content provider, and decrypting the product key utilizing a private key of the content distributor, the product key being utilized to decrypt the set of master encrypted keys to extract the sequence of session keys.

12. The method of claim 1 including issuing, from the content distributor to the content destination, a request for user secure device information.

13. The method of claim 12 including issuing, from the content distributor to the content provider, a request for subscription information.

14. The method of claim 13 including constructing, at the content distributor, an order request for the content based on the secure device information, the access criteria and the subscription information and communicating the order request from the content distributor to the content destination for acceptance.

15. The method of claim 14 wherein the order request includes a signature of the content distributor, and wherein the user process verifies the signature of the content distributor.

16. The method of claim 15 wherein the content destination generates an order, signs the order utilizing a user signature and communicates the order to the content distributor.

17. The method of claim 16 wherein the content distributor, responsive to receipt of the order, verifies access criteria and the user signature within a physically secure environment.

18. The method of claim 1 wherein the content distributor creates a secure network session with the content destination, creates the user key, encrypts the user key with a public key of the content destination, and communicates the encrypted user key to the content destination utilizing secure network session.

19. The method of claim 18 wherein the content destination decrypts the encrypted user key utilizing a private key associated with the content destination to extract the user key for a purpose of decrypting the set of encrypted keys.

20. A system to distribute content via a network, the system including:
   a content distributor coupled, via the network, to a content provider and to a content destination;
   the content provider operating to generate a sequence of session keys, encrypt content utilizing the sequence of session keys, and to communicate the sequence of session keys to the content distributor;
   the content distributor operating to encrypt the set sequence of session keys utilizing a user key to generate a set of encrypted keys, to transmit the set of encrypted keys to the content destination, and to transmit the user key from the content distributor to the content destination so as to enable the content destination to decrypt the set of encrypted keys to extract the set sequence of session keys; and the content destination operating to utilize the sequence of session keys to decrypt the encrypted content.

21. The system of claim 20 wherein the sequence of session keys comprises a time-varying sequence of session keys.

22. The system of claim 20 wherein the content provider is to encrypt the sequence of session keys utilizing a product key to generate a set of master encrypted keys, to communicate the set of master encrypted keys from the content provider to the content distributor, and to communicate the product key from the content provider to the content distributor; and wherein the content distributor is to decrypt the of master encrypted keys utilizing the product key to extract the sequence of session keys.

23. The system of claim 22 wherein the product key is encrypted with a public key of the content distributor prior to communication of the product key from the content provider to the content distributor so that the public key is only available to the content distributor.

24. The system of claim 20 wherein the content distributor is to receive a request for delivery of the content to the content destination.

25. The system of claim 24 wherein the content distributor is to receive a user certificate in association with the request.

26. The system of claim 24 wherein the content distributor is to receive a copy-protected device certificate in association with the request.

27. The system of claim 22 wherein the content distributor is to generate a request for access criteria and the product key, and to communicate the request for the access criteria to the content provider.

28. The system of claim 27 wherein the content provider is to attach a signature of the content provider to the access criteria and the product key to cryptographically bind the access criteria with the product key, and to communicate the signature, the access criteria and the product key to the content distributor.

29. The system of claim 28 wherein the content provider is to encrypt the product key with a public key of the content distributor prior to communication of the product key to the content distributor.

30. The system of claim 28 wherein the content distributor is to verify the signature of the content provider, and to decrypt the product key utilizing a private key of the content distributor, the product key being utilized to decrypt the set of master encrypted keys to extract the sequence of session keys.

31. The system of claim 20 wherein the content distributor is to issue, to the content destination, a request for user secure device information.

32. The system of claim 31 wherein the content distributor is to issue, to the content provider, a request for subscription information.

33. The system of claim 32 wherein the content distributor is to construct an order request for the content based on the secure device information, the access criteria and the subscription information and to communicate the order request from the content distributor to the content destination for acceptance.

34. The system of claim 33 wherein the order request includes a signature of the content distributor, and wherein the user process verifies the signature of the content distributor.

35. The system of claim 34 wherein the content destination is to generate an order, to sign the order utilizing a user signature and to communicate the order to the content distributor.

36. The system of claim 35 wherein the content distributor, responsive to receipt of the order, is to verify access criteria and the user signature within a physically secure environment.

37. The system of claim 20 wherein the content distributor is to create a secure network session with the content destination, to create the user key, to encrypt the user key with a public key of the content destination, and to communicate the encrypted user key to the content destination utilizing secure network session.

38. The system of claim 37 wherein the content destination is to decrypt the encrypted user key utilizing a private key associated with the content destination to extract the user key for a purpose of decrypting the set of encrypted keys.

39. A system to distribute content via a network, the system including:

content distributor means coupled, via the network, to a content provider means and to a content destination means;

the content provider means operating to generate a sequence of session keys, encrypt content utilizing the sequence of session keys, and to communicate the sequence of session keys to the content distributor means;

the content distributor means operating to encrypt the sequence of session keys utilizing a user key to generate a set of encrypted keys, to transmit the set of encrypted keys to the content destination means, and to transmit the user key from the content distributor means to the content destination means so as to enable the content destination means to decrypt the set of encrypted keys to extract the sequence of session keys; and the content destination means operating to utilize the sequence of session keys to decrypt the encrypted content.

40. A machine-readable medium storing a sequence of instructions that, when executed by a machine, cause the machine to perform a method to distribute content via a network, the method including:

at a content provider, generating a sequence of session keys and encrypting content utilizing the sequence of session keys to generate encrypted content;

communicating the sequence of session keys to a content distributor;

at the content distributor, encrypting the sequence of session keys utilizing a user key to generate a set of encrypted keys;

transmitting the encrypted content to a content destination;

transmitting the set of encrypted keys from the content distributor to the content destination;

transmitting the user key from the content distributor to the content destination so as to enable the content destination to decrypt the set of encrypted keys to extract the sequence of session keys; and at the content destination, utilizing the sequence of session keys to decrypt the encrypted content.

* * * * *

UNITED STATES PATENT AND TRADEMARK OFFICE
CERTIFICATE OF CORRECTION

PATENT NO. : 6,993,137 B2
APPLICATION NO. : 10/320916
DATED : January 31, 2006
INVENTOR(S) : Fransdonk It is certified that error appears in the above-identified patent and that said Letters Patent is hereby corrected as shown below:

On the title page, item (56), under "Other Publications", in column 1, line 1, delete "et al," and insert -- et al., --, therefor.

On page 2, item (56), under "Other Publications", in column 2, line 7, delete "Melborne," and insert -- Melbourne, --, therefor.

On page 2, item (56), under "Other Publications", in column 2, line 12, delete "Protoccols," and insert -- Protocols, --, therefor.

On page 2, item (56), under "Other Publications", in column 2, line 13, after "1996" insert -- , --.

On sheet 6 of 28, in FIG. 6A (Box 122), line 4, delete "E.G," and insert -- E.G., --, therefor.

On sheet 6 of 28, in FIG. 6A (Box 126), line 4, delete "CYPTOGRAPHICALLY" and insert -- CRYPTOGRAPHICALLY --, therefor.

On sheet 11 of 28, in FIG. 10A (Box 234), line 3, delete "DATA" and insert -- DATE --, therefor.

On sheet 21 of 28, in FIG. 19 (Box 472), line 3, delete "encryted)" and insert -- encrypted) --, therefor.

On sheet 23 of 28, in FIG. 21 (Box 500), line 3, delete "(encryted)" and insert -- (encrypted) --, therefor.

In column 1, line 13, delete "VIAA" and insert -- VIA A --, therefor.

In column 1, line 16, delete "VIAA" and insert -- VIA A --, therefor.

In column 2, line 53, after "so-called" delete ",".

UNITED STATES PATENT AND TRADEMARK OFFICE
CERTIFICATE OF CORRECTION

PATENT NO. : 6,993,137 B2
APPLICATION NO. : 10/320916
DATED : January 31, 2006
INVENTOR(S) : Fransdonk It is certified that error appears in the above-identified patent and that said Letters Patent is hereby corrected as shown below:

In column 5, line 58, delete "requester." and insert -- requestor. --, therefor.

In column 6, line 49, delete "high-level," and insert -- high level, --, therefor.

In column 8, line 10, delete "protected" and insert -- protect --, therefor.

In column 12, line 53, delete "I.e." and insert -- i.e. --, therefor.

In column 16, line 63, delete "CaAgentld" and insert -- CAAgentld --, therefor.

In column 19, line 66, after "through the" delete "to".

In column 25, line 14, delete "tamperproof" and insert -- tamper proof --, therefor.

In column 27, line 30, delete "10." and insert -- 110. --, therefor.

In column 39, line 20, delete "requester" and insert -- requestor --, therefor.

In column 40, line 12, delete "requester." and insert -- requestor. --, therefor.

In column 40, line 14, delete "requester" and insert -- requestor --, therefor.

In column 40, line 24, delete "requester" and insert -- requestor --, therefor.

In column 40, line 60, delete "requester" and insert -- requestor --, therefor.

In column 40, line 64, delete "requester" and insert -- requestor --, therefor.

In column 40, line 67, delete "requester" and insert -- requestor --, therefor.

In column 41, line 9, delete "requester." and insert -- requestor. --, therefor.

In column 42, line 26, delete "requester," and insert -- requestor, --, therefor.

In column 42, line 49, delete "requester," and insert -- requestor, --, therefor.

In column 42, line 56, delete "requester." and insert -- requestor. --, therefor.

In column 42, line 65, delete "requester," and insert -- requestor, --, therefor.

In column 43, line 2, delete "requester." and insert -- requestor. --, therefor.

UNITED STATES PATENT AND TRADEMARK OFFICE
CERTIFICATE OF CORRECTION

PATENT NO. : 6,993,137 B2
APPLICATION NO. : 10/320916
DATED : January 31, 2006
INVENTOR(S) : Fransdonk It is certified that error appears in the above-identified patent and that said Letters Patent is hereby corrected as shown below:

In column 43, line 51, delete "requester" and insert -- requester --, therefor.

In column 44, line 9, delete "requester," and insert -- requestor, --, therefor.

In column 46, line 60, in Claim 20, after "encrypt the" delete "set".

In column 46, line 67, in Claim 20, delete "set" before "sequence".

In column 47, line 13, in Claim 22, insert -- set -- before "of master".

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO.        : 6,993,137 B2
APPLICATION NO. : 10/320916
DATED              : January 31, 2006
INVENTOR(S)       : Fransdonk It is certified that error appears in the above-identified patent and that said Letters Patent is hereby corrected as shown below:

On the Title page, in Item (56), under "Other Publications", in column 1, line 1, delete "et al," and insert -- et al., --, therefor.

On Title page 2, in Item (56), under "Other Publications", in column 2, line 7, delete "Melborne," and insert -- Melbourne, --, therefor.

On Title page 2, in Item (56), under "Other Publications", in column 2, line 12, delete "Protoccols," and insert -- Protocols, --, therefor.

On Title page 2, in Item (56), under "Other Publications", in column 2, line 13, after "1996" insert -- , --.

On sheet 6 of 28, in FIG. 6A (Box 122), line 4, delete "E.G," and insert -- E.G., --, therefor.

On sheet 6 of 28, in FIG. 6A (Box 126), line 4, delete "CYPTOGRAPHICALLY" and insert -- CRYPTOGRAPHICALLY --, therefor.

On sheet 11 of 28, in FIG. 10A (Box 234), line 3, delete "DATA" and insert -- DATE --, therefor.

On sheet 21 of 28, in FIG. 19 (Box 472), line 3, delete "encryted)" and insert -- encrypted) --, therefor.

On sheet 23 of 28, in FIG. 21 (Box 500), line 3, delete "(encryted)" and insert -- (encrypted) --, therefor.

In column 1, line 13, delete "VIAA" and insert -- VIA A --, therefor.

UNITED STATES PATENT AND TRADEMARK OFFICE
CERTIFICATE OF CORRECTION

PATENT NO. : 6,993,137 B2
APPLICATION NO. : 10/320916
DATED : January 31, 2006
INVENTOR(S) : Fransdonk It is certified that error appears in the above-identified patent and that said Letters Patent is hereby corrected as shown below:

In column 1, line 16, delete "VIAA" and insert -- VIA A --, therefor.

In column 2, line 53, after "so-called" delete ",".

In column 5, line 58, delete "requester." and insert -- requestor. --, therefor.

In column 6, line 49, delete "high-level," and insert -- high level, --, therefor.

In column 8, line 10, delete "protected" and insert -- protect --, therefor.

In column 12, line 53, delete "I.e." and insert -- i.e. --, therefor.

In column 16, line 63, delete "CaAgentId" and insert -- CAAgentId --, therefor.

In column 19, line 66, after "through the" delete "to".

In column 25, line 14, delete "tamperproof" and insert -- tamper proof --, therefor.

In column 27, line 30, delete "10." and insert -- 110. --, therefor.

In column 39, line 20, delete "requester" and insert -- requestor --, therefor.

In column 40, line 12, delete "requester." and insert -- requestor. --, therefor.

In column 40, line 14, delete "requester" and insert -- requestor --, therefor.

In column 40, line 24, delete "requester" and insert -- requestor --, therefor.

In column 40, line 60, delete "requester" and insert -- requestor --, therefor.

In column 40, line 64, delete "requester" and insert -- requestor --, therefor.

In column 40, line 67, delete "requester" and insert -- requestor --, therefor.

In column 41, line 9, delete "requester." and insert -- requestor. --, therefor.

In column 42, line 26, delete "requester," and insert -- requestor, --, therefor.

UNITED STATES PATENT AND TRADEMARK OFFICE
CERTIFICATE OF CORRECTION

PATENT NO.      : 6,993,137 B2
APPLICATION NO. : 10/320916
DATED           : January 31, 2006
INVENTOR(S)     : Fransdonk It is certified that error appears in the above-identified patent and that said Letters Patent is hereby corrected as shown below:

In column 42, line 49, delete "requester," and insert -- requestor, -- therefor.

In column 42, line 56, delete "requester." and insert -- requestor. --, therefor.

In column 42, line 65, delete "requester," and insert -- requestor, --, therefor.

In column 43, line 2, delete "requester." and insert -- requestor. --, therefor.

In column 43, line 51, delete "requester" and insert -- requestor --, therefor.

In column 44, line 9, delete "requester," and insert -- requestor, --, therefor.

In column 46, line 60, in Claim 20, after "encrypt the" delete "set".

In column 46, line 67, in Claim 20, delete "set" before "sequence".

In column 47, line 13, in Claim 22, insert -- set -- before "of master".

Signed and Sealed this

Seventeenth Day of February, 2009

JOHN DOLL
*Acting Director of the United States Patent and Trademark Office*